(12) United States Patent
Foster et al.

(10) Patent No.: US 12,352,356 B2
(45) Date of Patent: *Jul. 8, 2025

(54) FLUID END WITH CLAMPED RETENTION

(71) Applicant: Kerr Machine Co., Sulphur, OK (US)

(72) Inventors: Kelcy Jake Foster, Sulphur, OK (US); Micheal Cole Thomas, Ardmore, OK (US); Christopher Todd Barnett, Stratford, OK (US); Nicholas Son, Davis, OK (US); John Keith, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,562

(22) Filed: Feb. 15, 2024

(65) Prior Publication Data

US 2024/0200657 A1 Jun. 20, 2024

Related U.S. Application Data

(63) Continuation-in-part of application No. 17/685,936, filed on Mar. 3, 2022, now Pat. No. 11,920,583.
(Continued)

(51) Int. Cl.
*F16J 15/18* (2006.01)
*F04B 1/0476* (2020.01)
(Continued)

(52) U.S. Cl.
CPC .......... *F16J 15/185* (2013.01); *F16J 15/28* (2013.01); *F16J 15/3232* (2013.01);
(Continued)

(58) Field of Classification Search
CPC ...... F04B 39/121; F04B 1/0538; F04B 19/22; F04B 27/00; F04B 39/122; F04B 53/164; F04B 23/06; F04B 39/14; F04B 53/02; F04B 53/16; F04B 53/22; F04B 1/0476; F16L 21/007; F16L 21/08; F16J 15/185;
(Continued)

(56) References Cited

U.S. PATENT DOCUMENTS 1,317,294 A 9/1919 Hildebrand
2,071,825 A 7/1936 Finlayson
(Continued)

FOREIGN PATENT DOCUMENTS

CN 113483169 A * 10/2021
WO 2014144113 A2 9/2014

OTHER PUBLICATIONS

CN113483169A translation (Year: 2024).*

*Primary Examiner* — David N Brandt
(74) *Attorney, Agent, or Firm* — Tomlinson McKinstry, P.C.

(57) ABSTRACT

A fluid end assembly comprising a plurality of fluid end sections positioned in a side-by-side relationship. Each section comprises a housing containing a reciprocating plunger. One and only one packing seal is installed within the housing and surrounds and engages an outer surface of the plunger. A retainer compresses and holds the packing seal within the housing. The retainer is secured to the housing using a clamp, such that no threads are formed in the housing of the fluid end section and no threads are formed in the retainer.

21 Claims, 62 Drawing Sheets

Related U.S. Application Data

(60) Provisional application No. 63/508,577, filed on Jun. 16, 2023, provisional application No. 63/506,222, filed on Jun. 5, 2023, provisional application No. 63/213,914, filed on Jun. 23, 2021, provisional application No. 63/195,354, filed on Jun. 1, 2021, provisional application No. 63/187,153, filed on May 11, 2021, provisional application No. 63/161,080, filed on Mar. 15, 2021, provisional application No. 63/157,215, filed on Mar. 5, 2021.

(51) Int. Cl.

| | | |
|---|---|---|
| *F04B 19/22* | (2006.01) | |
| *F04B 23/06* | (2006.01) | |
| *F04B 39/12* | (2006.01) | |
| *F04B 39/14* | (2006.01) | |
| *F04B 53/02* | (2006.01) | |
| *F04B 53/16* | (2006.01) | |
| *F04B 53/22* | (2006.01) | |
| *F16J 15/28* | (2006.01) | |
| *F16J 15/3232* | (2016.01) | |
| *F16J 15/3252* | (2016.01) | |
| *F16J 15/34* | (2006.01) | |

(52) U.S. Cl.
CPC ......... *F16J 15/3488* (2013.01); *F04B 1/0476* (2013.01); *F04B 19/22* (2013.01); *F04B 23/06* (2013.01); *F04B 39/122* (2013.01); *F04B 39/14* (2013.01); *F04B 53/02* (2013.01); *F04B 53/164* (2013.01); *F04B 53/22* (2013.01); *F16J 15/3252* (2013.01); *F16J 15/3436* (2013.01)

(58) Field of Classification Search
CPC ...... F16J 15/28; F16J 15/3232; F16J 15/3488; F16J 15/3252; F16J 15/3436
See application file for complete search history.

(56) References Cited

U.S. PATENT DOCUMENTS

| | | | |
|---|---|---|---|
| 2,713,522 A | 7/1955 | Petch | |
| 2,856,857 A | 10/1958 | Saalfrank | |
| 3,053,500 A | 9/1962 | Atkinson | |
| 3,146,724 A | 9/1964 | Cornelsen | |
| 3,244,424 A | 4/1966 | Cope | |
| 3,373,695 A | 3/1968 | Yohpe | |
| 3,427,988 A | 2/1969 | Redman et al. | |
| 3,652,098 A | 3/1972 | Kawazu et al. | |
| 3,655,207 A | 4/1972 | Schettler | |
| 3,679,332 A | 7/1972 | Yohpe | |
| 3,776,558 A | 12/1973 | Muarer | |
| 3,801,234 A * | 4/1974 | Love ...................... | F04B 53/00 417/454 |
| 4,289,317 A | 9/1981 | Kuc | |
| 4,363,463 A | 12/1982 | Moon, Jr. | |
| 4,432,386 A | 2/1984 | Pacht | |
| 4,467,703 A * | 8/1984 | Redwine ............... | F04B 53/162 417/539 |
| 4,768,933 A | 9/1988 | Stachowiak | |
| 4,773,833 A | 9/1988 | Wilkinson et al. | |
| 4,778,347 A | 10/1988 | Mize | |
| 4,861,241 A | 8/1989 | Gamboa et al. | |
| 4,878,815 A | 11/1989 | Stachowiak | |
| 4,948,349 A | 8/1990 | Koiwa | |
| 5,059,101 A | 10/1991 | Valavaara | |
| 5,127,807 A | 7/1992 | Eslinger | |
| 5,331,736 A | 7/1994 | Suggs | |
| 5,362,215 A | 11/1994 | King | |
| 5,626,345 A | 5/1997 | Wallace | |
| 5,709,514 A | 1/1998 | Suggs et al. | |
| 5,799,953 A | 9/1998 | Henderson | |
| 5,848,738 A * | 12/1998 | Sundby .................. | B65B 59/04 285/31 |
| 6,167,959 B1 | 1/2001 | Bassinger et al. | |
| 6,234,490 B1 | 5/2001 | Champlin | |
| 6,382,940 B1 | 5/2002 | Blume | |
| 6,544,012 B1 | 4/2003 | Blume | |
| 7,186,097 B1 | 3/2007 | Blume | |
| 7,290,560 B2 | 11/2007 | Orr et al. | |
| 7,296,591 B2 | 11/2007 | Moe et al. | |
| 7,354,046 B2 | 4/2008 | Ramsay | |
| 7,506,574 B2 * | 3/2009 | Jensen ................. | F04B 53/007 417/454 |
| 7,789,133 B2 | 9/2010 | McGuire | |
| 7,828,053 B2 | 11/2010 | McGuire et al. | |
| 7,963,502 B2 | 6/2011 | Lovell et al. | |
| 8,047,820 B2 | 11/2011 | Merrick, III | |
| 8,100,407 B2 | 1/2012 | Stanton et al. | |
| 8,528,585 B2 | 9/2013 | McGuire | |
| 10,082,137 B2 | 9/2018 | Graham et al. | |
| 10,519,950 B2 | 12/2019 | Foster | |
| 10,760,567 B2 | 9/2020 | Salih et al. | |
| 11,391,374 B1 | 7/2022 | Ellisor et al. | |
| 11,920,583 B2 * | 3/2024 | Foster .................. | F16L 17/073 |
| 2006/0002806 A1 | 1/2006 | Baxter et al. | |
| 2006/0045782 A1 | 3/2006 | Kretzinger et al. | |
| 2010/0038070 A1 | 2/2010 | Blanco et al. | |
| 2011/0206547 A1 | 8/2011 | Kim et al. | |
| 2011/0236238 A1 | 9/2011 | Cordes et al. | |
| 2013/0319220 A1 * | 12/2013 | Luharuka ............. | F04B 53/166 92/165 R |
| 2014/0348677 A1 | 11/2014 | Moeller et al. | |
| 2015/0132157 A1 | 5/2015 | Whaley et al. | |
| 2016/0223104 A1 * | 8/2016 | Webb ..................... | F16L 21/08 |
| 2017/0089473 A1 | 3/2017 | Nowell et al. | |
| 2017/0218951 A1 | 8/2017 | Graham et al. | |
| 2018/0058477 A1 | 3/2018 | Foster | |
| 2019/0178243 A1 | 6/2019 | Nowell et al. | |
| 2019/0242373 A1 | 8/2019 | Wernig et al. | |
| 2019/0247957 A1 * | 8/2019 | Stribling ................. | B24C 1/10 |
| 2020/0232455 A1 | 7/2020 | Blume | |
| 2020/0362678 A1 | 11/2020 | Lesko | |

\* cited by examiner

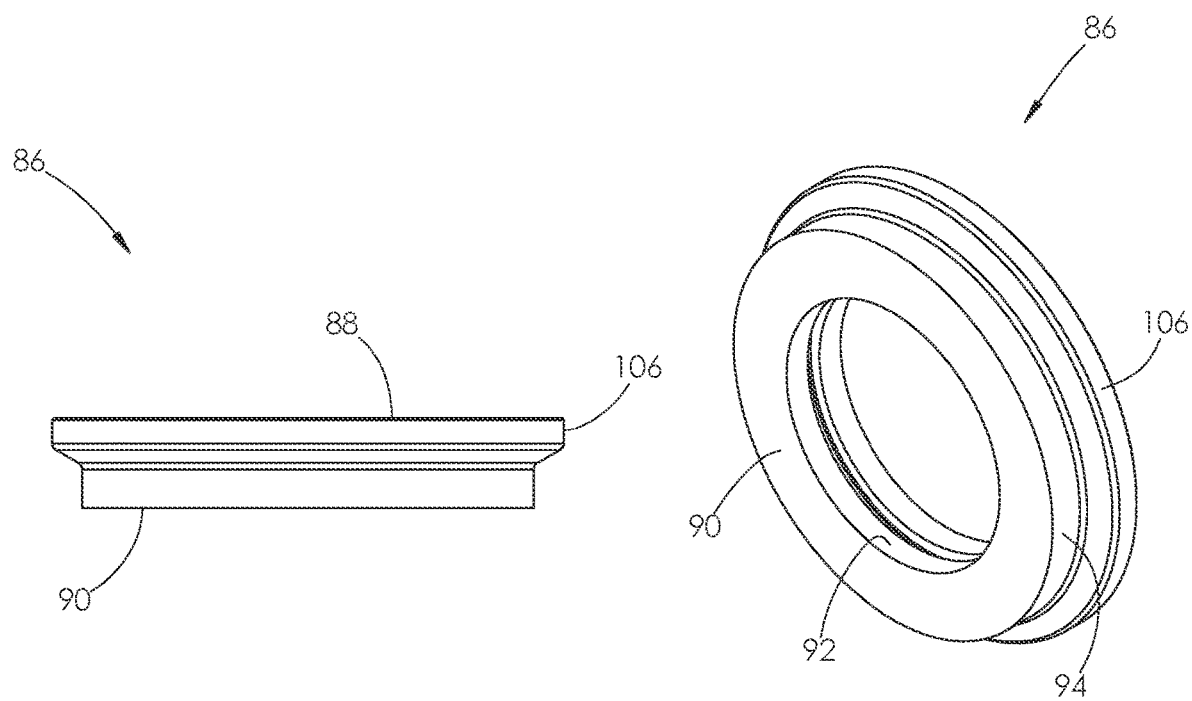
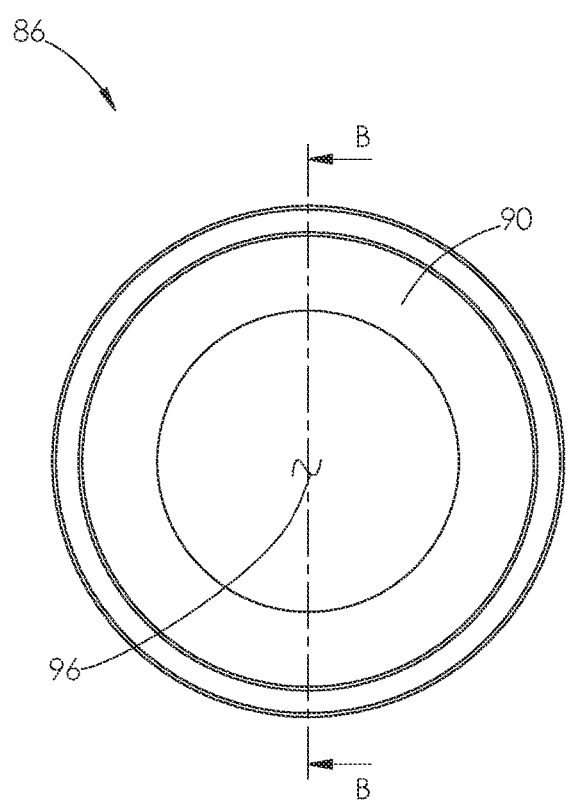
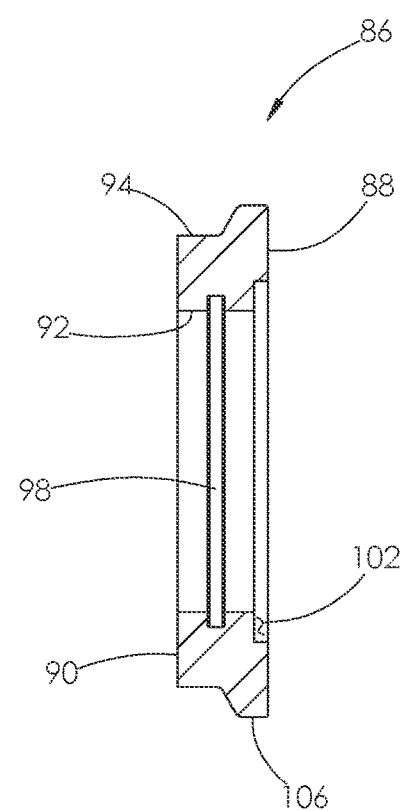
FIG. 6   FIG. 7   FIG. 8   FIG. 9

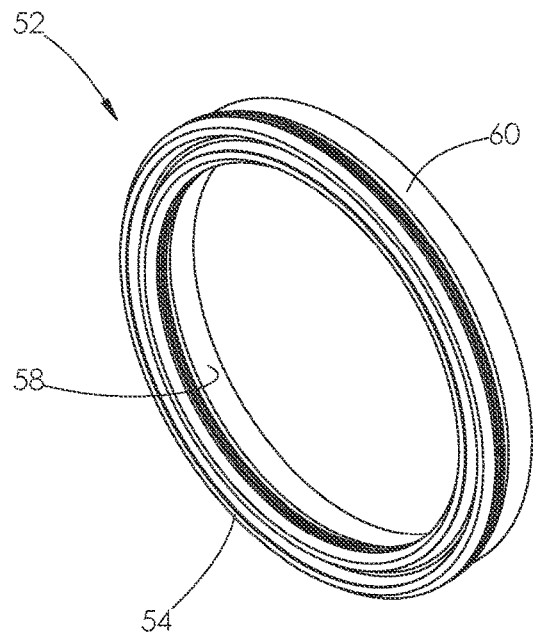
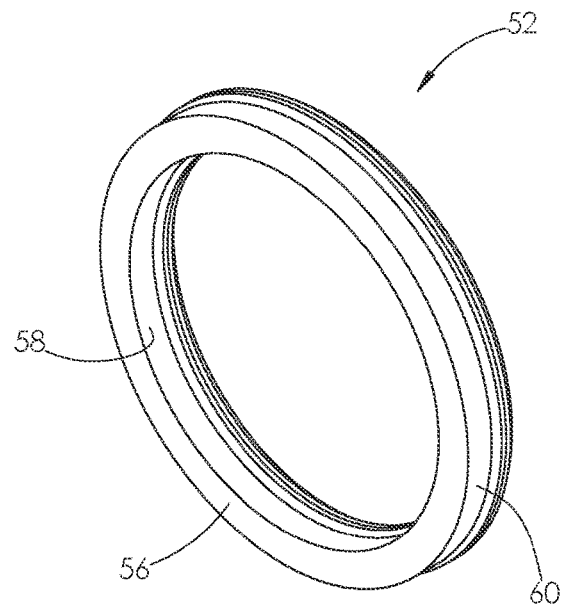
FIG. 14
FIG. 15
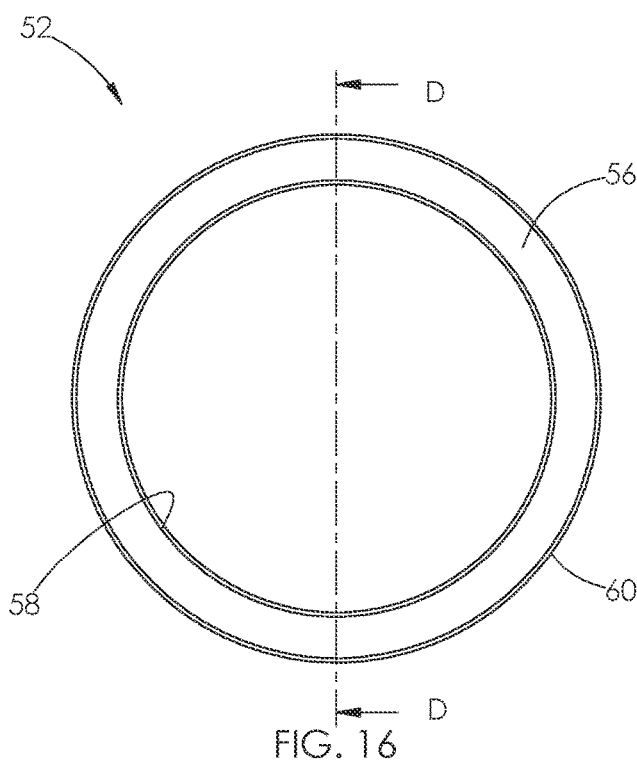
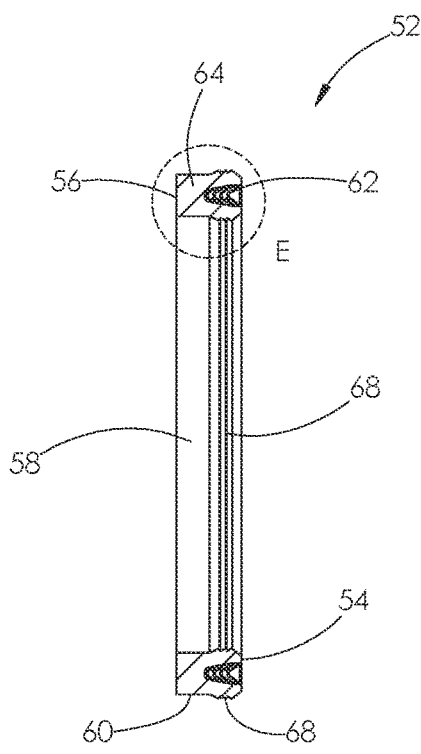
FIG. 16
FIG. 17

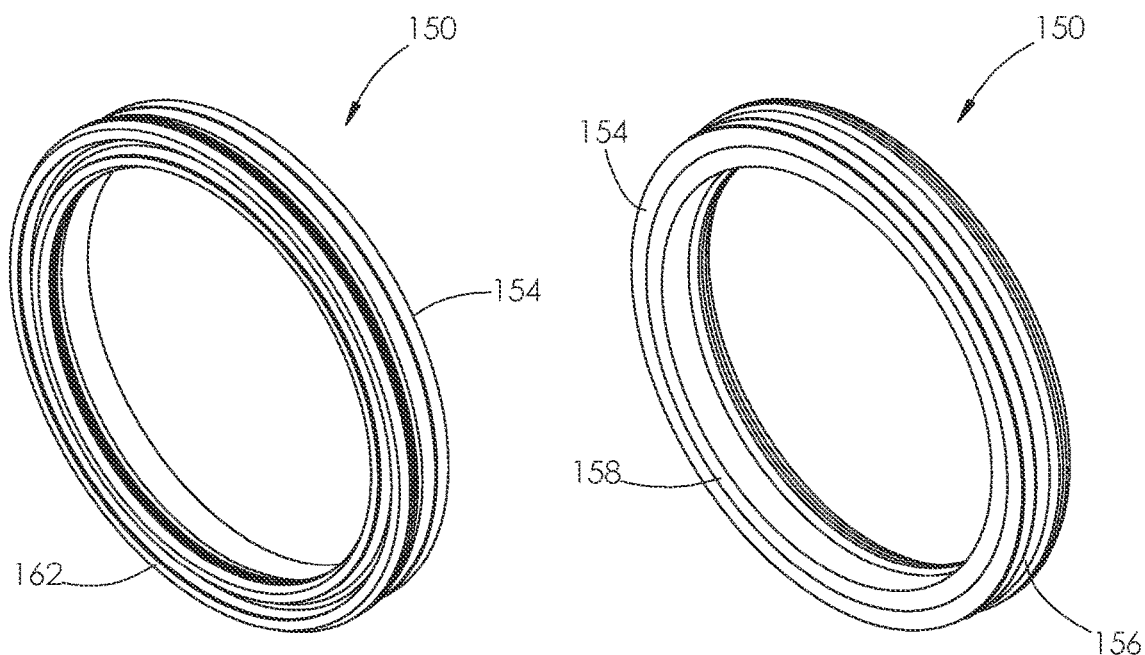
FIG. 19    FIG. 20
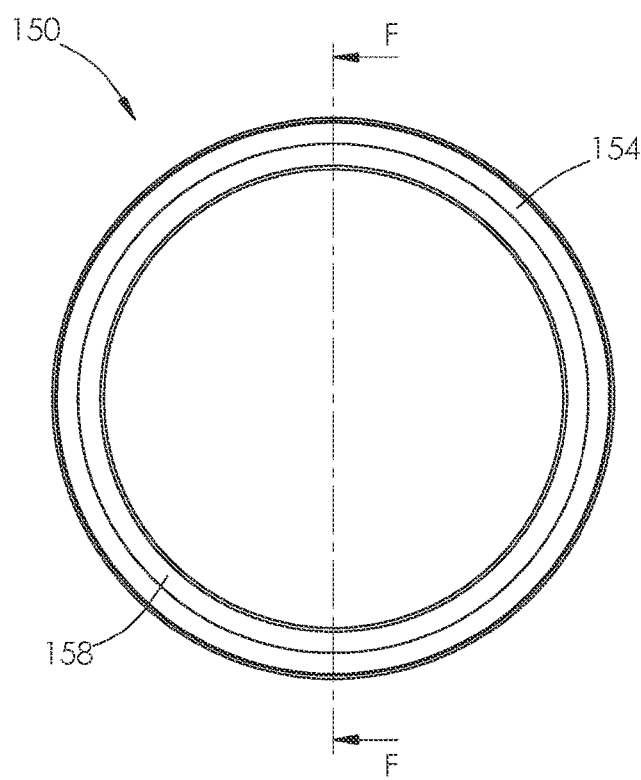    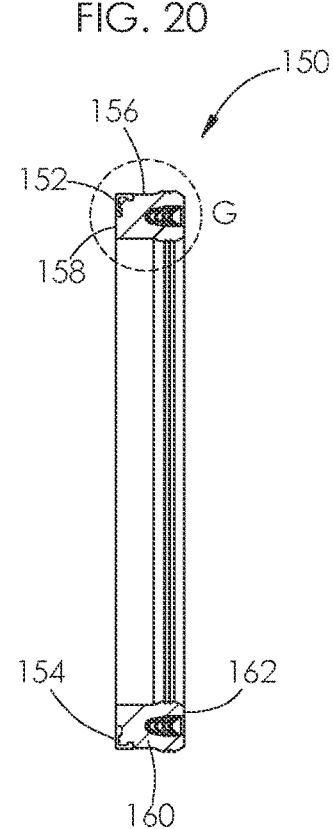
FIG. 21    FIG. 22

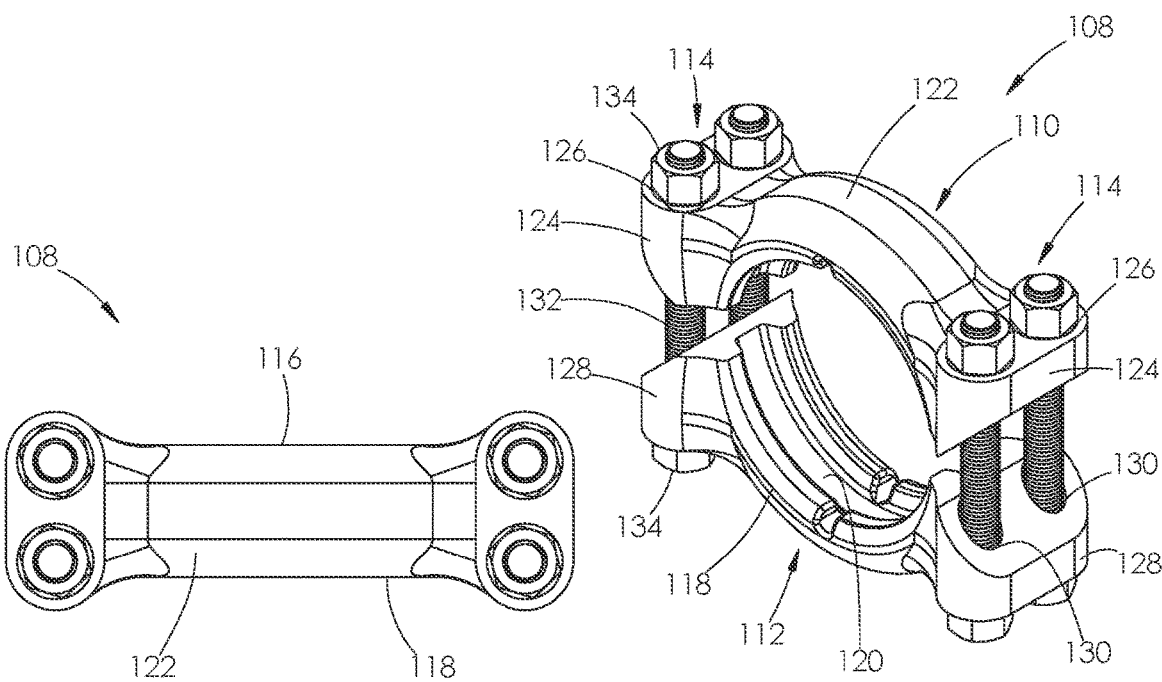
FIG. 29
FIG. 30
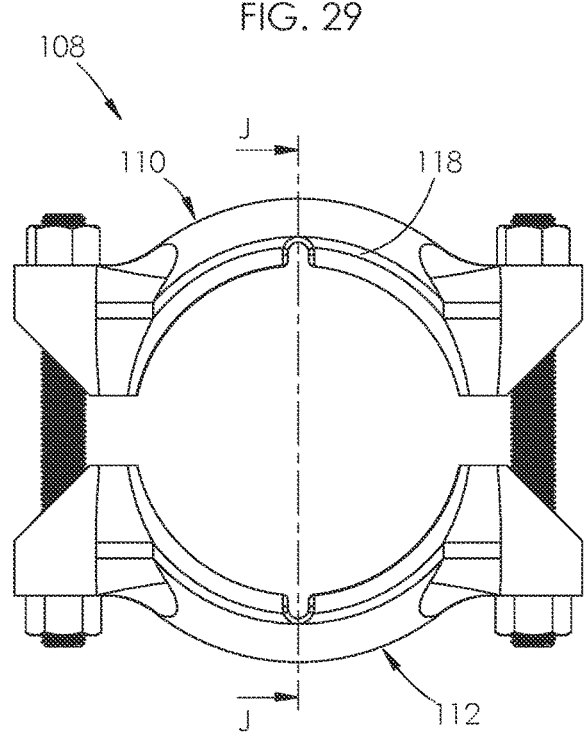
FIG. 31
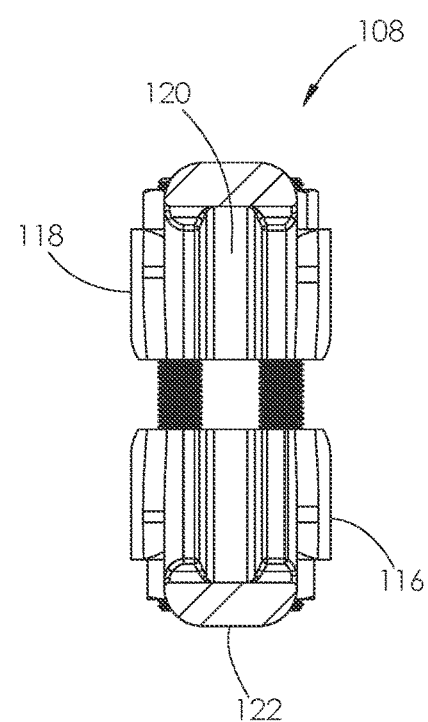
FIG. 32

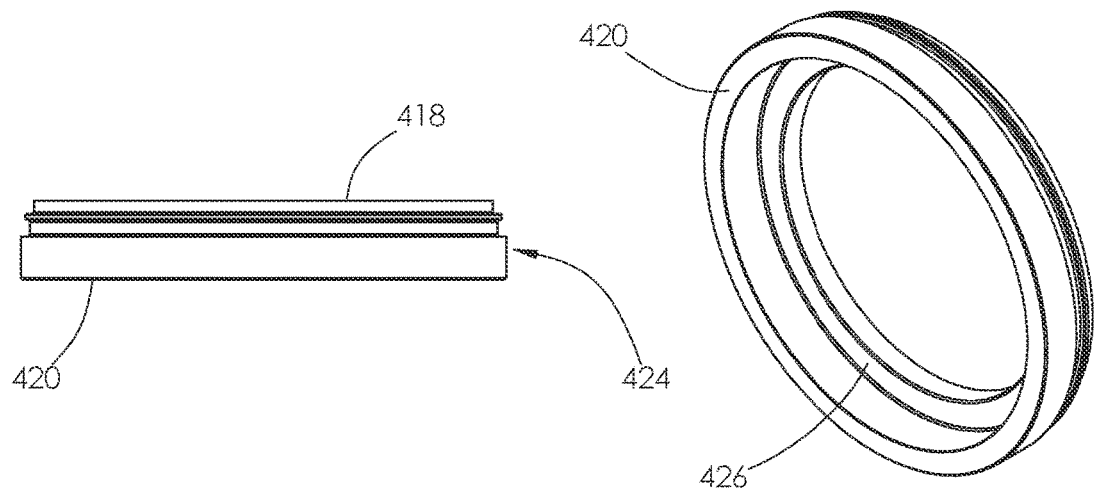
FIG. 53
FIG. 54
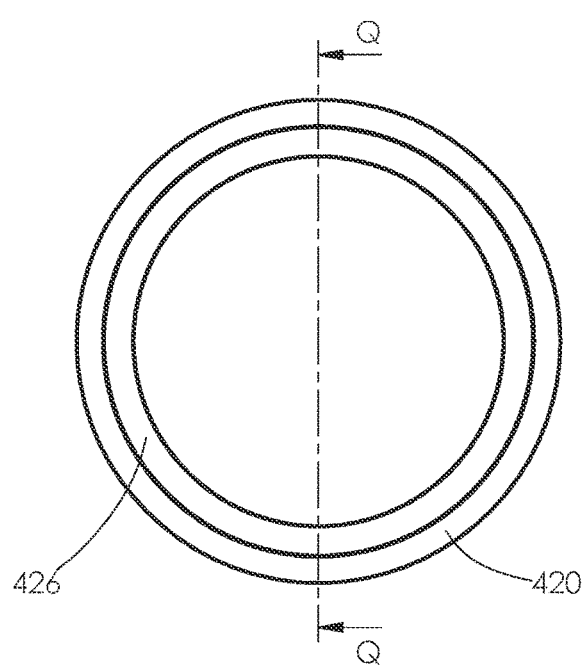
FIG. 55
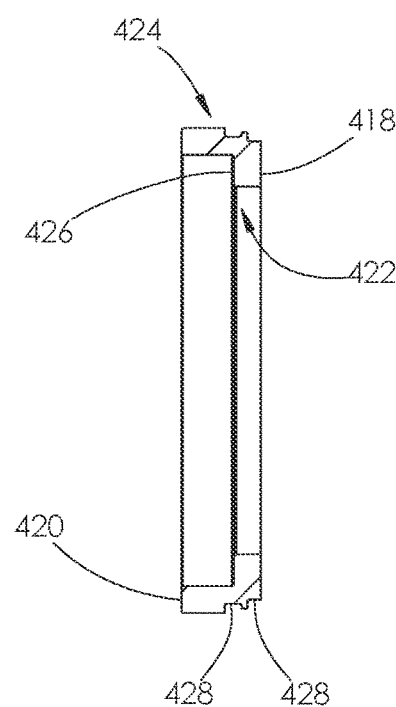
FIG. 56

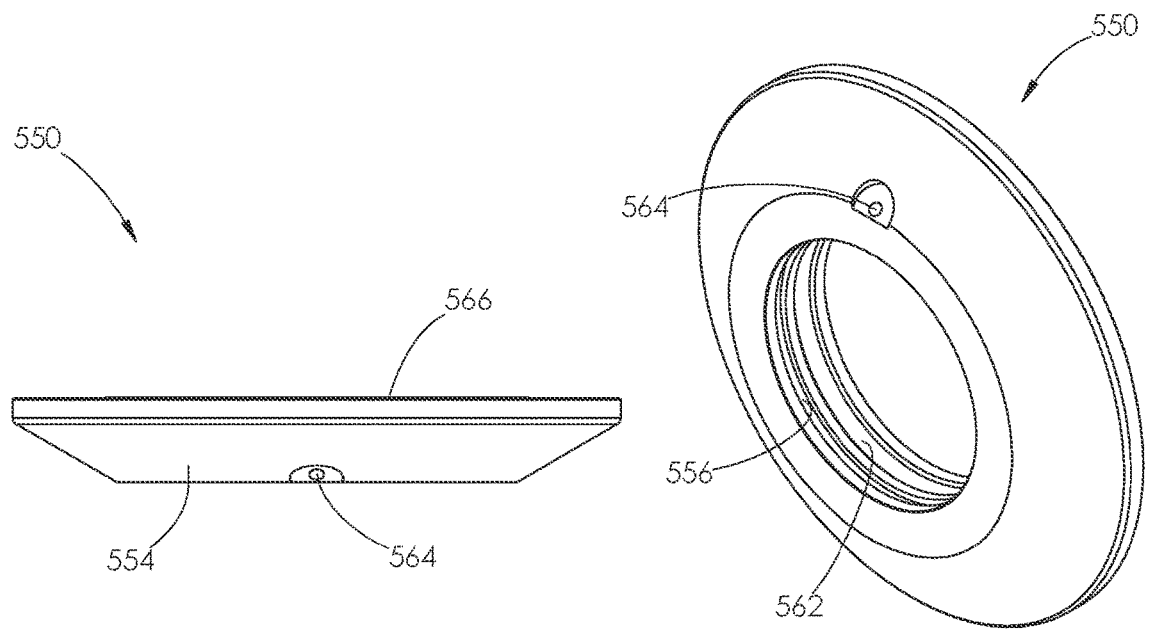
FIG. 66
FIG. 67
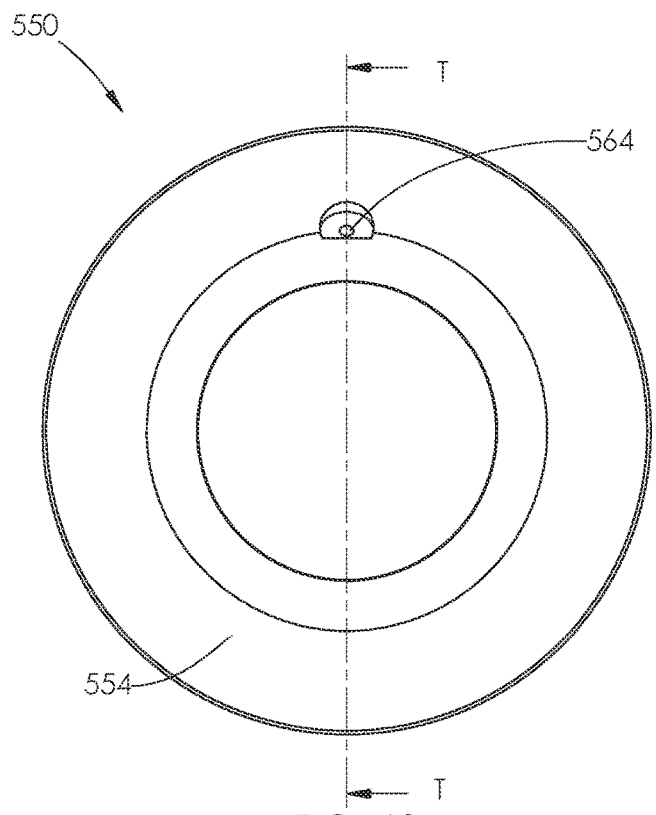
FIG. 68
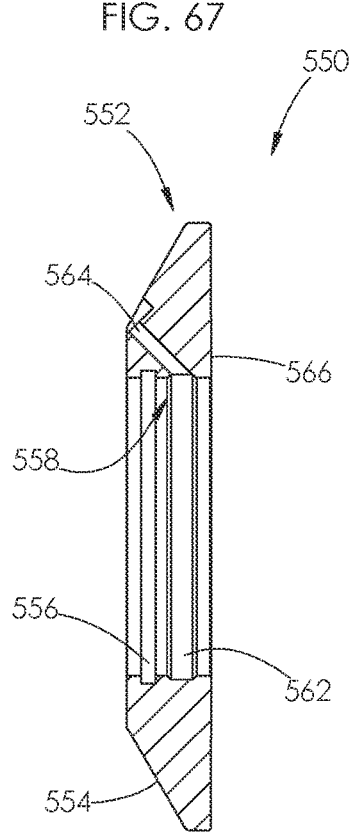
FIG. 69

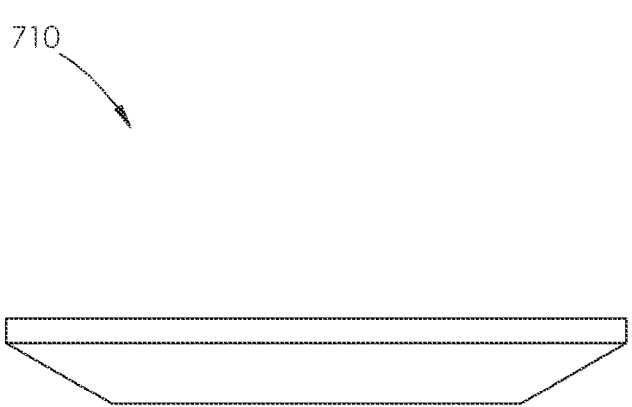
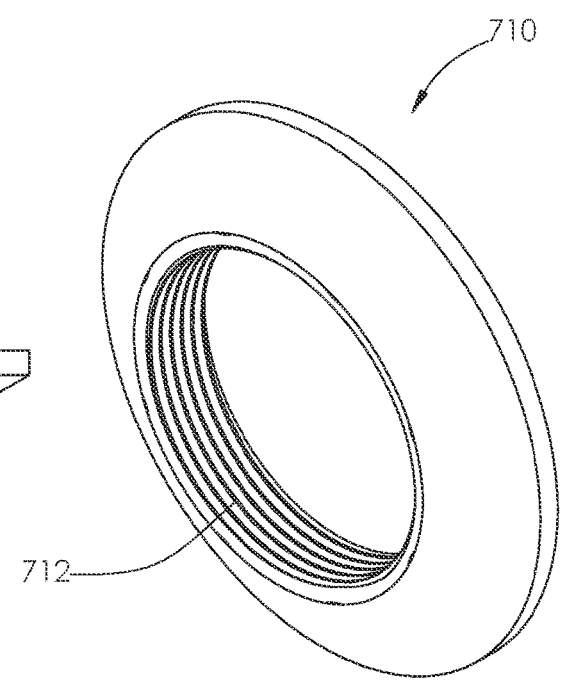
FIG. 80    FIG. 81
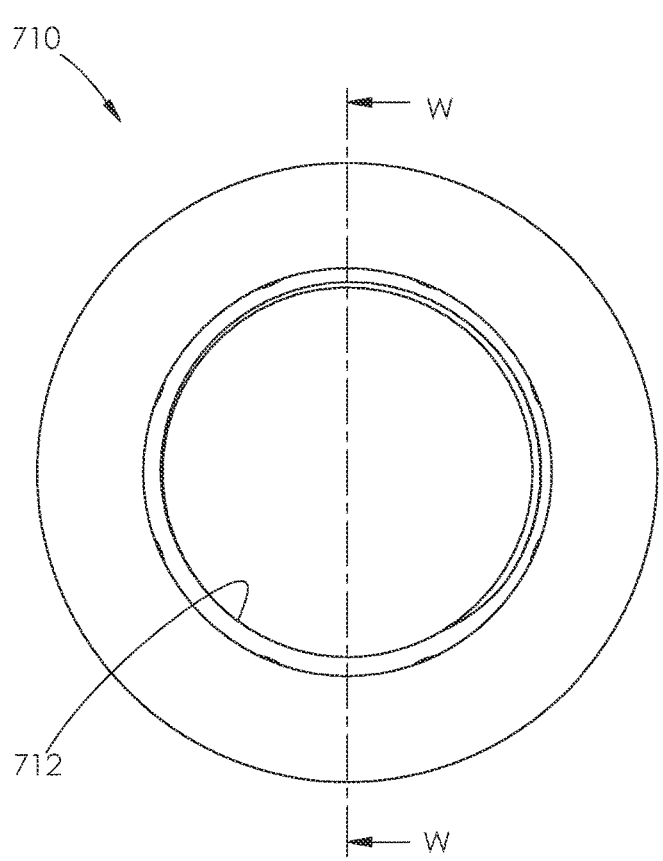
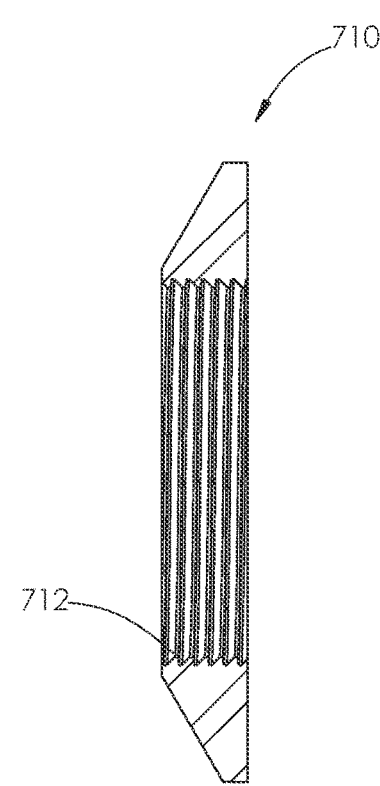
FIG. 82    FIG. 83

FLUID END WITH CLAMPED RETENTION

RELATED APPLICATIONS

This application claims the benefit of the following U.S. provisional patent applications: Ser. No. 63/157,215, authored by Foster et al., and filed on Mar. 5, 2021; Ser. No. 63/161,080, authored by Foster et al., and filed on Mar. 15, 2021; Ser. No. 63/187,153, authored by Foster et al., and filed on May 11, 2021; Ser. No. 63/195,354, authored by Foster et al., and filed on Jun. 1, 2021; Ser. No. 63/213,914, authored by Foster et al, and filed on Jun. 23, 2021; Ser. No. 63/506,222, authored by Foster et al., and filed on Jun. 5, 2023; and Ser. No. 63/508,577, authored by Foster et al., and filed on Jun. 16, 2023. The entire contents of all of the above-listed provisional applications are incorporated herein by reference.

SUMMARY

The present invention is directed to a fluid end assembly comprising a housing having a longitudinal axis and opposed front and rear surfaces joined by an outer intermediate surface. A horizontal bore is formed within the housing and interconnects the front and rear surfaces of the housing. The horizontal bore extends along the longitudinal axis of the housing. The fluid end assembly also comprises a retainer abutting the rear surface of the housing, and a clamp engaging at least a portion of the retainer and at least a portion of the housing and securing the retainer and the housing together. The clamp comprises an inner clamp surrounded by an outer clamp. The fluid end section further comprises a reciprocating plunger disposed within the horizontal bore and the retainer, and a packing seal installed within the housing and engaging an outer surface of the plunger.

The present invention is further directed to a fluid end assembly comprising a housing having a longitudinal axis and opposed front and rear surfaces joined by an outer intermediate surface. A horizontal bore is formed within the housing and interconnects the front and rear surfaces of the housing. The horizontal bore extends along the longitudinal axis of the housing. The fluid end assembly also comprises a retainer abutting the rear surface of the housing, and a clamp engaging at least a portion of the retainer and at least a portion of the housing and securing the retainer and the housing together. The fluid end section further comprises a reciprocating plunger disposed within the horizontal bore and the retainer, and one and only one packing seal installed within the housing and engaging an outer surface of the plunger.

BRIEF DESCRIPTION OF THE DRAWINGS

FIG. 6 is a top plan view of the retainer used with the fluid end section shown in FIG. 2.

FIG. 7 is a rear perspective view of the retainer shown in FIG. 6.

FIG. 8 is a rear elevational view of the retainer shown in FIG. 6.

FIG. 9 is a cross-sectional view of the retainer shown in FIG. 8, taken along line B-B.

FIG. 14 is a front perspective view of the packing seal shown installed within the fluid end section in FIG. 3.

FIG. 15 is a rear perspective view of the packing seal shown in FIG. 14.

FIG. 16 is a rear elevational view of the packing seal shown in FIG. 14.

FIG. 17 is a cross-sectional view of the packing seal shown in FIG. 16, taken along line D-D.

FIG. 19 is a front perspective view of another embodiment of a packing seal.

FIG. 20 is a rear perspective view of the packing seal shown in FIG. 19.

FIG. 21 is a rear elevational view of the packing seal shown in FIG. 19.

FIG. 22 is a cross-sectional view of the packing seal shown in FIG. 21, taken along line F-F.

FIG. 29 is a top plan view of the clamp used with the fluid end section shown in FIG. 2.

FIG. 30 is a rear perspective view of the clamp shown in FIG. 29.

FIG. 31 is a rear elevational view of the clamp shown in FIG. 29.

FIG. 32 is a cross-sectional view of the clamp shown in FIG. 31, taken along line J-J.

FIG. 53 is a top plan view of the sleeve shown installed within the fluid end section shown in FIG. 50.

FIG. 54 is a rear perspective view of the sleeve shown in FIG. 53.

FIG. 55 is a rear elevational view of the sleeve shown in FIG. 53.

FIG. 56 is a cross-sectional view of the sleeve shown in FIG. 55, taken along line Q-Q.

FIG. 66 is a top plan view of the retainer used with the fluid end section shown in FIG. 62.

FIG. 67 is a rear perspective view of the retainer shown in FIG. 66.

FIG. 68 is a rear elevational view of the retainer shown in FIG. 66.

FIG. 69 is a cross-sectional view of the retainer shown in FIG. 68, taken along line T-T.

FIG. 80 is a top plan view of the retainer used with the fluid end section shown in FIG. 76.

FIG. 81 is a rear perspective view of the retainer shown in FIG. 80.

FIG. 82 is a rear elevational view of the retainer shown in FIG. 80.

FIG. 83 is a cross-sectional view of the retainer shown in FIG. 82, taken along line W-W.

DETAILED DESCRIPTION

High pressure reciprocating pumps typically comprise a power end assembly attached to a fluid end assembly. Fluid end assemblies are typically used in oil and gas operations to deliver highly pressurized corrosive and/or abrasive fluids to piping leading to the wellbore. Fluid end assemblies are attached to power ends typically run by engines. The power end comprises a crankshaft configured to reciprocate a plurality of plungers within the fluid end assembly to pump fluid throughout the fluid end.

Fluid may be pumped throughout the fluid end assembly at pressures that range from 5,000-15,000 pounds per square inch (psi). However, the pressure may reach up to 22,500 psi. Power ends typically have a power output of at least 2,250 horsepower during hydraulic fracturing operations. A single fluid end typically delivers a fluid volume of about 185-690 gallons per minute or 4-16 barrels per minute during a fracking operation. When a plurality of fluid ends are used together, the fluid ends collectively deliver about 4,200 gallons per minute or 100 barrels per minute to the wellbore. The present invention improves the performance and life of the various components included in the fluid end assembly.

Various embodiments of a fluid end assembly are disclosed in U.S. patent application Ser. No. 17/550,552 (the "552 application"), in the name of Thomas et al., and titled "Fluid End", the entire contents of which are incorporated herein by reference. The fluid ends disclosed in the '552 application each use a fluid routing plug to route fluid throughout a fluid end section. Various embodiments of fluid routing plugs are disclosed in U.S. patent application Ser. No. 17/668,529, (the "529 application") in the name of Thomas, et al., the entire contents of which are incorporated herein by reference.

Figure 1:
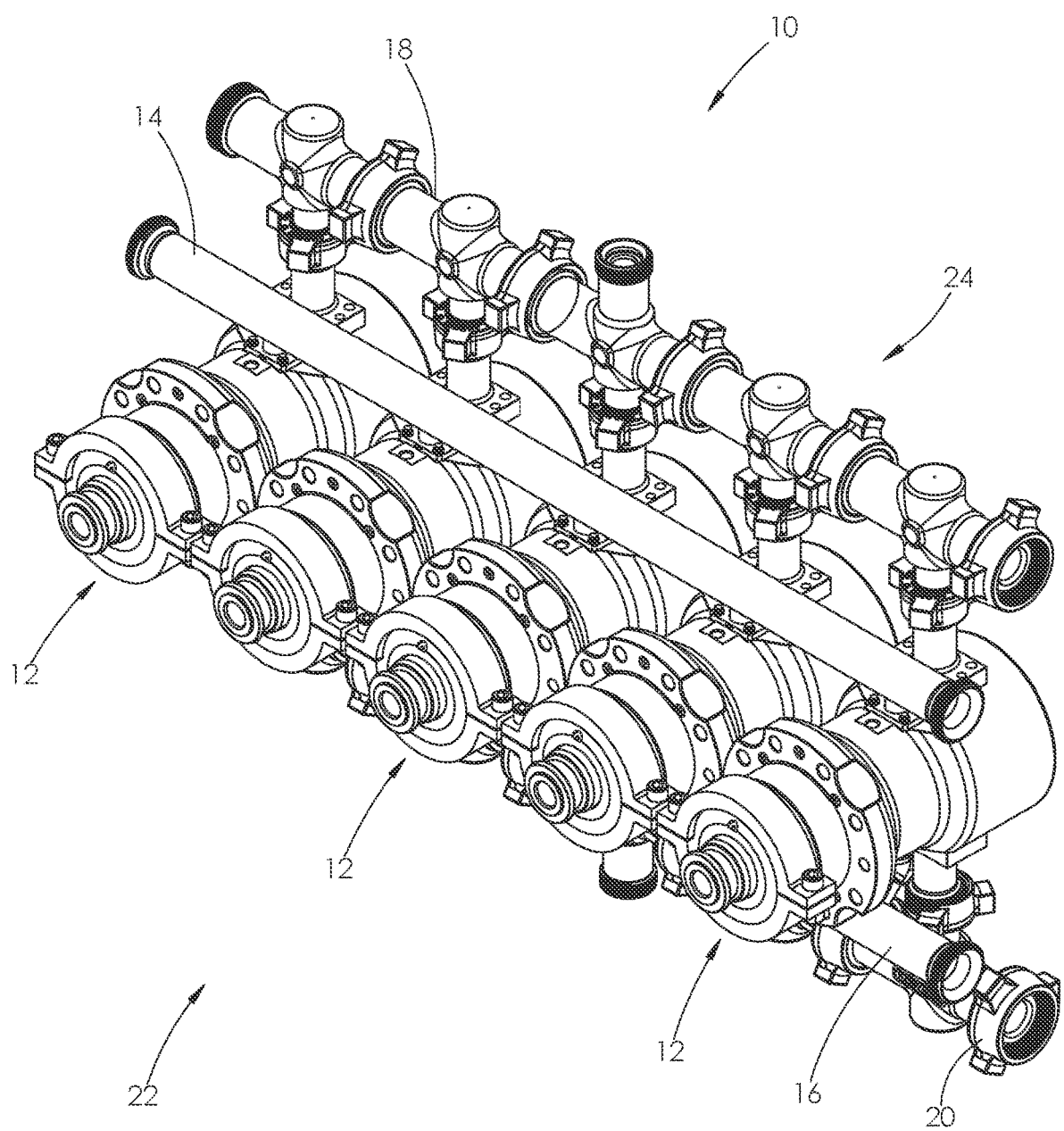
FIG. 1 is a rear perspective view of one embodiment of a fluid end assembly.
Figure 2:
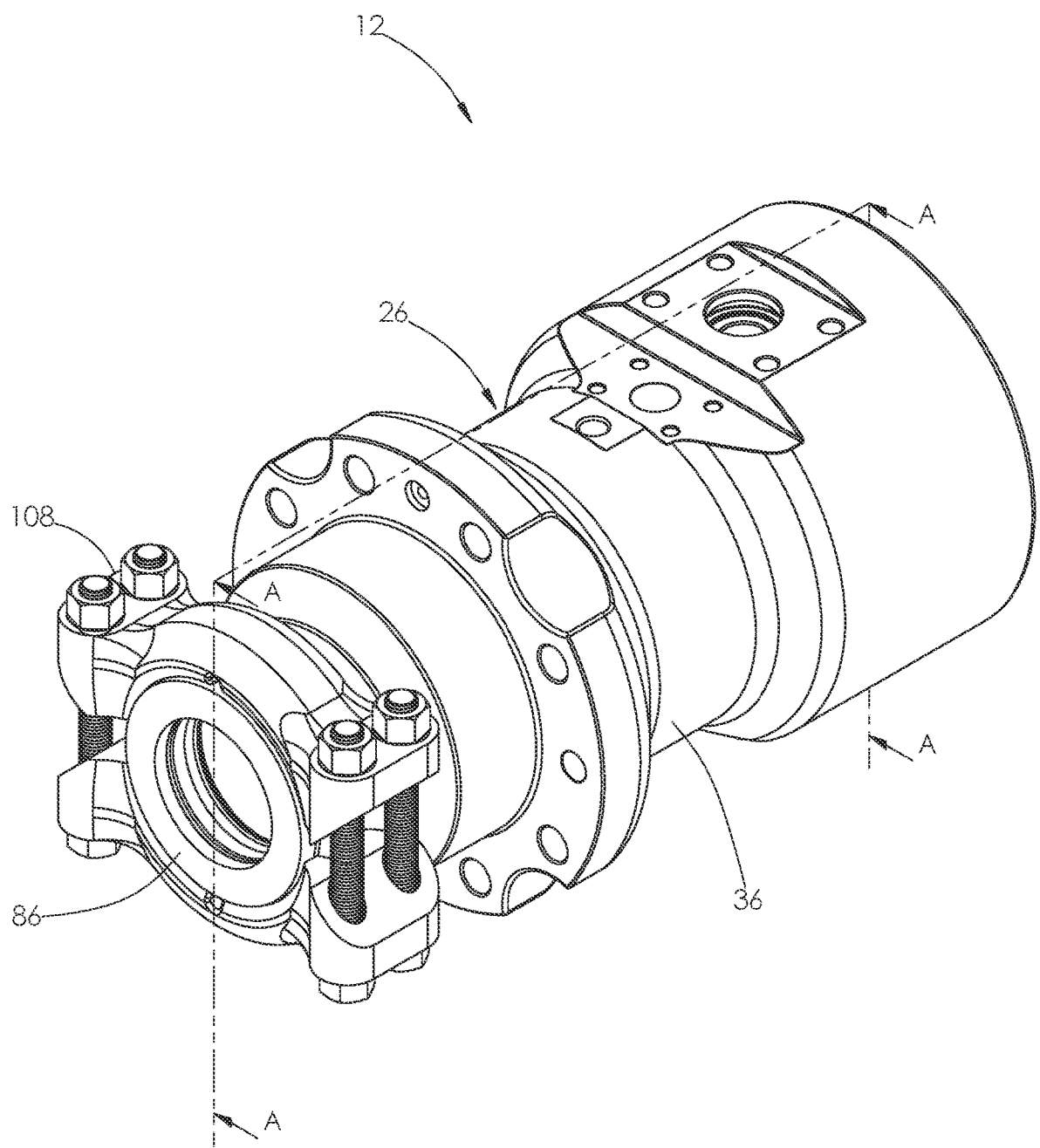
FIG. 2 is a rear perspective view of one of the fluid end sections used with the fluid end assembly shown in FIG. 1, but the plunger has been removed.

Turning now to the figures, one embodiment of a fluid end assembly 10 is shown in FIG. 1. The fluid end assembly 10 comprises a plurality of fluid end sections 12 positioned in a side-by-side relationship. Five fluid end sections 12 are shown in FIG. 1. In alternative embodiments, the fluid end assembly 10 may comprise more or less than five fluid end sections.

Continuing with FIG. 1, fluid is delivered to each of the fluid end sections 12 via upper and lower suction manifolds 14 and 16. Pressurized fluid exits the fluid end sections 12 via upper and lower discharge manifolds 18 and 20. In alternative embodiments, the fluid end assembly 10 may utilize only a single suction manifold and a single discharge manifold.

The fluid end assembly 10 comprises a rear plunger side 22 and an opposed front side 24. A power end attaches to the rear plunger side 22 using a plurality of stay rods, as shown for example in U.S. patent application Ser. No. 17/550,453, authored by Foster et al., the entire contents of which are incorporated herein by reference.

Figure 3:
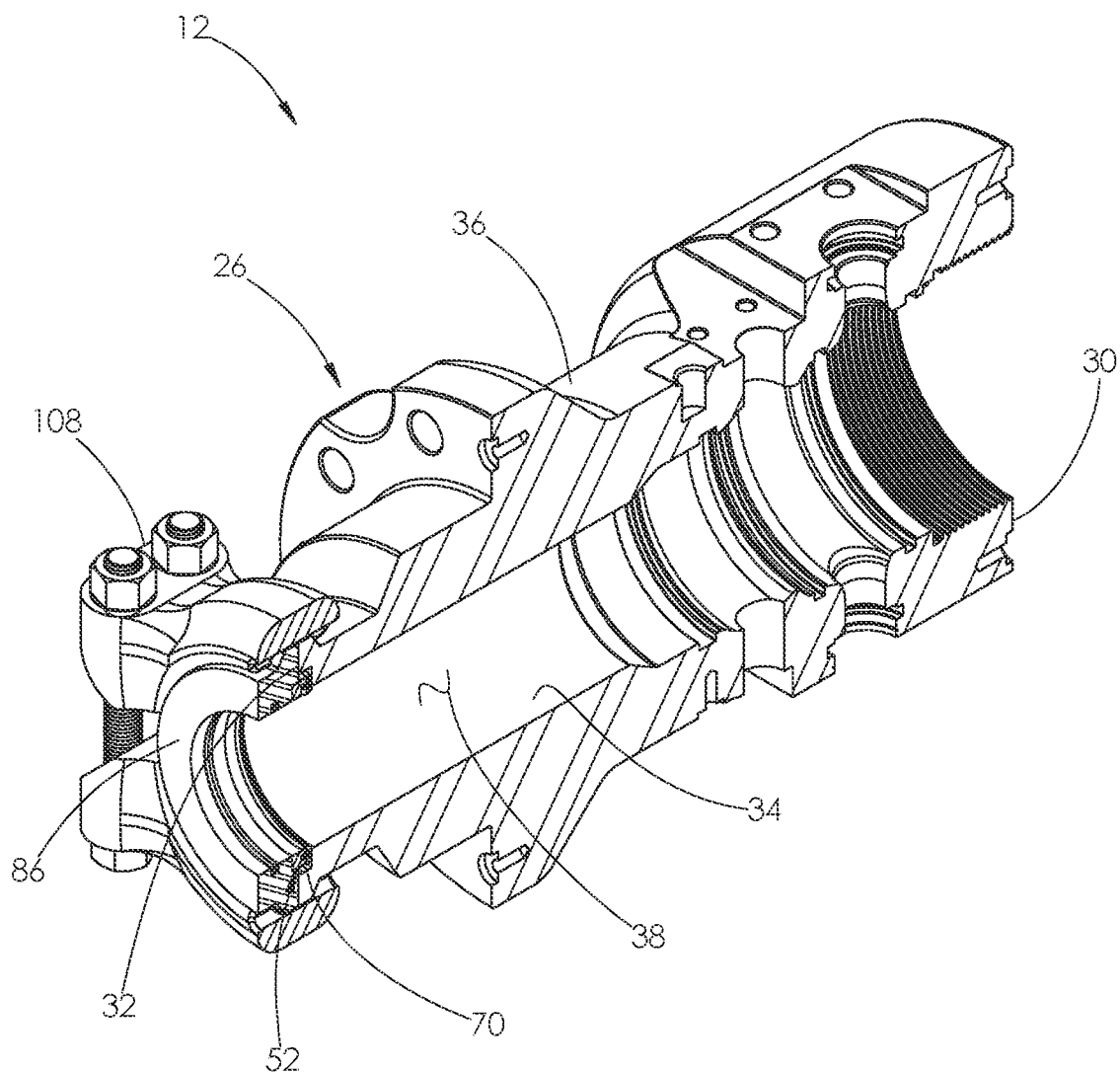
FIG. 3 is a rear perspective and cross-sectional view of the fluid end section shown in FIG. 2, taken along line A-A.
Figure 4:
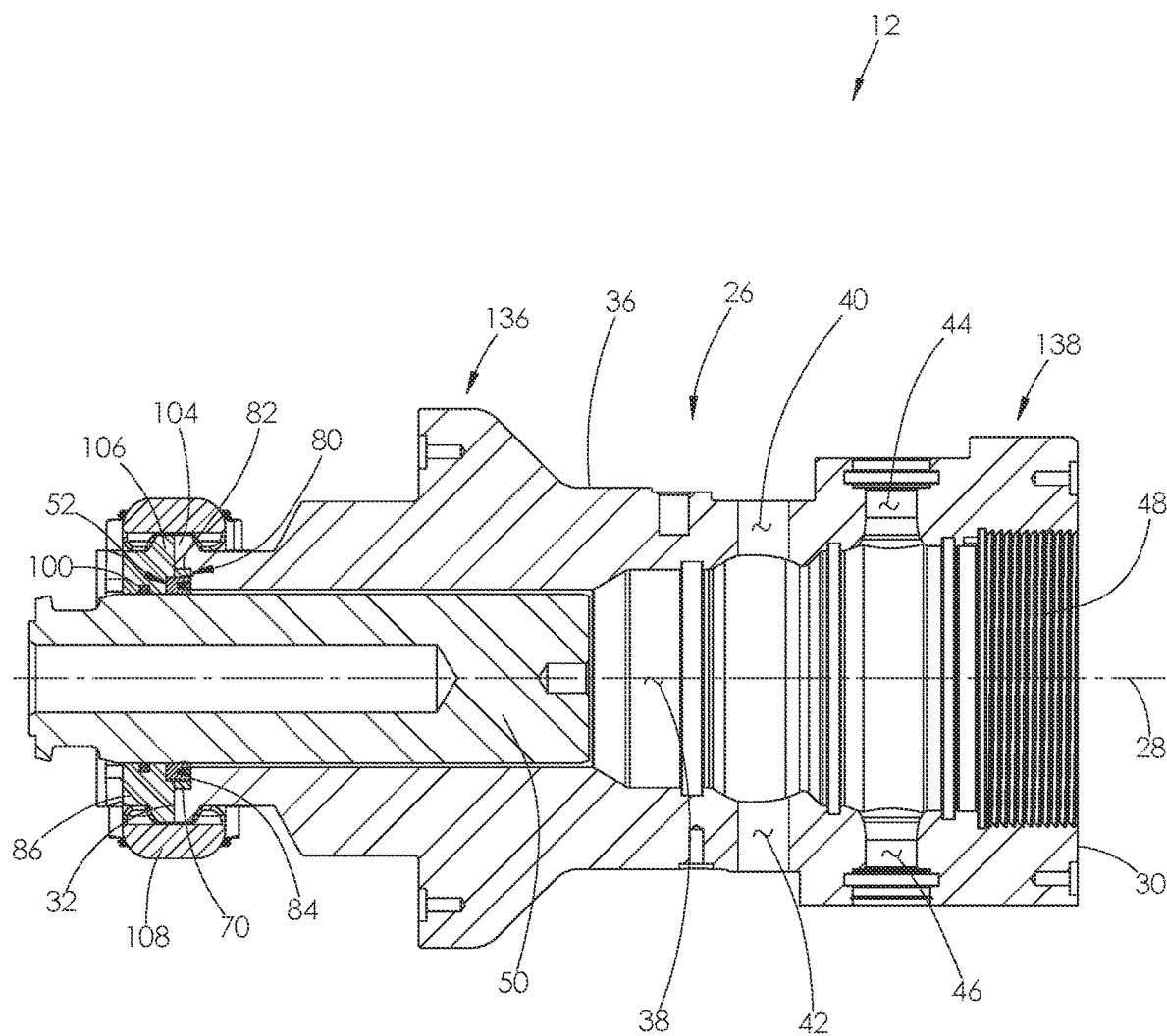
FIG. 4 is a cross-sectional view of the fluid end section shown in FIG. 2, taken along line A-A, with a plunger installed therein.
Figure 5:
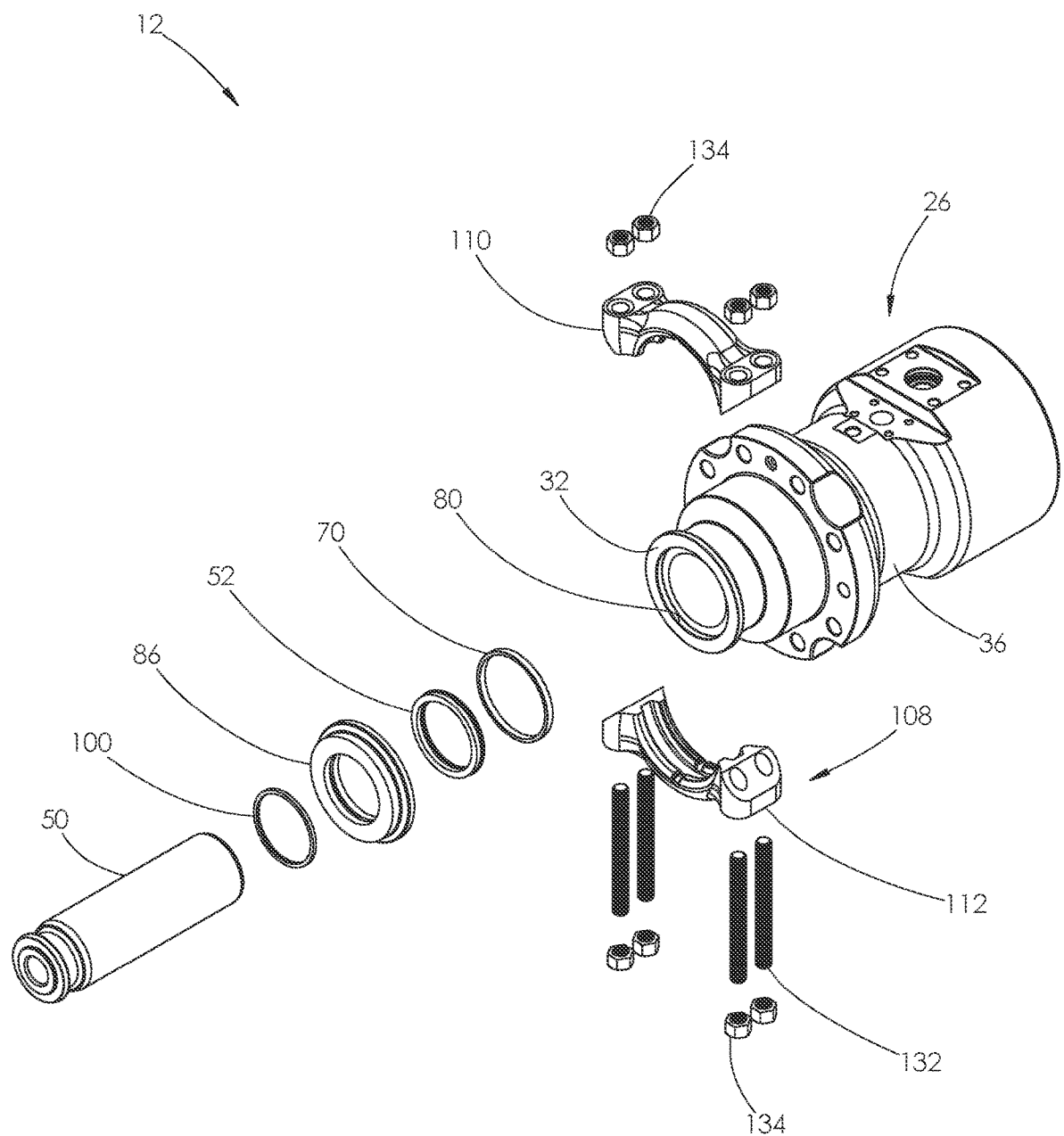
FIG. 5 is a rear perspective and exploded view of one of the fluid end sections shown in FIG. 2, with the addition of the plunger.
Figure 10:
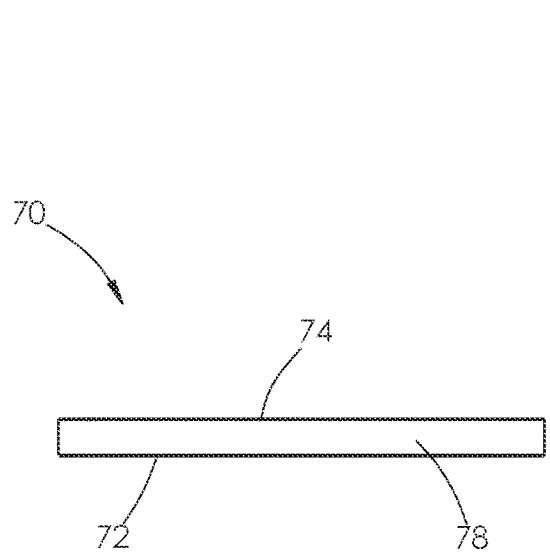
FIG. 10 is a top plan view of the wear ring shown installed within the fluid end section in FIG. 3.
Figure 11:
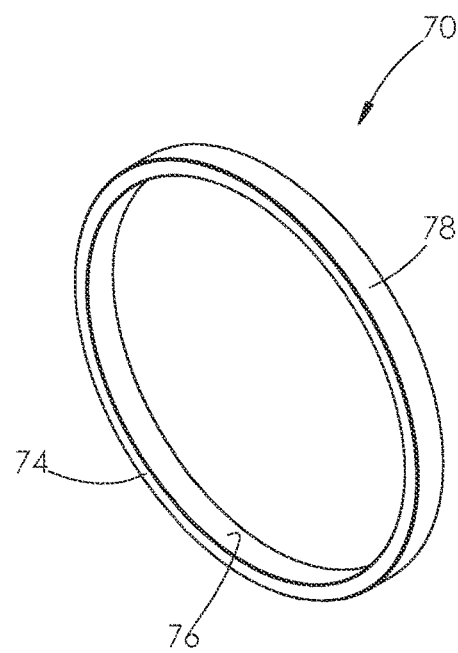
FIG. 11 is a rear perspective view of the wear ring shown in FIG. 10.
Figure 12:
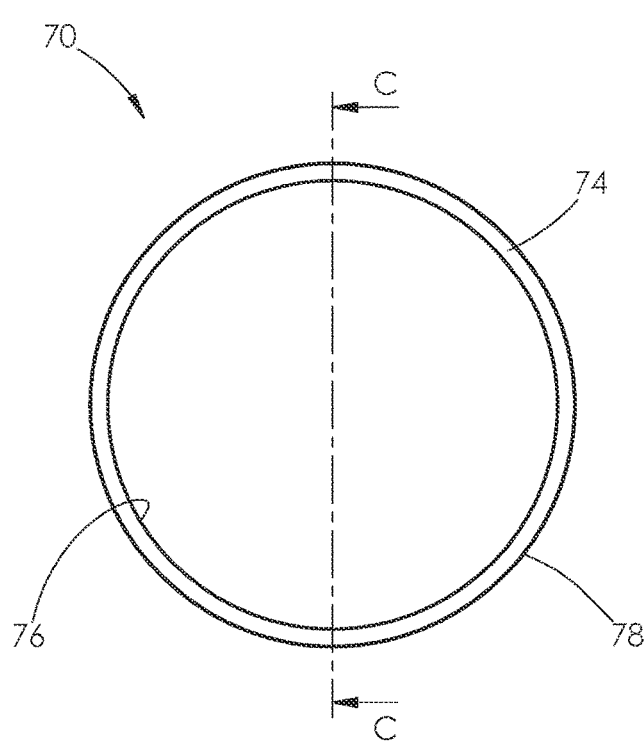
FIG. 12 is a rear elevational view of the wear ring shown in FIG. 10.
Figure 13:
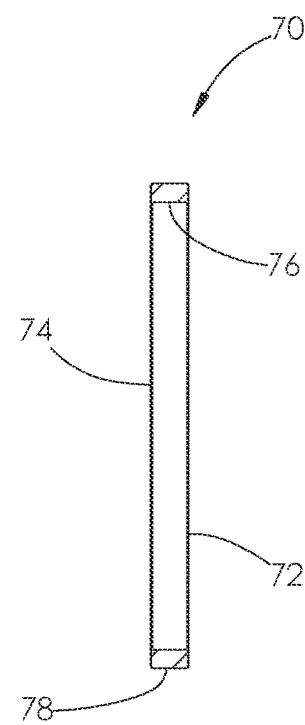
FIG. 13 is a cross-sectional view of the wear ring shown in FIG. 12, taken along line C-C.
Figure 18:
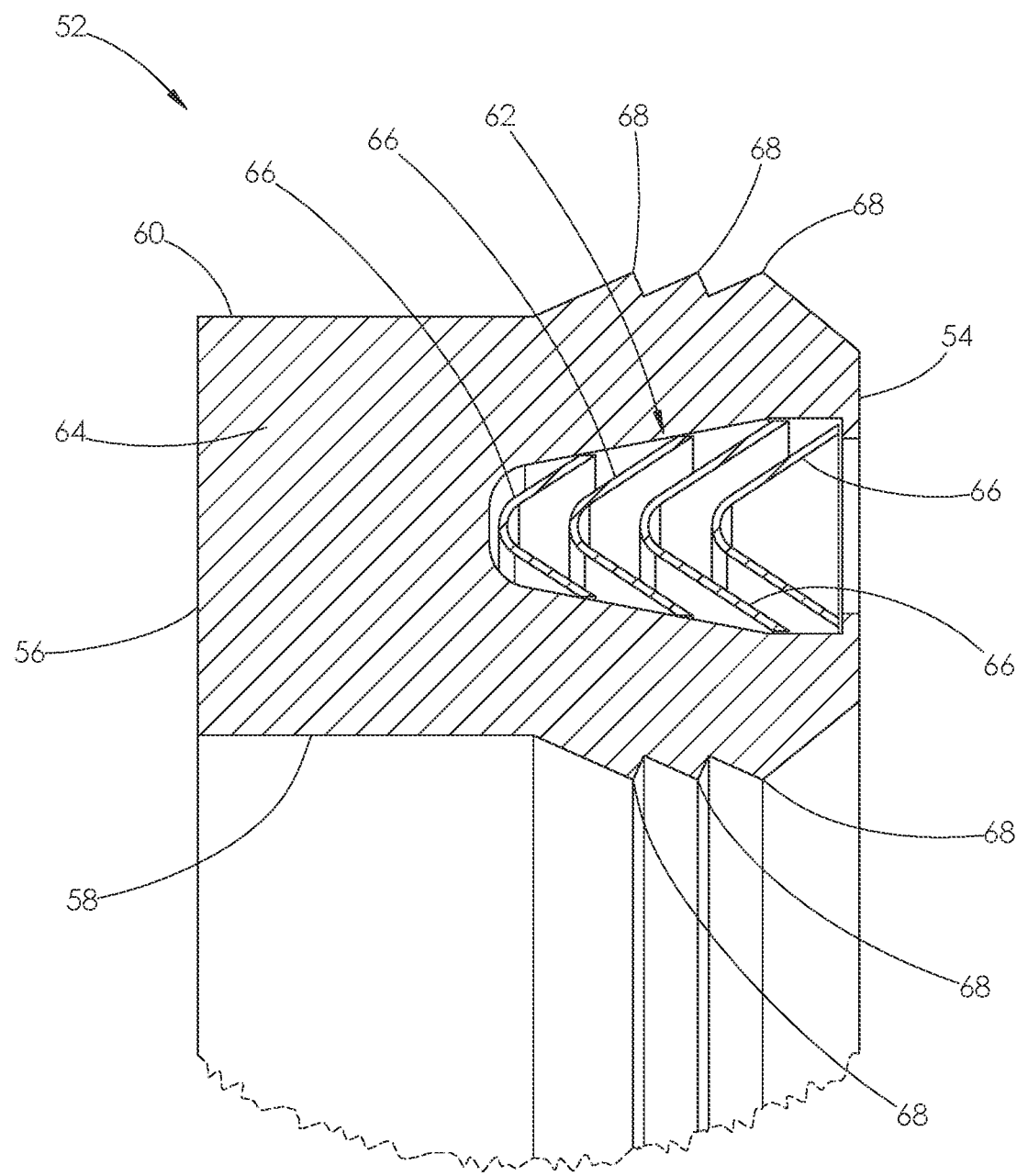
FIG. 18 is an enlarged view of area E shown in FIG. 17.
Figure 23:
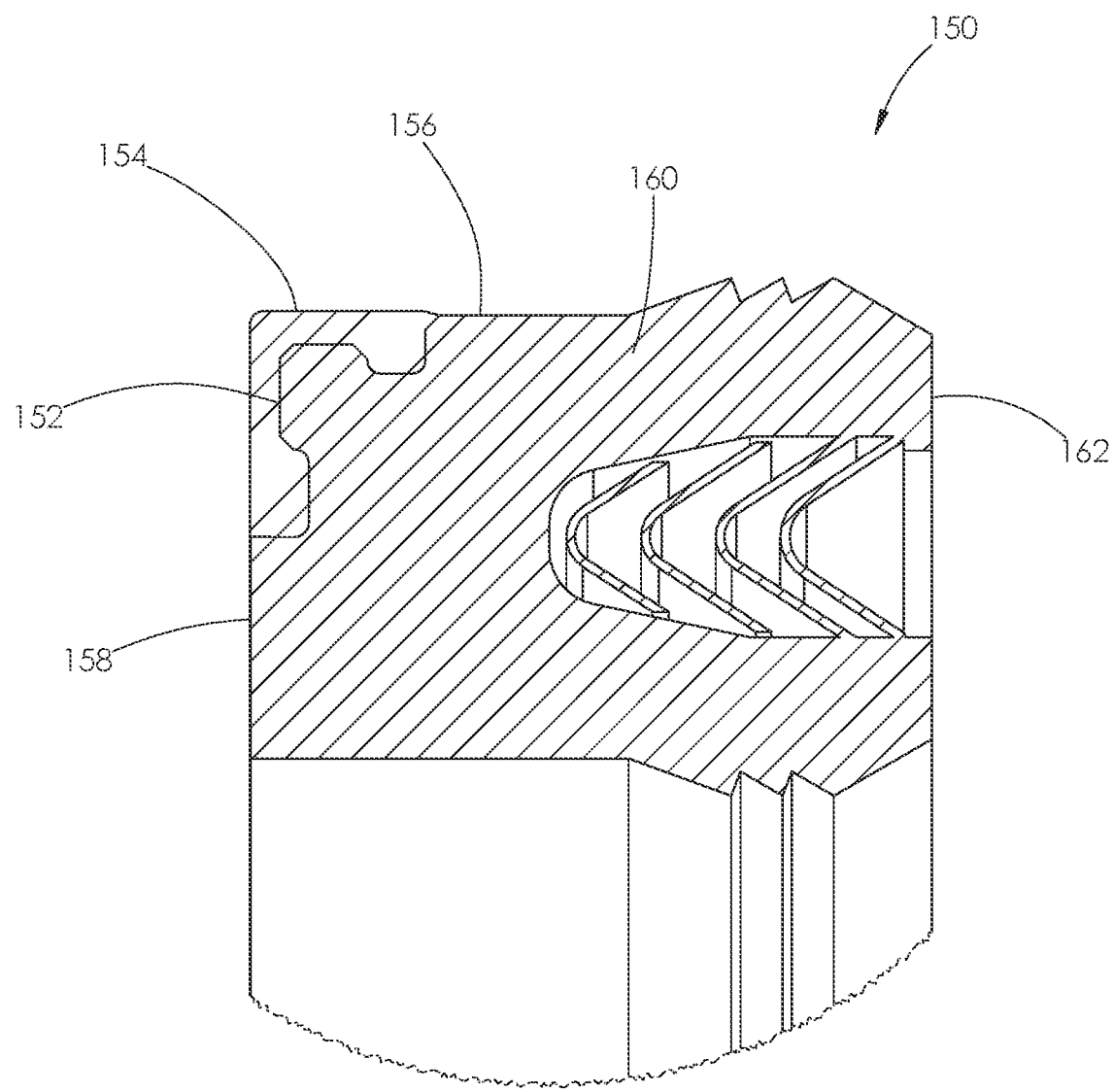
FIG. 23 is an enlarged view of area G shown in FIG. 22.
Figures 24, 25:
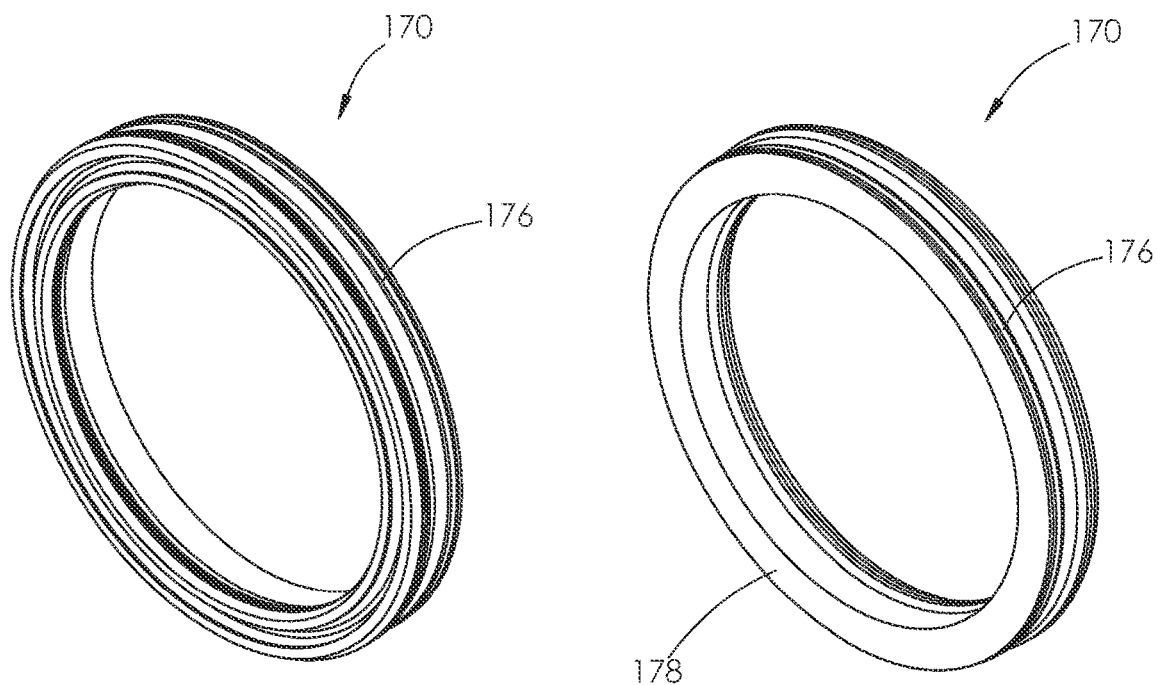
FIG. 24 is a front perspective view of another embodiment of a packing seal.
FIG. 25 is a rear perspective view of the packing seal shown in FIG. 24.
Figure 26:
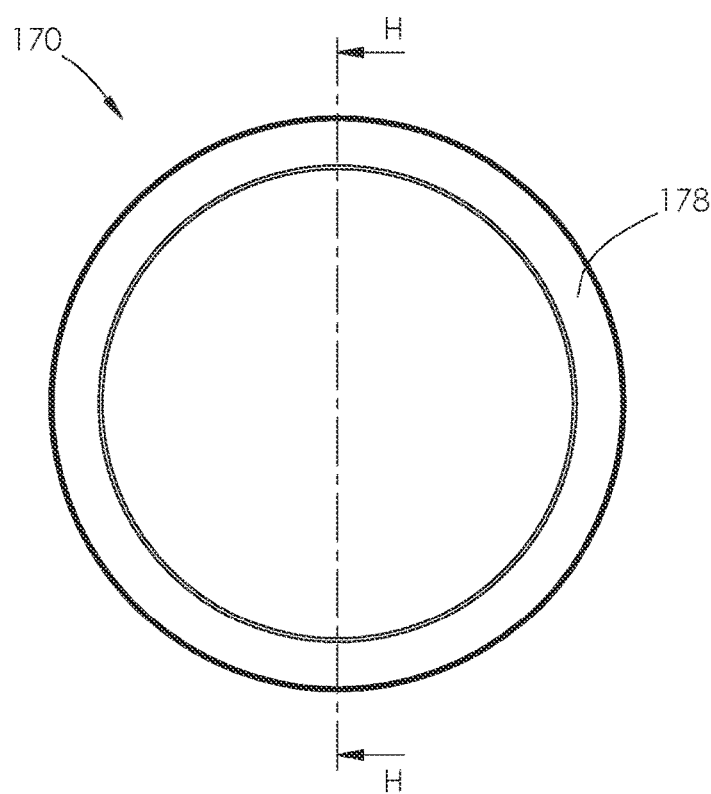
FIG. 26 is a rear elevational view of the packing seal shown in FIG. 24.
Figure 27:
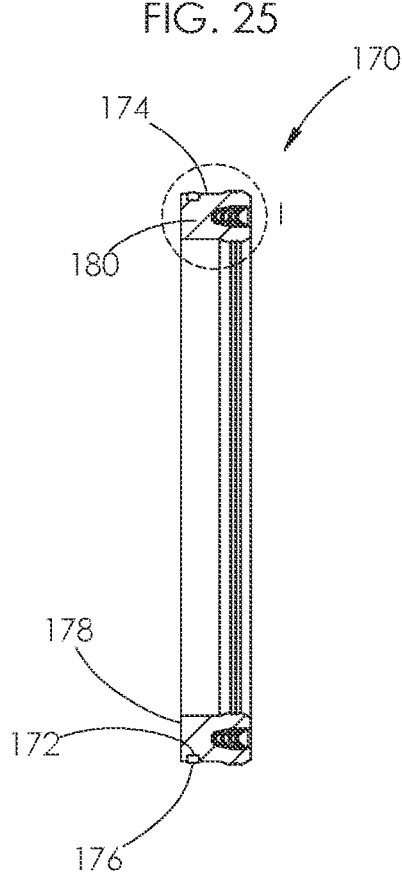
FIG. 27 is a cross-sectional view of the packing seal shown in FIG. 26 taken along line H-H.
Figure 28:
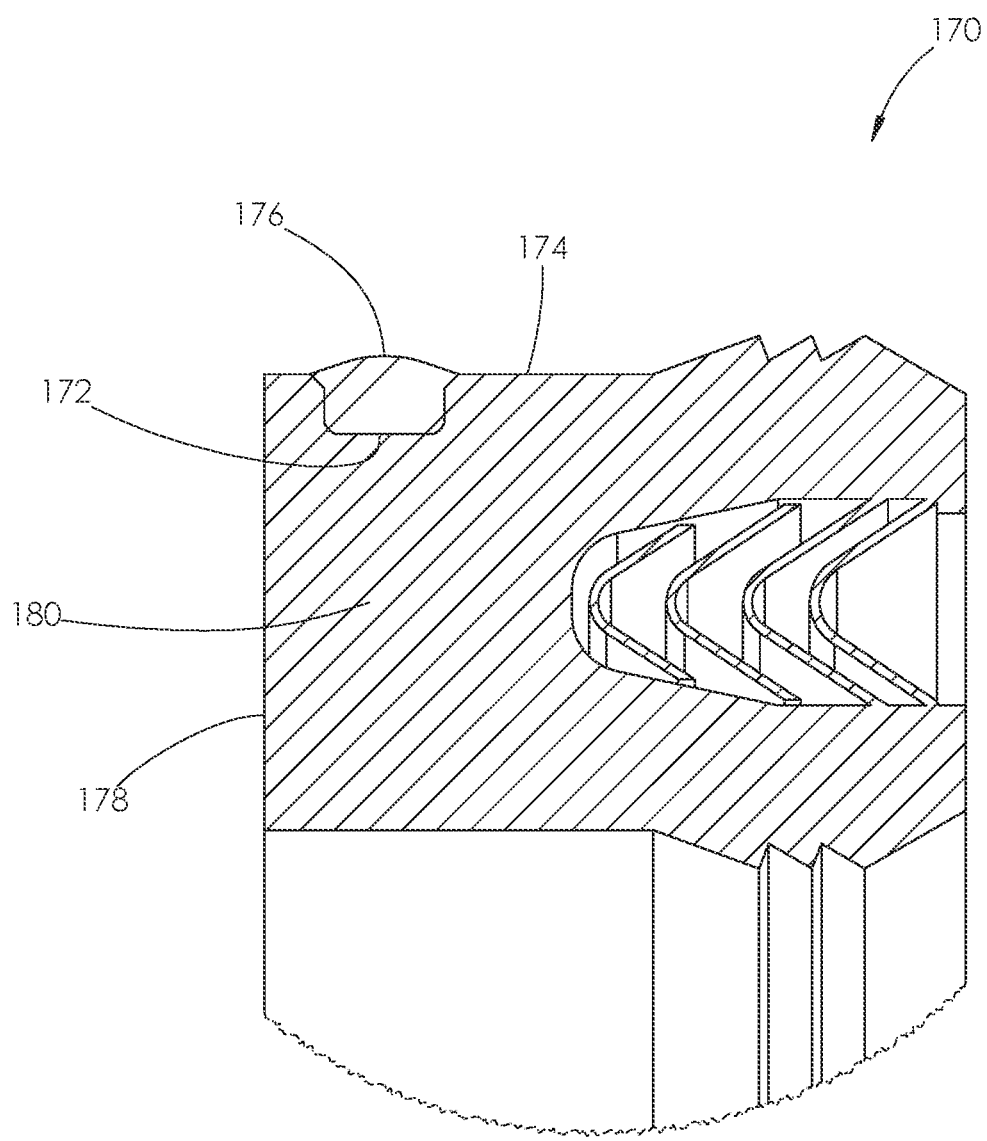
FIG. 28 is an enlarged view of area I shown in FIG. 27.
Figure 33:
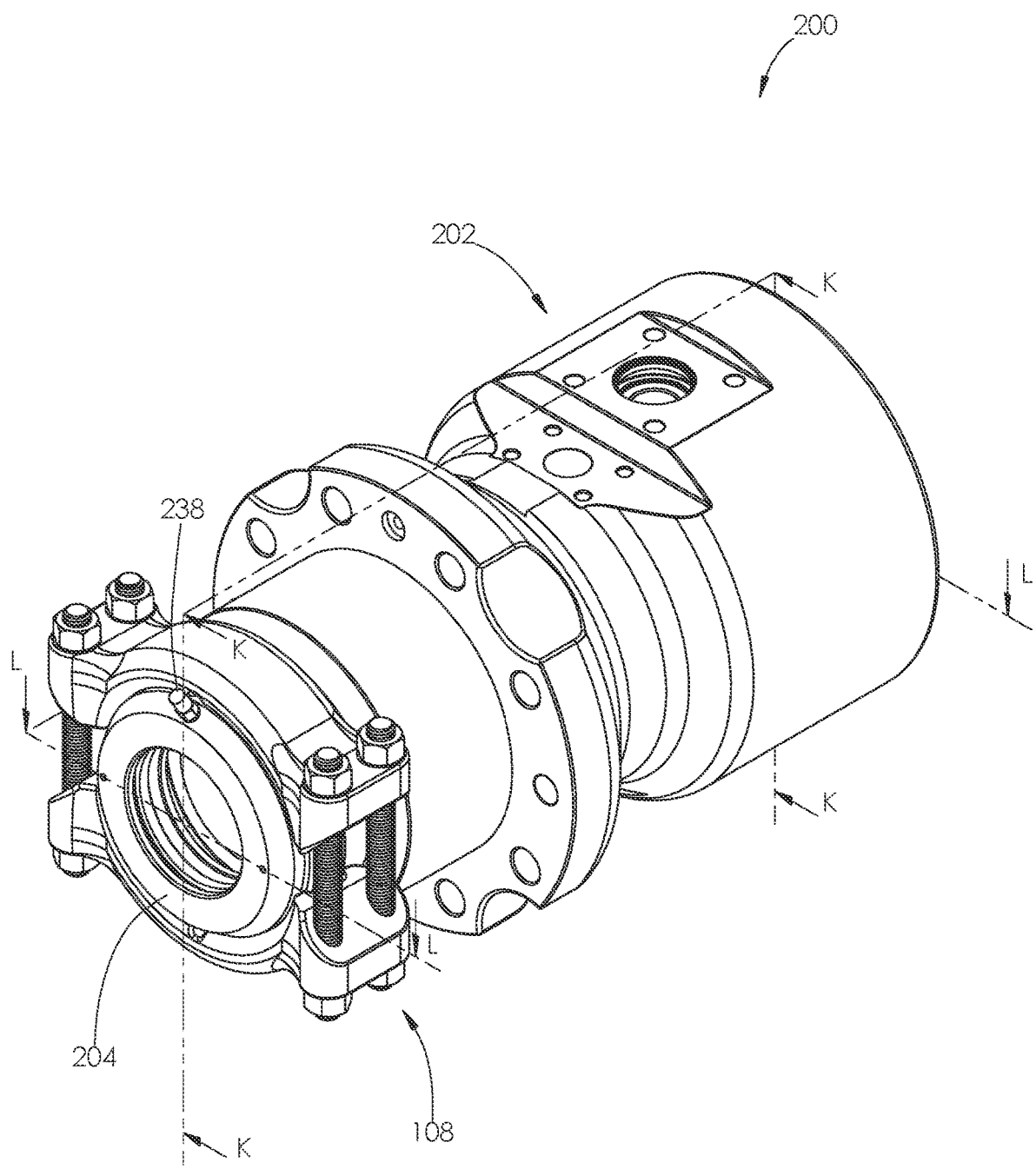
FIG. 33 is a rear perspective view of another embodiment of a fluid end section.

Turning to FIGS. 2-5, each fluid end section 12 comprises a housing 26 having a longitudinal axis 28 and opposed front and rear surfaces 30 and 32 joined by inner and outer intermediate surfaces 34 and 36, as shown in FIGS. 3 and 4. The inner intermediate surface 34 defines a horizontal bore 38 formed within the housing 26 and interconnecting the front and rear surfaces 30 and 32, as shown in FIG. 3.

Continuing with FIG. 4, fluid enters the housing 26 through upper and lower suction conduits 40 and 42. Fluid exits the housing 26 through upper and lower discharge conduits 44 and 46. The front surface 30 of the housing 26 is sealed closed by a threaded retainer, as shown for example in the '529 application. Internal threads 48 are formed in the walls of the housing 26 surrounding the horizontal bore 38 adjacent the front surface 30 for receiving the retainer.

Continuing with FIG. 4, a reciprocating plunger 50 is installed within the horizontal bore 38 and projects from the rear surface 32 of the housing 26. As the plunger 50 retracts from the housing 26, fluid is pulled from the suction conduits 40 and 42 into the horizontal bore 38. As the plunger 50 extends into the housing 26 the plunger 50 forces fluid towards the discharge conduits 44 and 46. Fluid is routed throughout the housing 26 using a fluid routing plug and suction and discharge valves, various embodiments of which are shown in the '529 application.

During operation, fluid is prevented from leaking around the plunger 50 and exiting the rear surface 32 of the housing 26 by a packing seal 52. The packing seal 52 is annular and has opposed front and rear surfaces 54 and 56 joined by inner and outer intermediate surfaces 58 and 60, as shown in FIGS. 14-18. The inner intermediate surface 58 of the packing seal 52 surrounds and engages an outer surface of the plunger 50, while the outer intermediate surface 60 seals against the walls of the housing 26 or another component installed therein, as shown in FIG. 4.

Continuing with FIGS. 14-18, traditional packing seals are solid and comprise only an elastomeric body. In contrast, the packing seal 52 comprises an energizing component 62 installed within an elastomeric body 64. The energizing component 62 is installed within the front surface 54 of the packing seal 52 and is configured to expand radially when compressed longitudinally. Such expansion causes the inner intermediate surface 58 to tightly seal against the outer surface of the plunger 50 and the outer intermediate surface 60 to tightly seal against the walls of the housing 26 or another component installed therein.

The energizing component 62 shown in the figures comprises a plurality of stacked metal pieces 66 having a V-shaped cross-section that function as a spring. Specifically, the packing seal 52 is known in the art as a multi-contact V-nested spring seal. In alternative embodiments, the energizing component may comprise other components known in the art that expand radially when compressed longitudinally. In further alternative embodiments, the energizing component may comprise one or more coiled springs configured to expand the seal regardless of any longitudinal compression.

The inner and outer surfaces 58 and 60 of the seal 52 further comprise a plurality of seal lips 68. The seal lips 68 help effectuate the sealing during operation. As the seal lips 68 wear over time, the energizing component 62 expands, pushing the lips 68 tighter against the plunger 50 and the housing 26.

Figure 78:
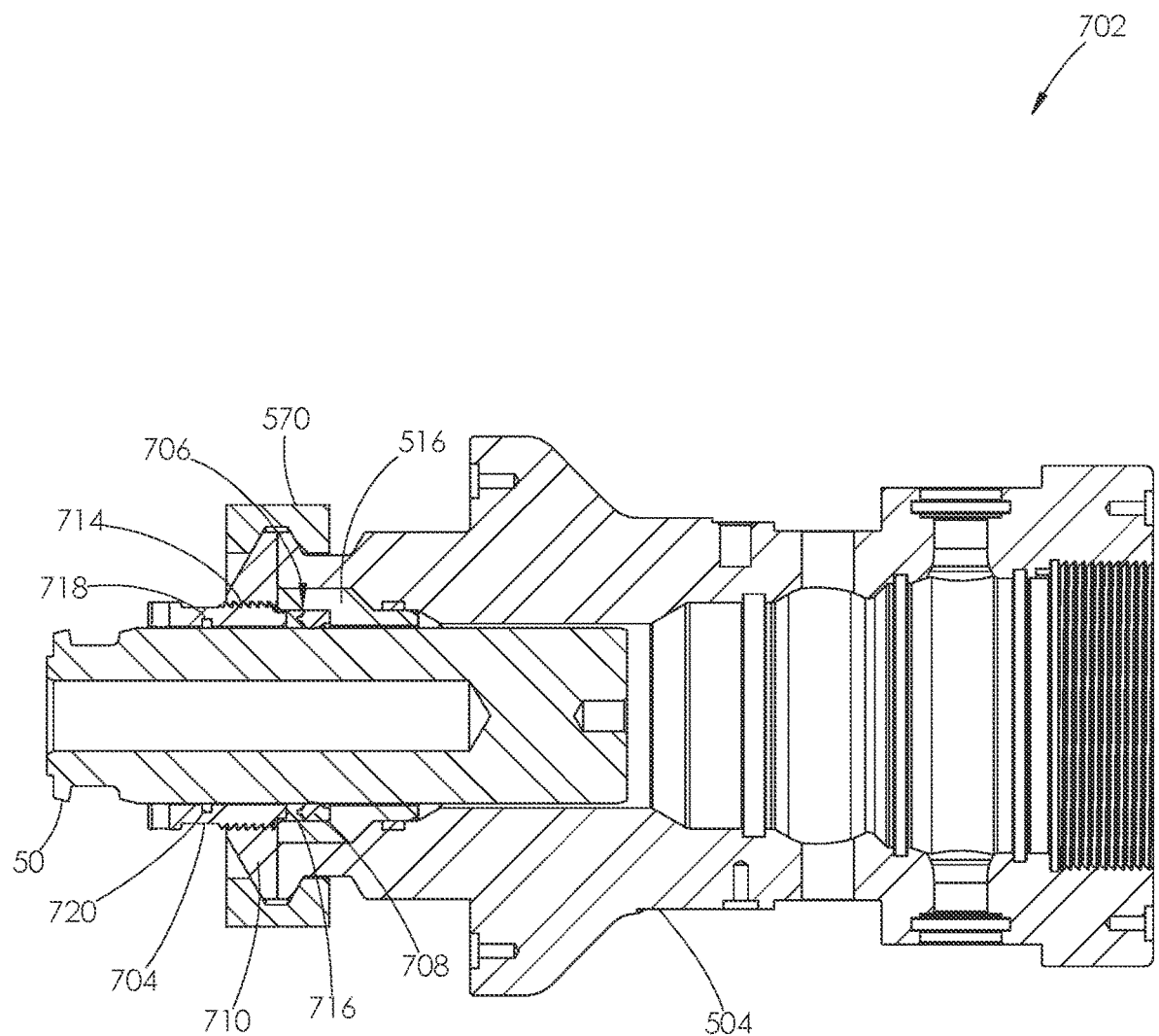
FIG. 78 is a cross-sectional view of the fluid end section shown in FIG. 76, taken along line V-V, with a plunger installed therein.
Figure 79:
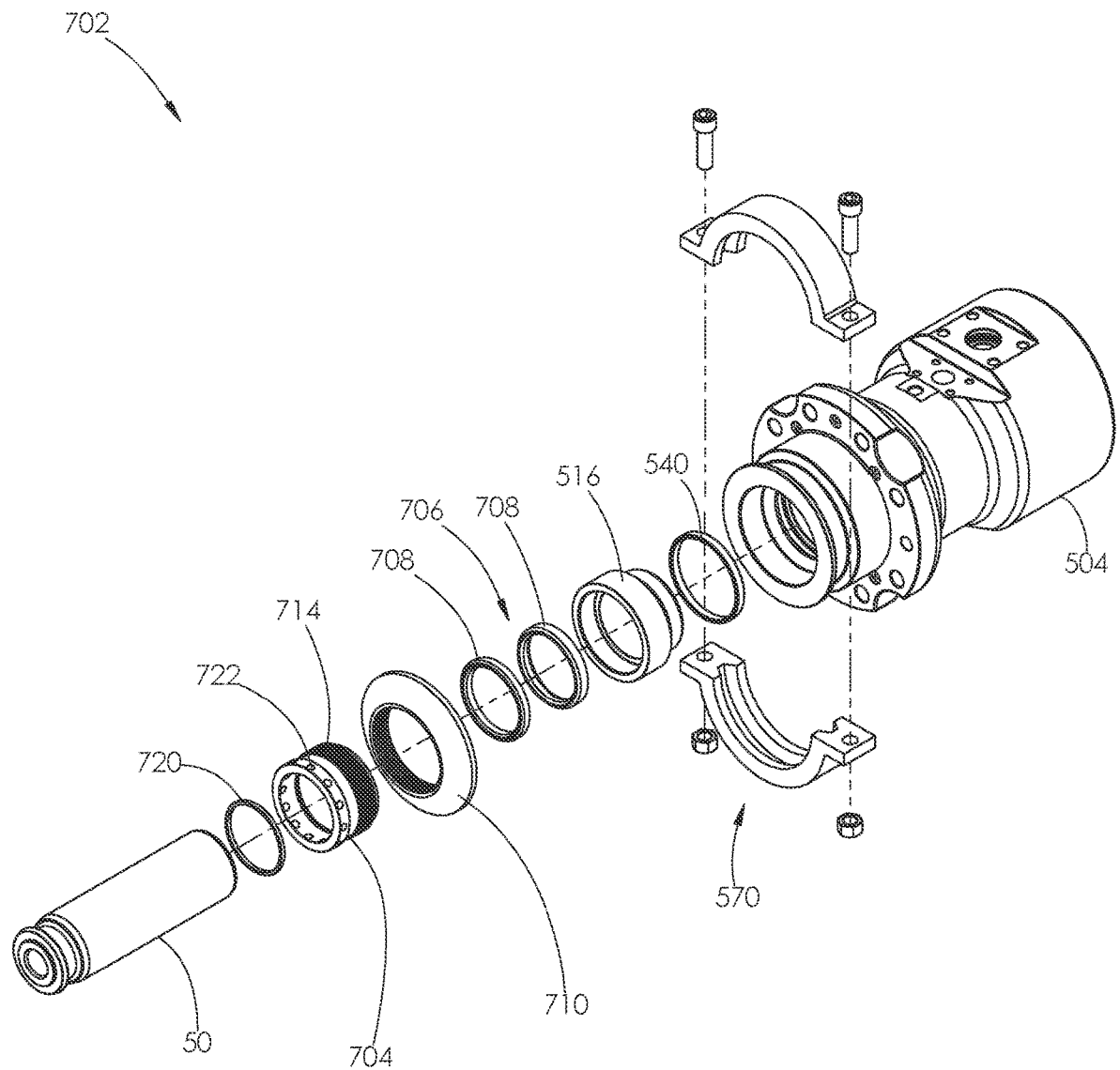
FIG. 79 is a rear perspective and exploded view of the fluid end section shown in FIG. 76, with addition of the plunger.

In traditional fluid ends, fluid is prevented from leaking from the housing by a plunger packing, which comprises a plurality of packing seals stacked on top of one another, as shown for example in FIG. 78. The plunger packing may also comprise one or more metal rings, like the metal ring 536, shown in FIG. 63. A tight seal is created by compressing the plurality of stacked seals and rings, if used, together longitudinally.

Figure 77:
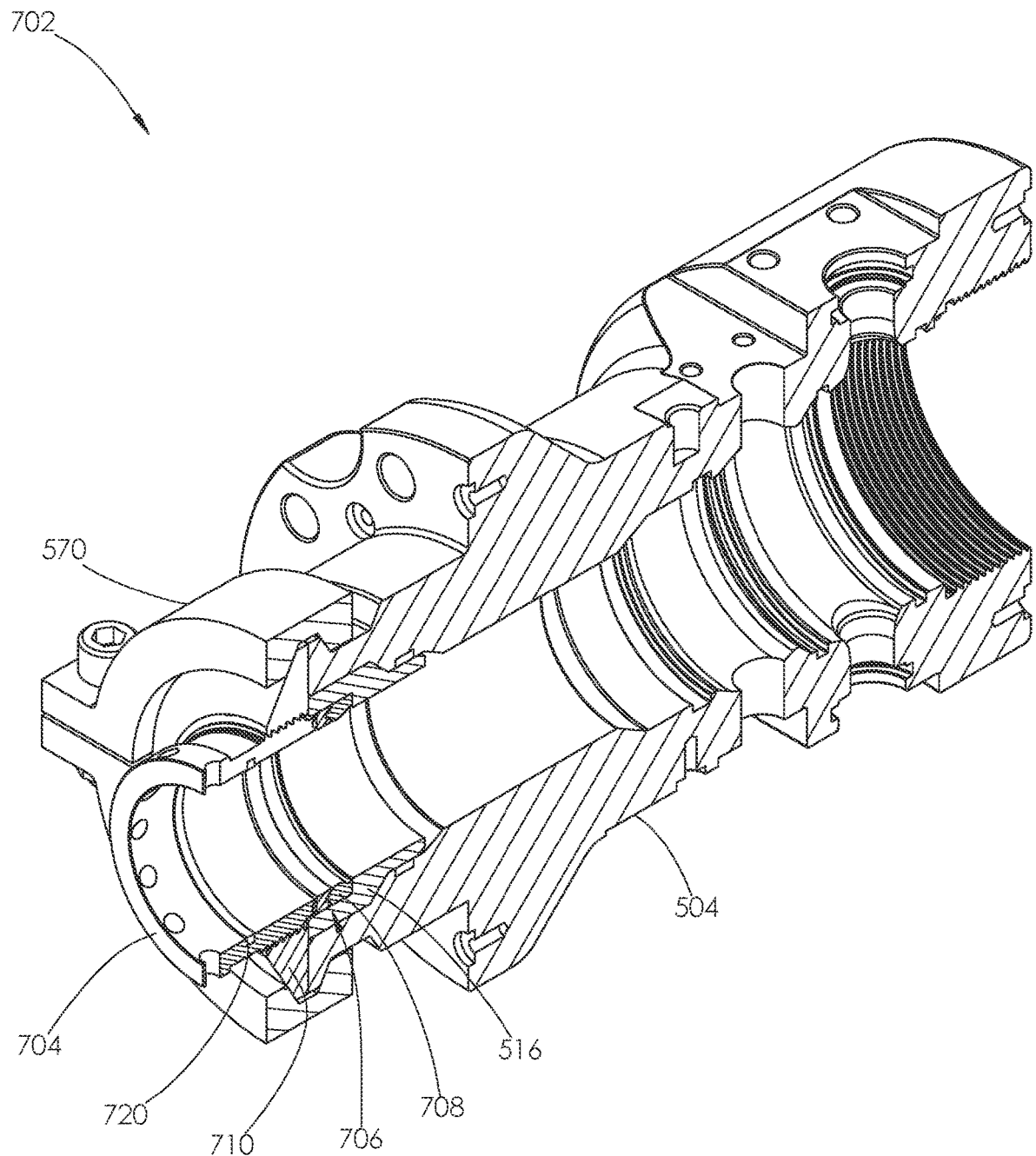
FIG. 77 is a rear perspective and cross-sectional view of the fluid end section shown in FIG. 76, taken along line V-V.

In traditional fluid ends, the plunger packing is compressed longitudinally by a packing nut, like the packing nut 704 shown for example in FIG. 77. The packing nut is typically threaded into internal threads formed in walls of the retainer surrounding the central passage. During operation, the packing seals are maintained by repeatedly tightening the packing nut within the retainer.

In contrast, the housing 26 shown in FIGS. 3 and 4 comprises one and only one packing seal 52 and no metal rings stacked on either the front or rear surfaces 54 or 56 of the seal 52. Only one packing seal 52 is necessary because the packing seal 52 comprises the energizing component 62, which allows the packing seal 52 to expand when compressed and further expand as it wears over time without applying any additional compression.

Traditional plunger packings are installed directly within the horizontal bore and engage the walls of the housing and an outer surface of the plunger. Over time, the components of the plunger packing wear against the walls of the housing, causing erosion and eventual failure of the housing. In some embodiments, the plunger packing is installed within a sleeve installed within the housing, as shown for example in FIG. 78. Over time, the plunger packing wears against the inner walls of the sleeve. If the walls of the sleeve erode, the sleeve can be removed and replaced with a new sleeve.

By using one and only one packing seal 52, a much smaller surface area of the housing 26 is subjected to potential wear from the seal 52, as shown in FIGS. 3 and 4. To protect the walls of the housing 26 from such wear, a wear ring 70 is positioned between the walls of the housing 26 and the packing seal 52.

With reference to FIGS. 10-13, the wear ring 70 is annular and is sized to surround the packing seal 52 within the housing 26, as shown in FIGS. 3 and 4. The wear ring 70 comprises opposed front and rear surfaces 72 and 74 joined by inner and outer intermediate surfaces 76 and 78. The wear ring 70 is made of a hardened and wear resistant material, such as tungsten carbide. In contrast, the housing 26 may be made of steel.

During operation, the packing seal 52 wears against the inner intermediate surface 76 of the wear ring 70 rather than the walls of the housing 26. Because the wear ring 70 is made of a harder material than the housing 26, the wear ring 70 is much more resistant to erosion. Over time, the wear ring 70 can be removed and replaced with a new wear ring 70, if needed.

Continuing with FIGS. 3 and 4, by using one and only one packing seal 52, installation and maintenance of the seal 52 is much more efficient than if using a much larger plunger packing and sleeve. The packing seal 52 and wear ring 70 are installed within a counterbore 80 formed within the housing 26 adjacent the rear surface 32. The counterbore 80 comprises a side wall 82 joined to a base 84. The side wall 82 is also joined to the rear surface 32 of the housing 26. The packing seal 52 is installed within the housing 26 such that the front surface 54 of the seal 52 engages the base 84 of the counterbore 80. The front surface 72 of the wear ring 70 likewise engages the base 84 of the counterbore 80. The wear ring 70 may be installed within the counterbore 80 prior to installing the one and only one packing seal 52.

Continuing with FIGS. 3 and 4, the rear surface 56 of the packing seal 52 projects from the rear surface 32 of the housing 26 while the rear surface 74 of the wear ring 70 is flush with the rear surface 32 of the housing 26. Thus, the wear ring 70 may have a shorter length than the packing seal 52. The packing seal 52 is compressed and held within the counterbore 80 by a retainer 86.

With reference to FIGS. 6-9, the retainer 86 comprises opposed front and rear surfaces 88 and 90 joined by inner and outer intermediate surfaces 92 and 94. The inner intermediate surface 92 defines a central passage 96 sized to receive the plunger 50, as shown in FIG. 4. The inner intermediate surface 92 further defines a first groove 98 surrounding the central passage 96 and configured to receive a seal 100, as shown in FIG. 4. The seal 100 may comprise an O-ring. The seal 100 engages the outer surface of the plunger 50 and further prevents any fluid from leaking from the fluid end section 12.

Continuing with FIG. 9, a second groove 102 is formed in the front surface 88 of the retainer 86 for receiving the rear surface 56 of the packing seal 52, as shown in FIGS. 3 and 4. The remaining portion of the front surface 88 of the retainer 86 is sized to correspond with the size and shape of the housing 26 and the wear ring 70. When the retainer 86 is positioned on the housing 26, the front surface 88 of the retainer 86 abuts the rear surfaces 32 and 74 of the housing 26 and the wear ring 70.

In alternative embodiments, the retainer 86 may not include the second groove 102. Instead, the counterbore and wear ring may be sized so that the rear surface of the packing seal is approximately flush with the rear surface of the housing and the rear surface of the wear ring. In further alternative embodiments, the front surface of the retainer may be sized to partially extend into the housing so as to abut the rear surface of the wear ring and compress the packing seal.

With reference to FIG. 4, the outer intermediate surface 36 of the housing 26 comprises a flanged portion 104 joined to the rear surface 32. Likewise, the outer intermediate surface 94 of the retainer 86 comprises a flanged portion 106 joined to the front surface 88. The retainer 86 is held firmly against the rear surface of the housing 26 by a clamp 108. The clamp 108 is configured to surround the flanged portions 104 and 106.

Continuing with FIGS. 29-32, the clamp 108 comprises upper and lower sections 110 and 112 secured together by a plurality of fasteners 114. The sections 110 and 112 each comprise opposed front and rear surfaces 116 and 118 joined by inner and outer intermediate surfaces 120 and 122. When the sections 110 and 112 are brought together, the inner intermediate surface 120 of the clamp 108 has a generally annular shape. The inner intermediate surface 120 of each section 110 and 112 is sized and shaped to correspond with the flanged portions 104 and 106.

Continuing with FIGS. 29-32, the upper section 110 comprises a pair of upper projecting portions 124 positioned on opposite sides of the section 110. A pair of upper passages 126 are formed in each upper projecting portion 124 and positioned in a side-by-side relationship. Likewise, the lower section 112 comprises two lower projecting portions 128 positioned on opposite sides of the section 112. Each lower projecting portion 128 comprises a pair of lower passages 130 positioned in a side-by-side relationship.

When the upper and lower sections 110 and 112 are brought together, the upper and lower passages 126 and 130 align with one another on opposed sides of the clamp 108.

The upper and lower sections 110 and 112 are clamped around the flanged portions 104 and 106 and secured together by the plurality of fasteners 114. The fasteners 114 shown in FIGS. 29-32 comprise a plurality of threaded studs 132 and corresponding nuts 134. A threaded stud 132 is installed within each aligned upper and lower passages 126 and 130 such that opposed ends of the stud 132 project from the upper and lower projecting portions 124 and 128. A nut 134 is threaded on each end of the stud 132 and torqued against the projecting portions 124 and 128. The tighter the nuts 134 are torqued, the tighter the clamp 108 holds to the retainer 86 and the housing 26 together.

In alternative embodiments, the projecting portions may be configured for use with different types of fasteners known in the art, such as screws or bolts. In further alternative embodiments, the projecting portions may be configured to receive one and only one fastener on each side of the clamp or receive more than two fasteners on each side of the clamp.

Turning back to FIGS. 3 and 4, by using a clamp 108 to secure the retainer 86 to the housing 26, no external threads are formed in the retainer 86 for mating with internal threads in the housing 26. Likewise, no internal threads are formed in the walls of the housing 26 adjacent the rear surface 32 of the housing 26 for mating with the retainer 86. Further, no fasteners, such as threaded studs and nuts or other like fasteners are used to secure the retainer 86 to the housing 26. Thus, no threaded openings are formed in the rear surface 32 of the housing 26 for receiving such a fastener.

The area of the housing 26 that receives the plunger 50 may be considered a dynamic section 136 of the housing 26, while the area adjacent the discharge conduits 44 and 46 may be considered a static section 138 of the housing 26. Fluid pressure within the dynamic section 136 cyclically rises and falls as the plunger 50 reciprocates. Such changing fluid pressure applies a lot of stress to the walls of the housing 26, which can lead to cracks in internal threads and failure of the housing 26. Removing the internal threads from the dynamic section 136 increases the life span of the housing 26. In contrast, cracking of internal threads is less likely in the static section 138, where fluid pressure remains relatively constant during operation.

Continuing with FIGS. 3 and 4, as discussed, the fluid end section 12 does not use a packing nut, instead compression is applied to the packing seal 52 by the retainer 86. During operation, the packing seal 52 does not need repeated maintenance because sealing is effected by the energizing component 62. Because the fluid end section 12 does not use a packing nut, no internal threads are formed in the retainer 86 for receiving a packing nut.

Turning to FIGS. 19-23, another embodiment of a packing seal 150 is shown. The packing seal 150 is identical to the packing seal 52, shown in FIGS. 14-18, but comprises a groove 152 for housing a grease seal 154. The groove 152 is partially formed within an outer intermediate surface 156 and a rear surface 158 of the seal 150. The grease seal 154 is sized to correspond with the shape of the groove 152. Thus, a portion of the grease seal 154 is positioned on the rear surface 158 of the seal 150 and a portion of the grease seal 154 is positioned on the outer intermediate surface 156 of the seal 150. The grease seal 154 may be made of an elastomer that is softer than an elastomeric body 160 of the seal 150.

When the packing seal 150 is installed within the wear ring 70, the grease seal 154 engages the retainer 86 and potentially the wear ring 70. The grease seal 154 prevents lubricant or fluid from leaking around an outer intermediate surface 156 of the seal 150, which may prevent the seal 150 from properly sealing against the plunger 50. For example, pressurized fluid or lubricant on the back side or outer intermediate surface 156 of the seal 150 may cause the seal to collapse radially, allowing pressurized fluid to leak around a front surface 162 of the seal.

Turning to FIGS. 24-28, another embodiment of a packing seal 170 is shown. The packing seal 170 is identical to the packing seal 150, but it has a groove 172 formed only in its outer intermediate surface 174 for receiving a grease seal 176. The grease seal 176 has a ring shape and does not cover any part of a rear surface 178 of the seal 170. Like the grease seal 154, the grease seal 176 is made of an elastomer that is softer than an elastomeric body 180 of the seal 170. The grease seal 176 serves the same purpose as the grease seal 154.

With reference to FIGS. 33-40, another embodiment of a fluid end section 200 is shown. The fluid end section 200 is generally identical to the fluid end section 12, but it comprises another embodiment of a housing 202 and another embodiment of a retainer 204. The retainer 204 is secured to the housing 202 using the clamp 108.

Continuing with FIGS. 34-39, the housing 202 comprises opposed front and rear surfaces 206 and 208 joined by an outer intermediate surface 210. A flanged portion 212 is formed in the outer intermediate surface 210 adjacent the rear surface 208. The housing 202 is identical to the housing 26, shown in FIGS. 3 and 4, but the housing 202 comprises a stress reduction area 214 formed in its outer intermediate surface 210. The stress reduction area 214 joins a cylindrical portion 216 of the intermediate surface 210 and the flanged portion 212.

During operation, a cyclic stress is created in the flanged portion 212 of the housing 202. The cyclic stress is caused by the retainer 204 pushing away from the rear surface 208 of the housing 202 and the clamp 108 during operation. The stress reduction area 214 reduces the cyclic stress in the flanged portion 212 during operation.

Figure 38:
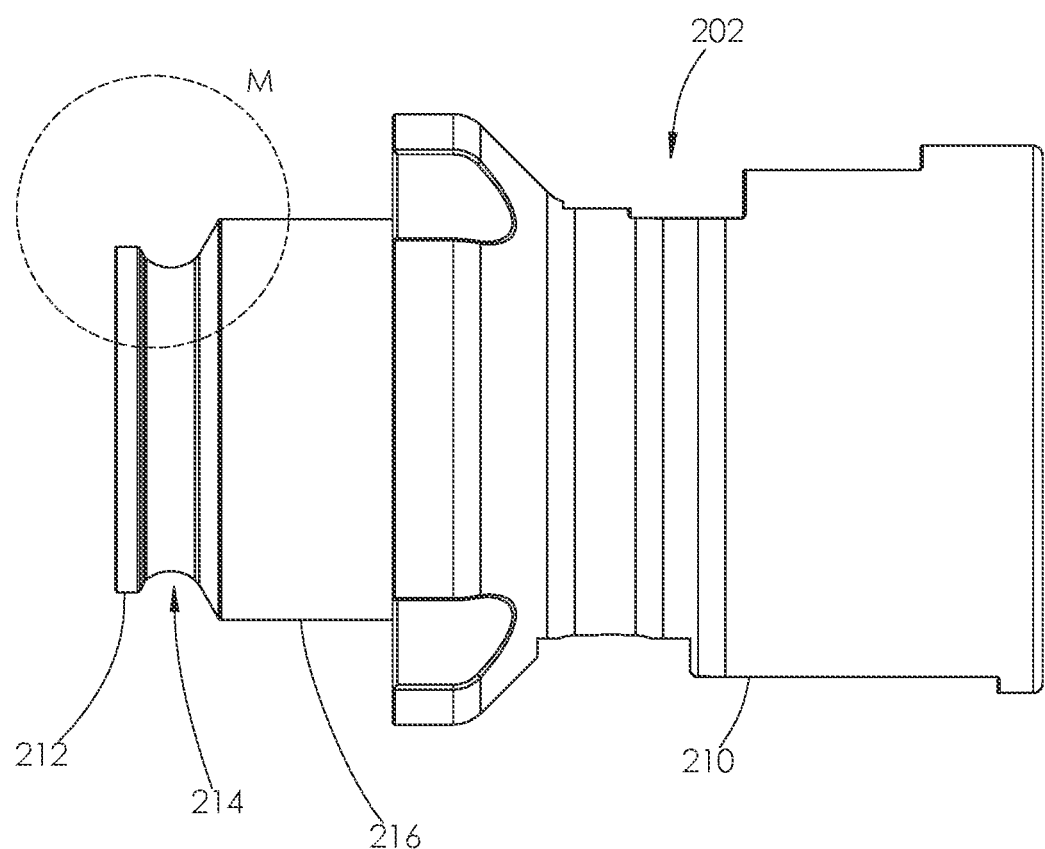
FIG. 38 is a side elevational view of the housing used with the fluid end section shown in FIG. 33.
Figure 39:
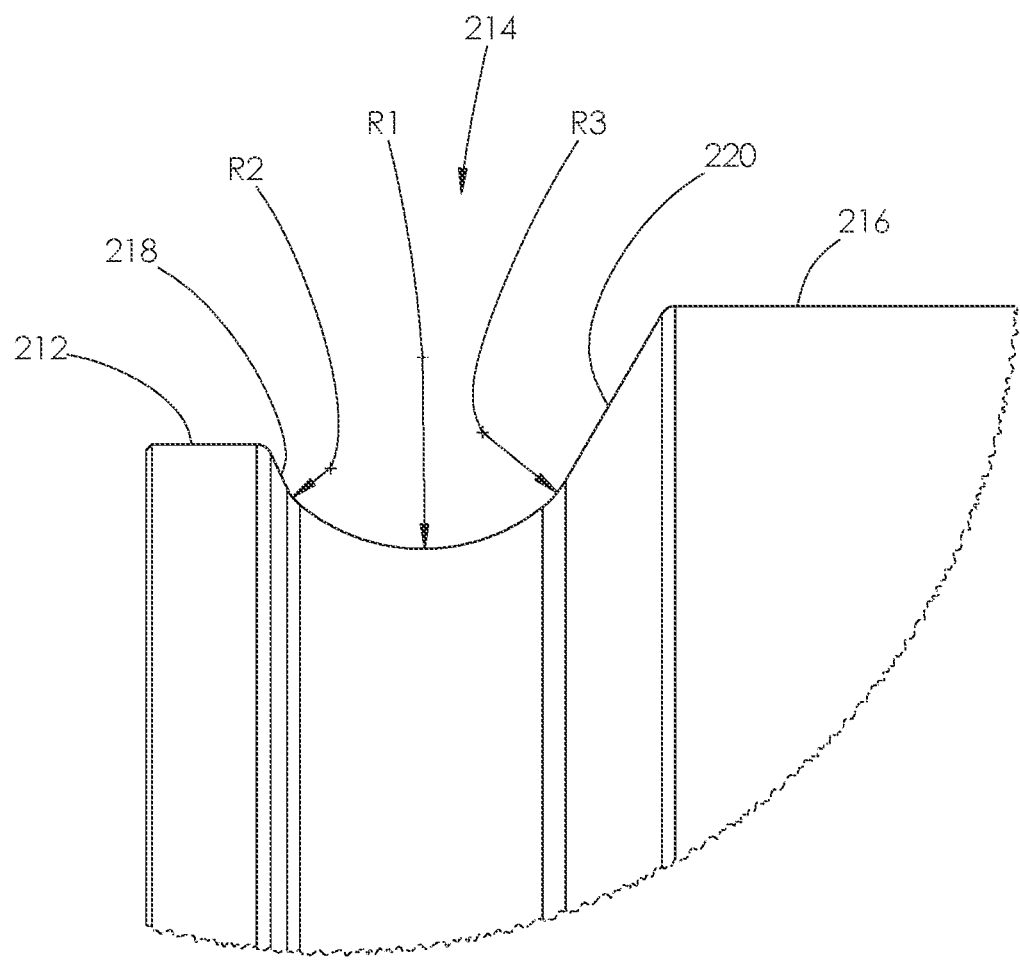
FIG. 39 is an enlarged view of area M shown in FIG. 38.
Figure 40:
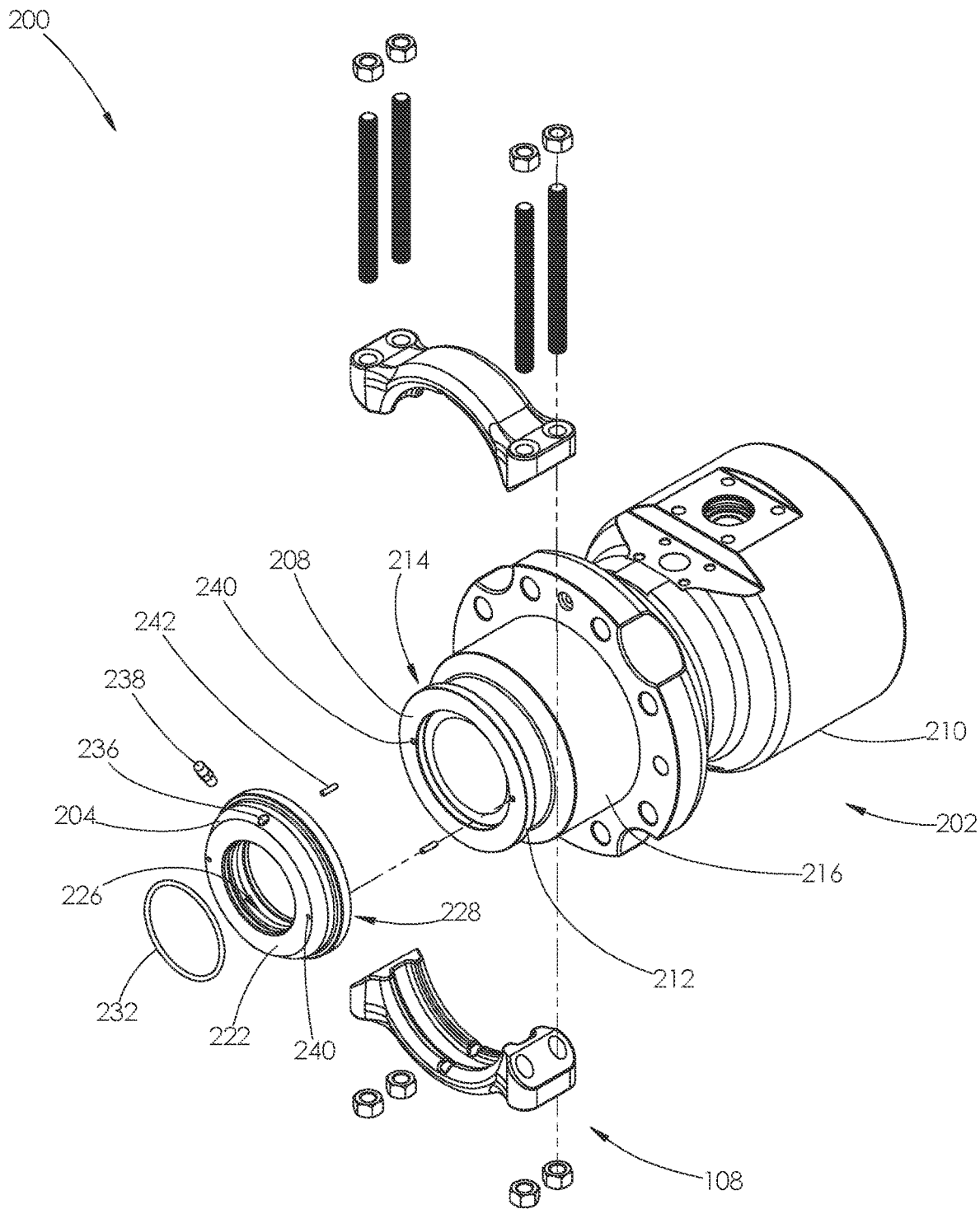
FIG. 40 is a rear perspective and exploded view of the fluid end section shown in FIG. 33.
Figure 41:
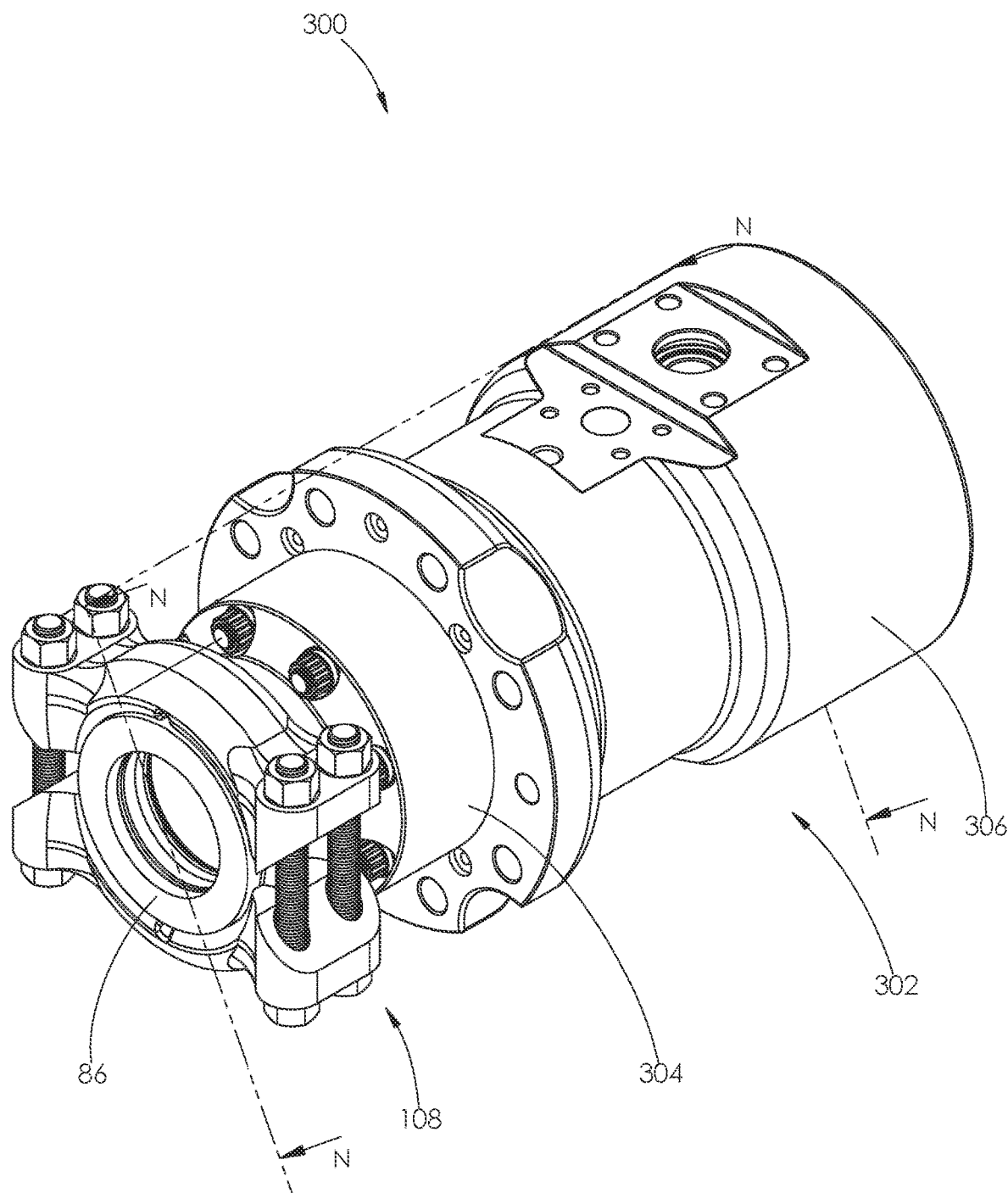
FIG. 41 is a rear perspective view of another embodiment of a fluid end section.
Figure 42:
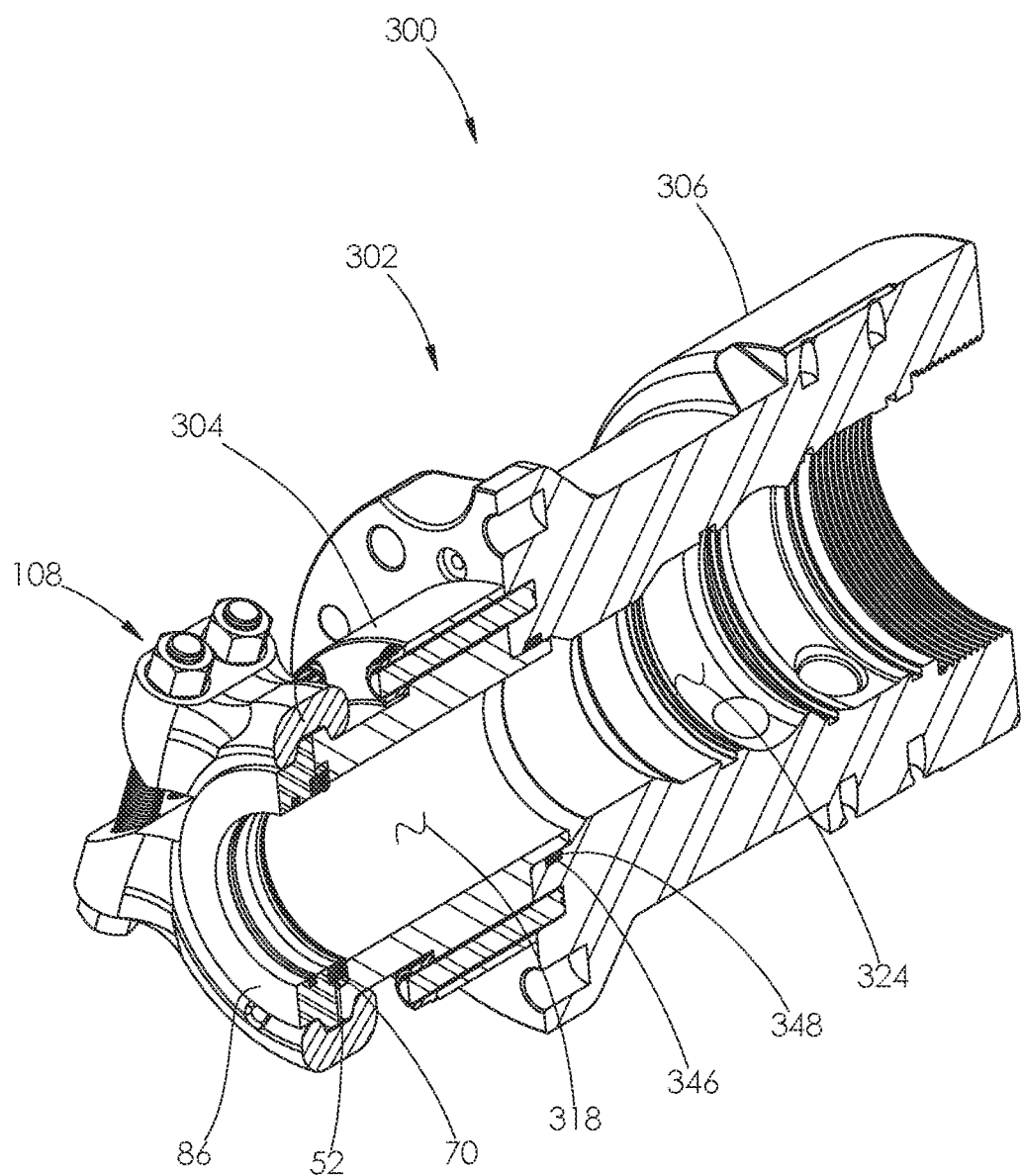
FIG. 42 is a rear perspective and cross-sectional view of the fluid end section shown in FIG. 41, taken along line N-N.

Turning to FIGS. 38 and 39, the stress reduction area 214 comprises a first radius, R1, a second radius, R2, and a third radius, R3. R2 and R3 are positioned on opposite sides of R1. R1 is greater than R2 and R3. R2 and R3 may be equal or different in size. R2 joins the flanged portion 212 by a first beveled surface 218. R3 joins the cylindrical portion 216 by a second beveled surface 220. R2 and R3 help transition the first and second beveled surfaces 218 and 220 into R1.

Figure 35:
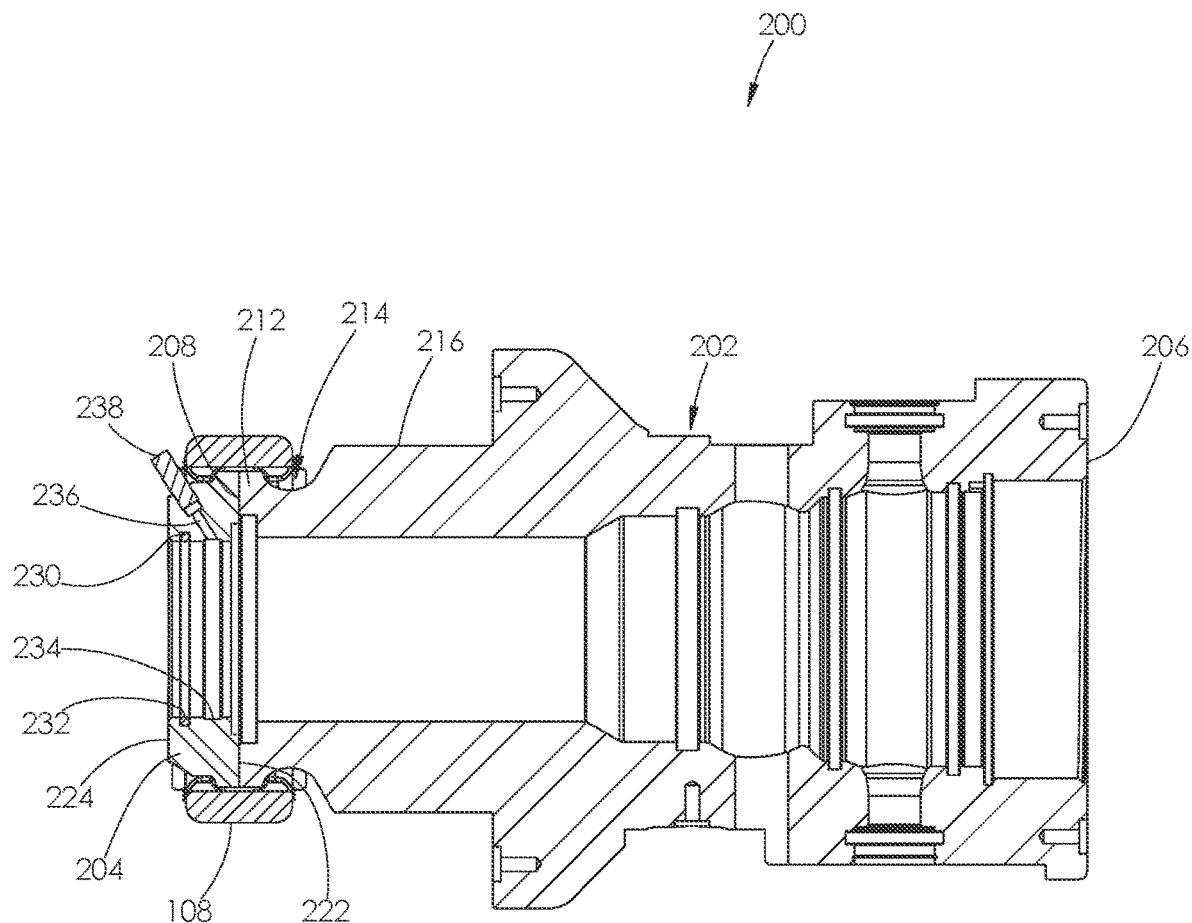
FIG. 35 is a cross-sectional view of the fluid end section shown in FIG. 33, taken along line K-K.
Figure 37:
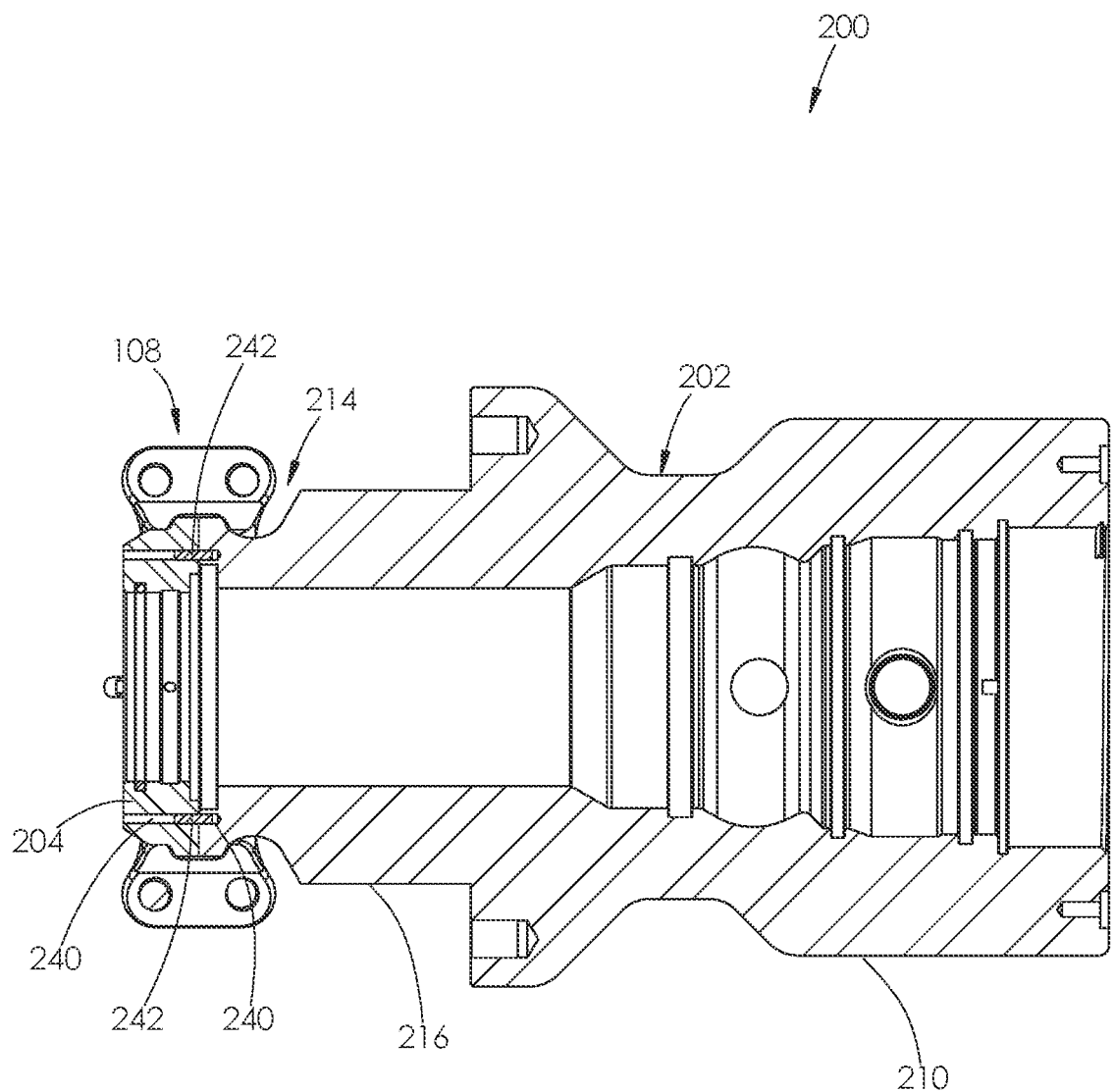
FIG. 37 is a cross-sectional view of the fluid end section shown in FIG. 33, taken along line L-L.

When the clamp 108 is positioned around the flanged portion 216, at least a portion of the clamp 108 engages the first beveled surface 218 and at least a portion of the clamp 108 engages R2, as shown in FIGS. 35 and 37. Alternatively, the clamp 108 may only engage the first beveled surface 218. During operation, R1 carries most of the load applied to the flanged portion 212 of the housing 202 by the clamp 108. The shape of R1 helps reduce stress on the housing 202 during operation.

Figure 34:
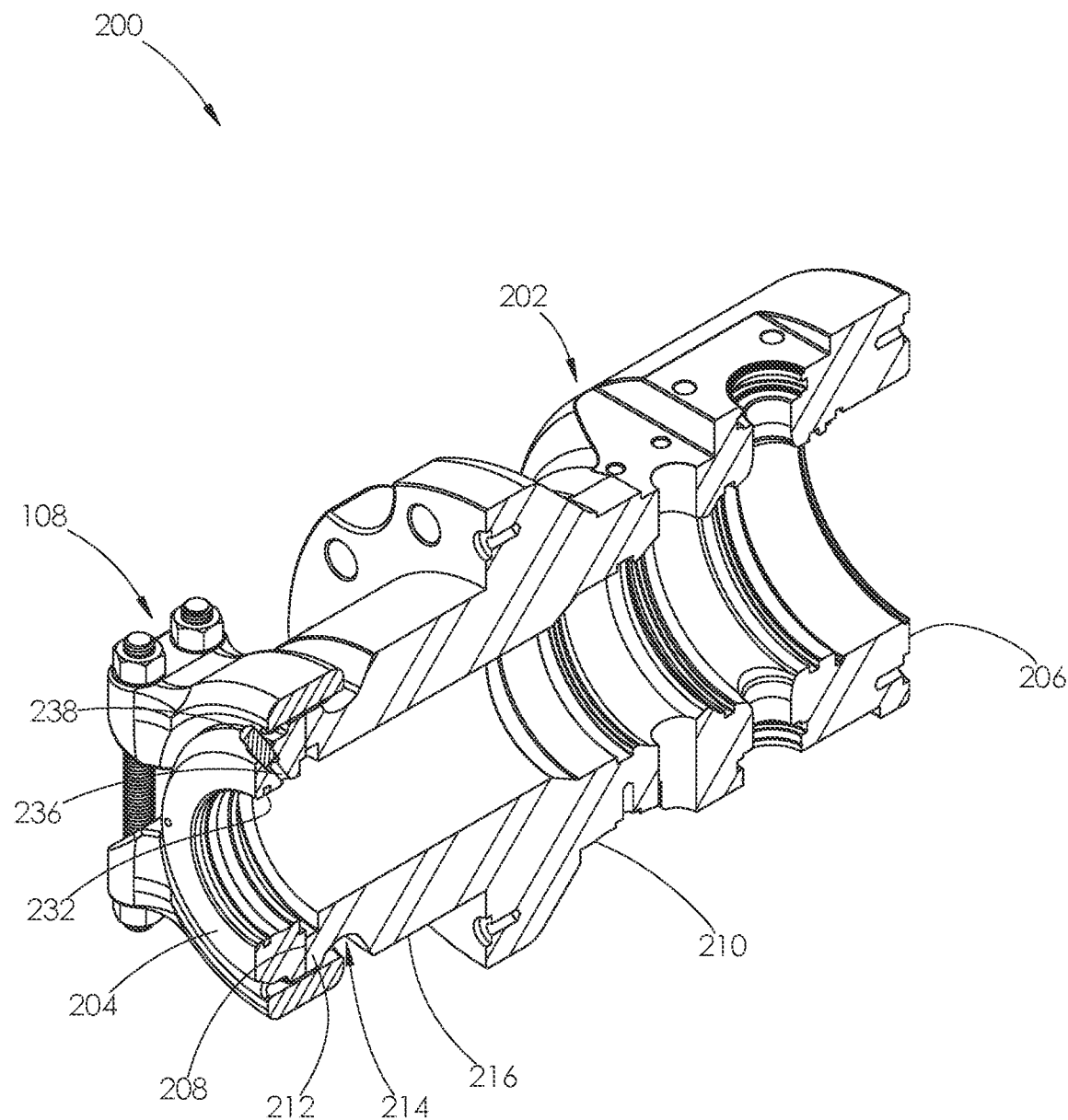
FIG. 34 is a rear perspective and cross-sectional view of the fluid end section shown in FIG. 33, taken along line K-K.

Turning to FIGS. 34 and 35, the retainer 204 comprises opposed front and rear surfaces 222 and 224 joined by inner and outer intermediate surfaces 226 and 228. An annular groove 230 is formed in the inner intermediate surface 226 for housing a seal 232. The retainer 204 is generally identical to the retainer 86, but it further comprises an annular channel 234 and an angled lube port 236. The annular channel 234 is formed in the inner intermediate surface 226 between the groove 230 and the front surface 222 of the retainer 204. The angled lube port 236 interconnects the channel 234 and the outer intermediate surface 228 of the retainer 204.

During operation, lubricant may be delivered to the plunger 50 and other components of the fluid end section 200 using the lube port 236. The channel 234 provides space for lubricant to flow within the retainer 204. The retainer 204 may have a greater length than the retainer 86 to accommodate the lube port 236. A plug 238 is shown installed within the lube port 236. During operation, the plug 238 may be removed and replaced with a coupler used to supply lubricant to the lube port 236.

Figure 36:
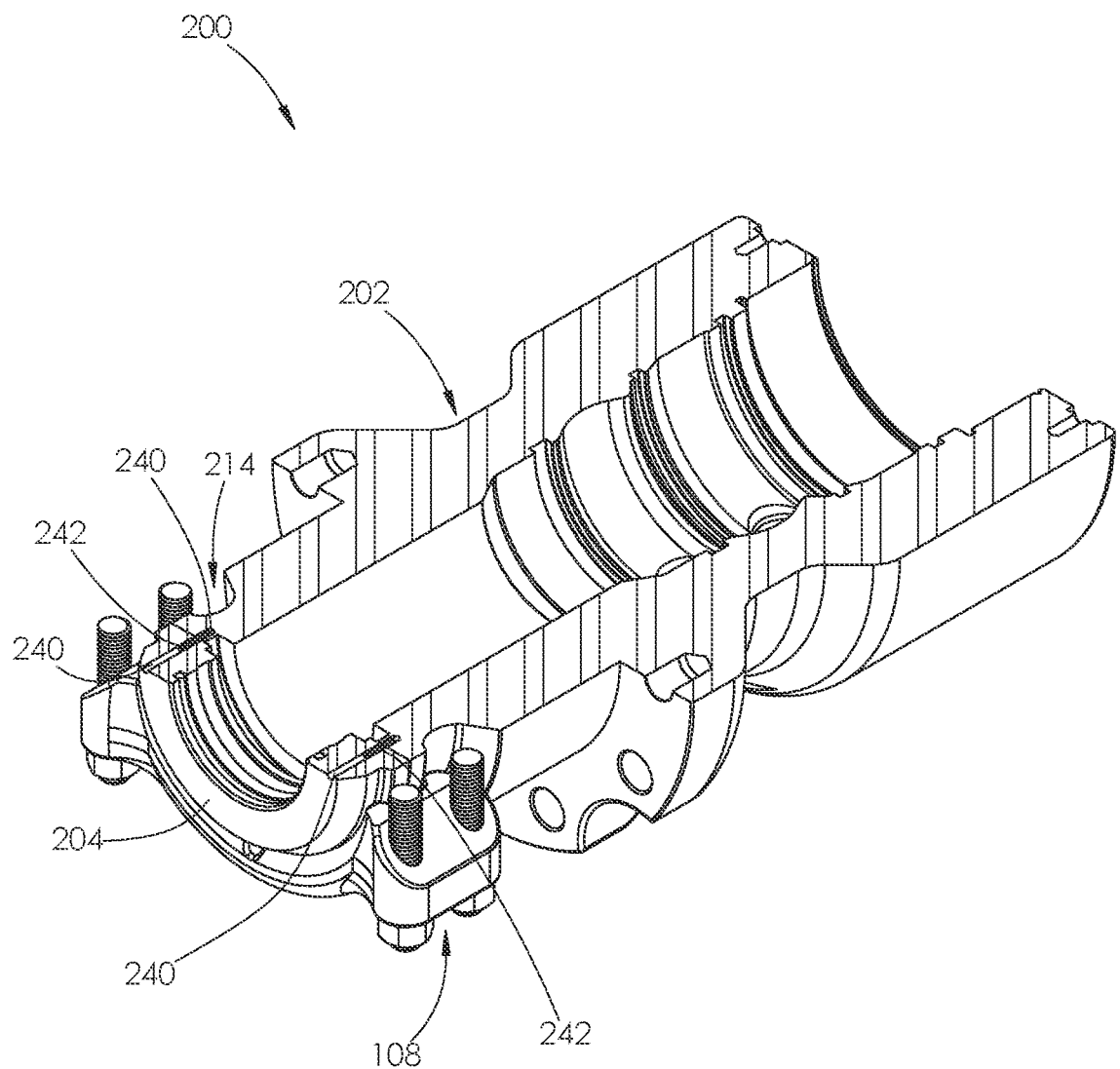
FIG. 36 is a rear perspective and cross-sectional view of the fluid end section shown in FIG. 33, taken along line L-L.

Turning to FIGS. 36 and 37, the housing 202 and retainer 204 may each further comprise one or more corresponding openings 240 for receiving one or more dowel pins 242. The dowel pins 242 help properly align the retainer 204 on the housing 202 so that the lube port 236 is easily accessible.

With reference to FIGS. 41-48, another embodiment of a fluid end section 300 is shown. The fluid end section 300 is generally identical to the fluid end section 12, but it comprises another embodiment of a housing 302. The housing 26 is of single piece construction, while the housing 302 has been separated into two pieces-a first section 304 and a second section 306. The first section 304 is attached to the second section 306 by a plurality of fasteners 308. The first section 304 is also characterized as a removable stuffing box 304.

The stuffing box 304 carries the one and only one packing seal 52, wear ring 70, retainer 86, and the clamp 108, while the fluid routing components of fluid end section 300 are contained within the second section 306. Fluid enters and exits housing 302 within the second section 306. In operation, if any portion of the stuffing box 304 fails, the stuffing box 304 can be removed and replaced with a new stuffing box 304 without having to replace the second section 306.

Figure 43:
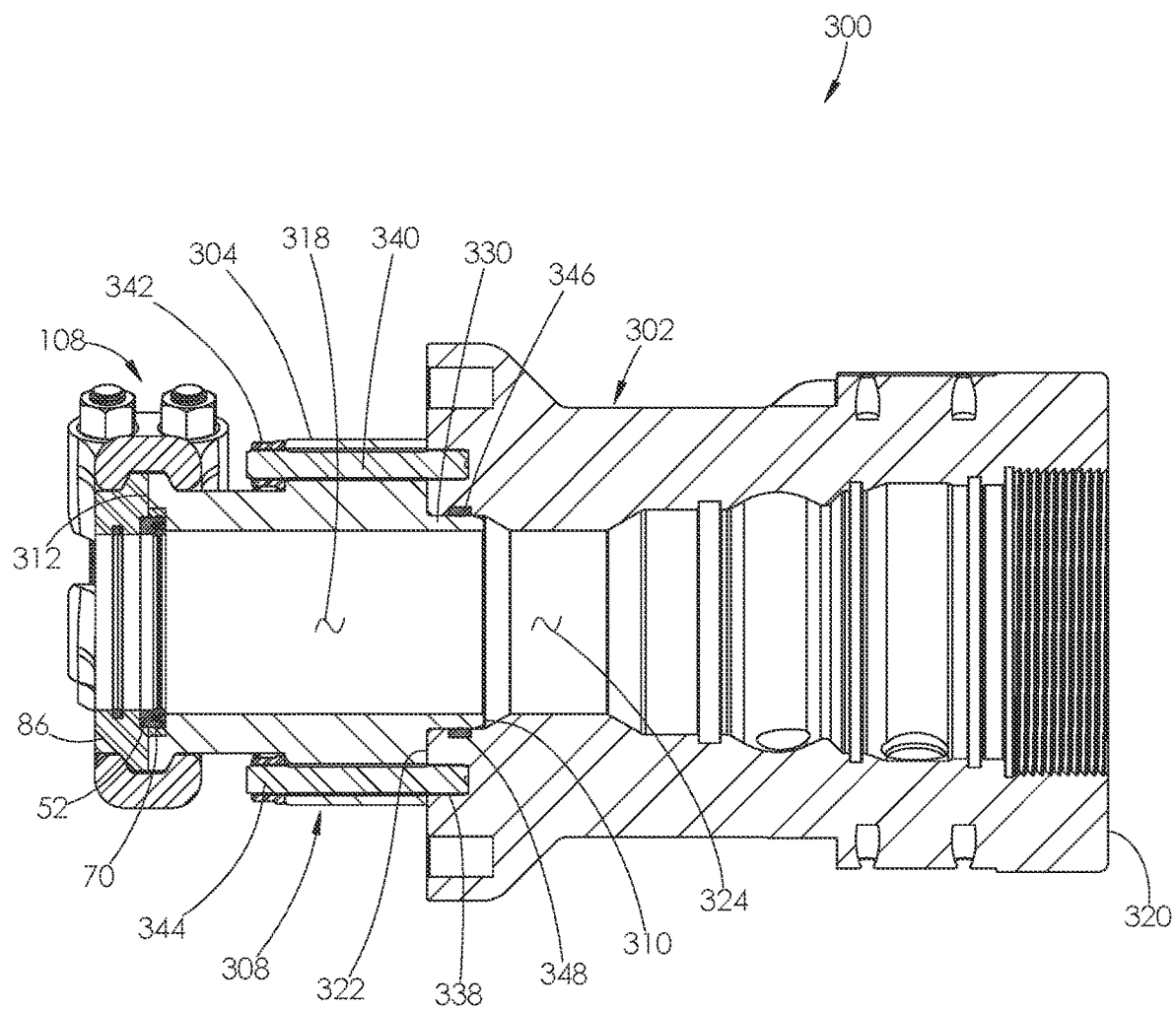
FIG. 43 is a cross-sectional view of the fluid end section shown in FIG. 41, taken along line N-N.

Continuing with FIGS. 43-48, the stuffing box 304 comprises opposed front and rear surfaces 310 and 312 joined by inner and outer intermediate surfaces 314 and 316. A first horizontal bore 318 is formed within the stuffing box 304 and interconnects the front and rear surfaces 310 and 312. Likewise, the second section 306 comprises opposed front and rear surfaces 320 and 322 interconnected by a second horizontal bore 324, as shown in FIG. 43. When the stuffing box 304 is attached to the second section 306, the first horizontal bore 318 forms an extension of the second horizontal bore 324, as shown in FIG. 43.

Continuing with FIGS. 45-48, the outer intermediate surface 316 of the stuffing box 304 comprises a connection portion 326 positioned intermediate a flanged portion 328 and a sealing portion 330. The flanged portion 328 joins the rear surface 312 of the stuffing box 304 and is identical to the flanged portion 104 formed on the housing 26, shown in FIG. 4, and is configured to engage the clamp 108.

The connection portion 326 has a greater diameter than the remainder of the stuffing box 304 and comprises opposed first and second surfaces 332 and 334. A plurality of passages 336 are formed in the connection portion 326 and interconnect the first and second surfaces 332 and 334. The plurality of passages 336 surround the first horizontal bore 318.

The sealing portion 330 of the stuffing box 304 is sized to be received within the second horizontal bore 324 formed in the second section 306. The sealing portion 330 is installed within the second horizontal bore 324 until the second surface 334 of the connection portion 326 abuts the rear surface 322 of the second section 306.

Figure 44:
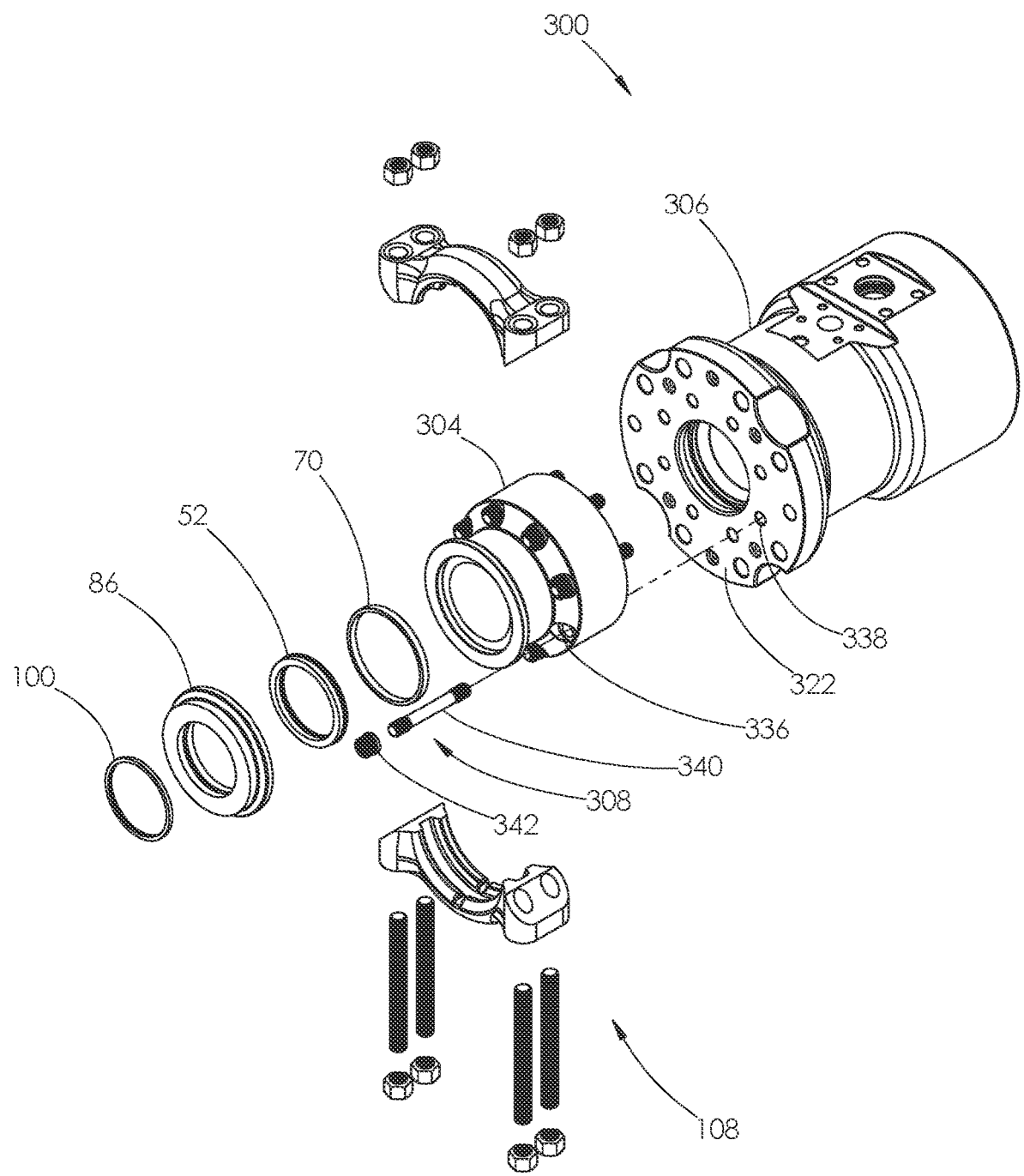
FIG. 44 is a rear perspective and exploded view of the fluid end section shown in FIG. 41.
Figure 45:
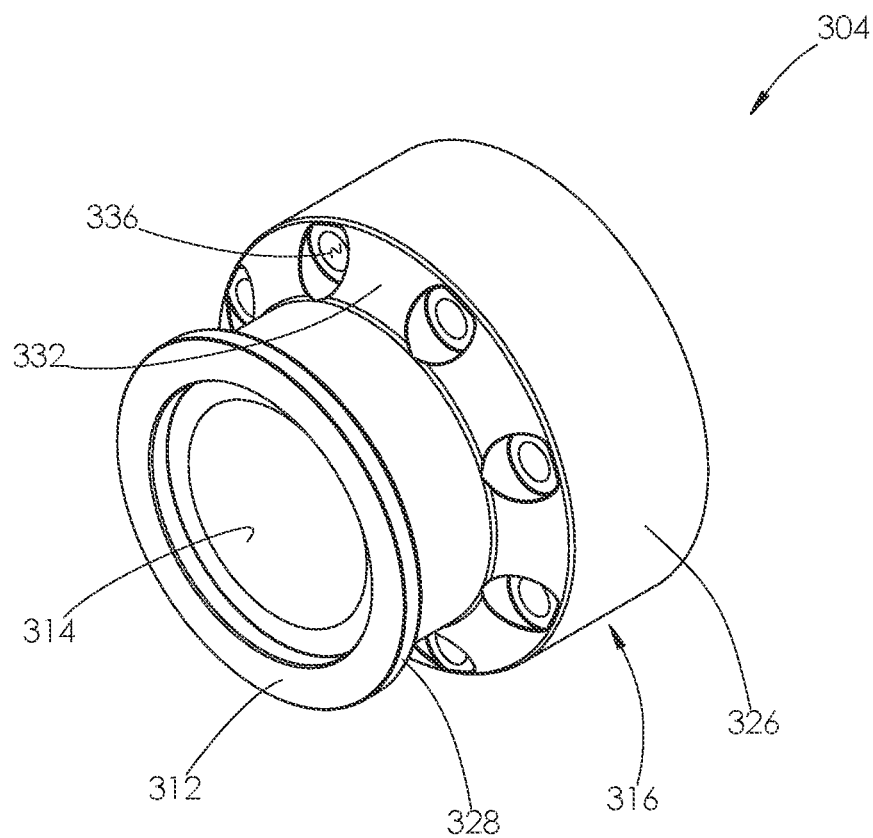
FIG. 45 is a rear perspective view of the stuffing box used with the fluid end section shown in FIG. 41.
Figure 46:
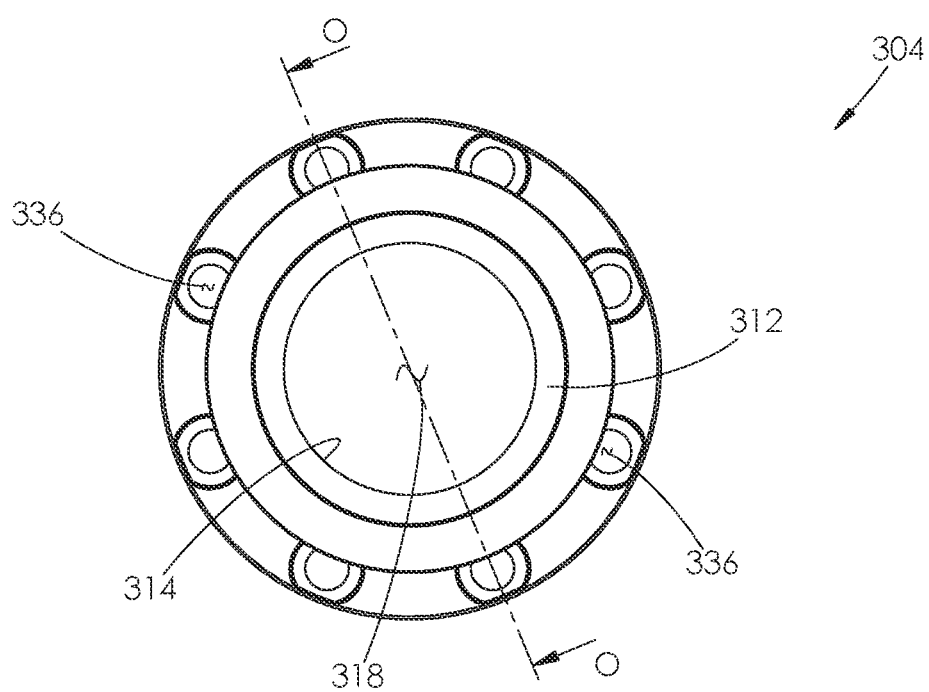
FIG. 46 is a rear elevational view of the stuffing box shown in FIG. 45.
Figure 47:
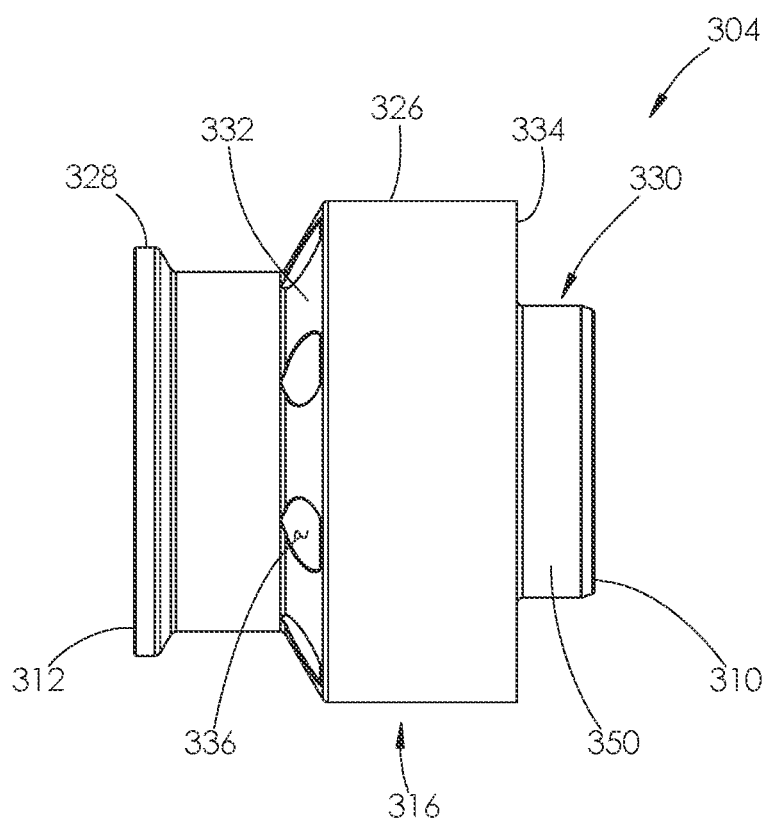
FIG. 47 is a side elevational view of the stuffing box shown in FIG. 45.
Figure 48:
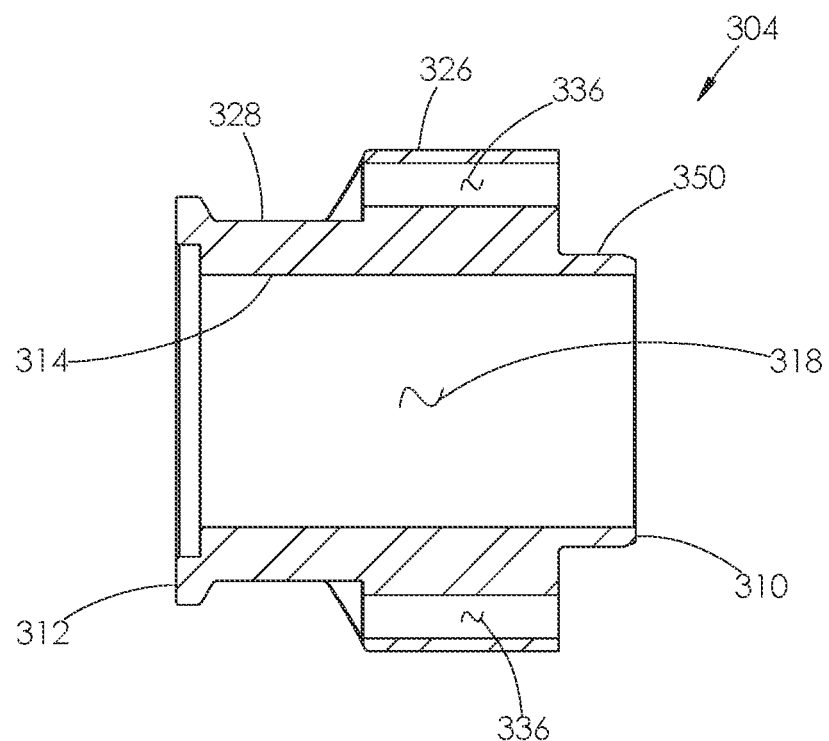
FIG. 48 is a cross-sectional view of the stuffing box shown in FIG. 46, taken along line O-O.
Figure 49:
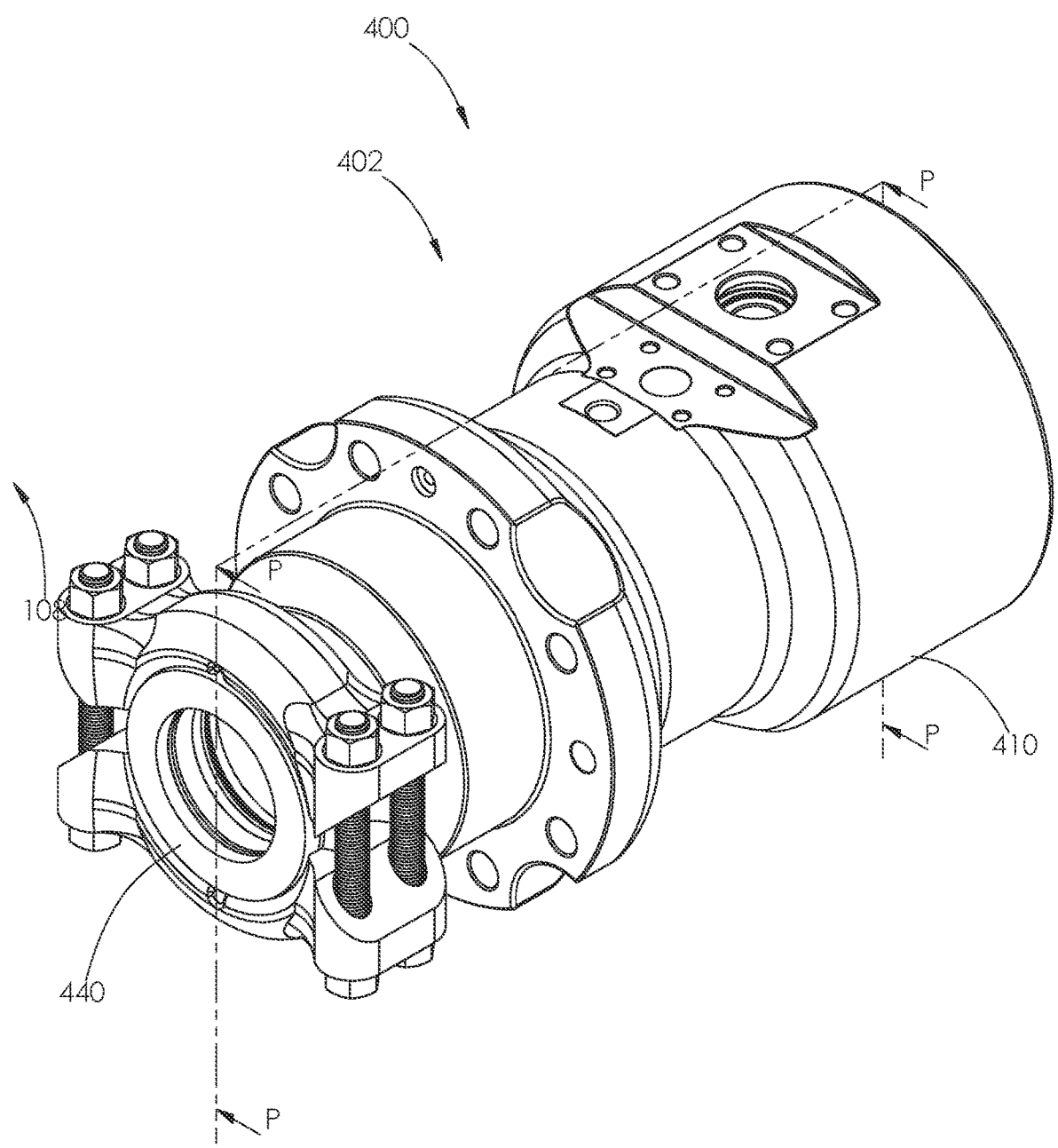
FIG. 49 is a rear perspective of another embodiment of a fluid end section.

Continuing with FIGS. 43 and 44, a plurality of threaded openings 338 are formed in the rear surface 322 of the second section 306. The openings 338 surround an opening of the second horizontal bore 324 and are configured to align with the plurality of passages 336 formed in the stuffing box 304. The plurality of passages 336 and openings 338 are configured to receive the fasteners 308. The fasteners 308 shown in the figures comprise a plurality of threaded studs 340 and nuts 342. In alternative embodiments, other fasteners known in the art may be used, such as screws or bolts.

Continuing with FIG. 43, to assemble the housing 302, the plurality of studs 340 are installed within the plurality of threaded openings 338 in a one-to-one relationship. The stuffing box 304 is then positioned on the second section 306 such that the studs 340 are disposed within the plurality of passages 336 and the sealing portion 330 is installed within the second horizontal bore 324. A first end 344 of each stud 340 projects from the first surface 332 of the connecting portion 326. A nut 342 is threaded onto each first end 344 and torqued until the stuffing box 304 is tightly secured to the second section 306.

Fluid is prevented from leaking between the stuffing box 304 and the second section 306 by an annular seal 346. The seal 346 is installed within a groove 348 formed in the walls of the second section 306 surrounding the second horizontal bore 324. Over time, the seal 346 wears against an outer sealing surface 350 of the sealing portion 330 of the stuffing box 304. If the outer sealing surface 350 of the sealing portion 330 erodes to the point of failure, the stuffing box 304 may be removed and replaced with a new stuffing box.

With reference to FIGS. 49-60, another embodiment of a fluid end section 400 is shown. The fluid end section 400 comprises a housing 402 having opposed front and rear surfaces 404 and 406 joined by inner and outer intermediate surfaces 408 and 410. The inner intermediate surface 408 defines a horizontal bore 412 that interconnects the opposed front and rear surfaces 404 and 406. The outer intermediate surface 410 of the housing 402 is identical to the housing 26, shown in FIGS. 3 and 4. The inner intermediate surface 408 is generally identical to the housing 26, but it comprises a larger counterbore 414 formed adjacent the rear surface 406 of the housing 402.

Figure 50:
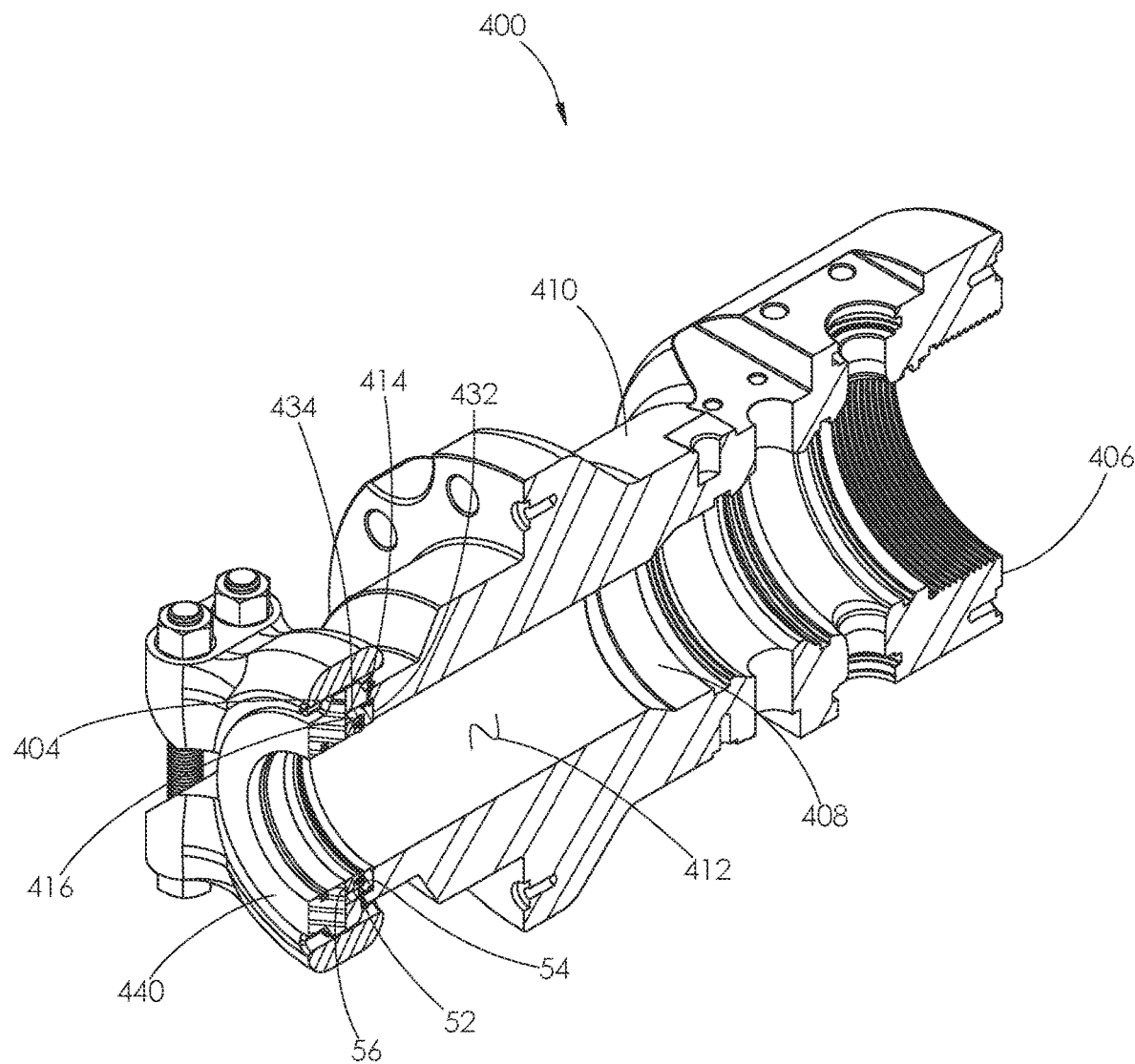
FIG. 50 is a rear perspective and cross-sectional view of the fluid end section shown in FIG. 49, taken along line P-P.
Figure 51:
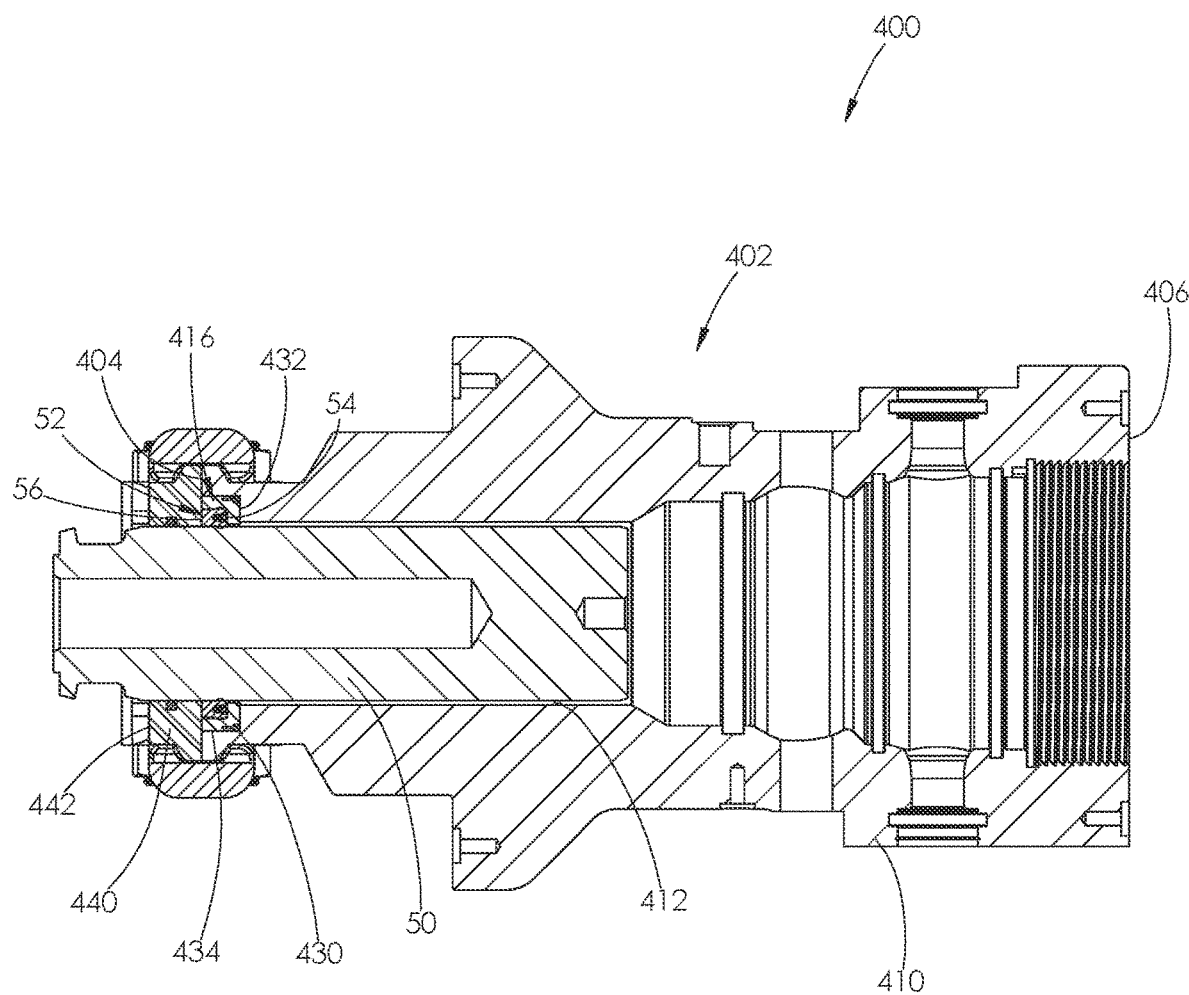
FIG. 51 is a cross-sectional view of the fluid end section shown in FIG. 49, taken along line P-P, with a plunger installed therein.
Figure 52:
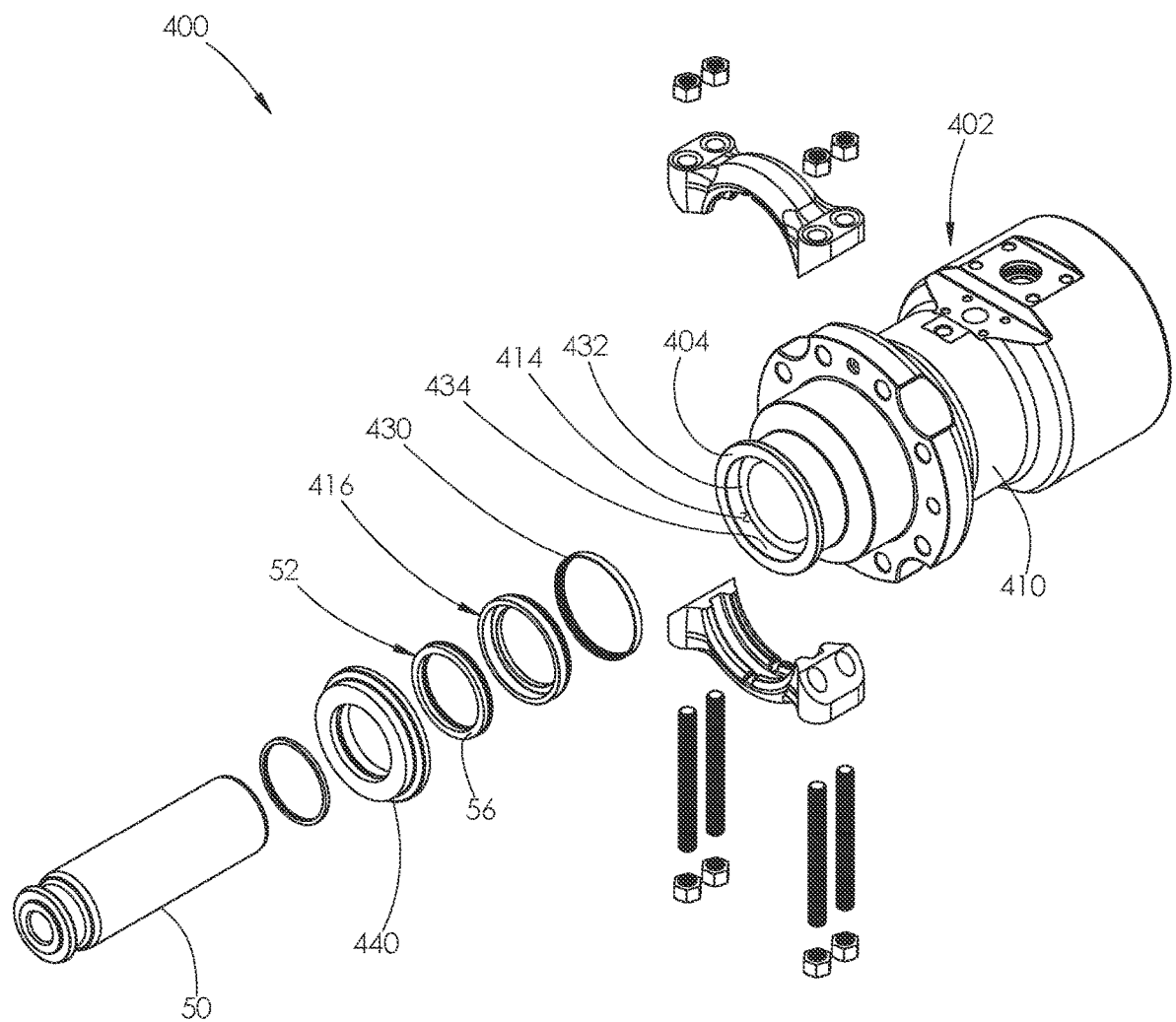
FIG. 52 is a rear perspective and exploded view of the fluid end section shown in FIG. 49, with addition of the plunger.
Figure 57:
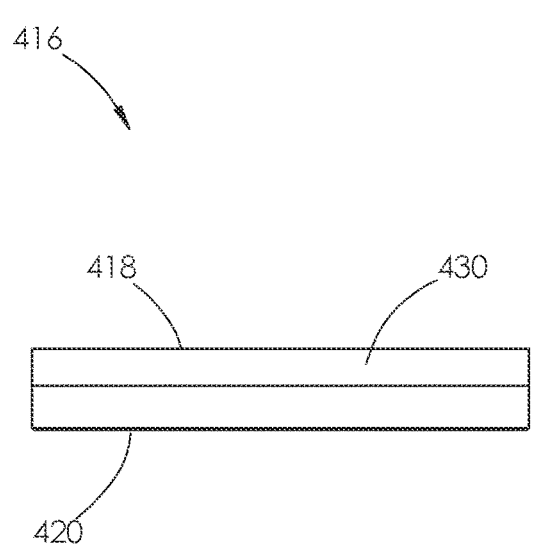
FIG. 57 is a top plan view of the sleeve shown in FIG. 53 having a seal installed therein.
Figure 58:
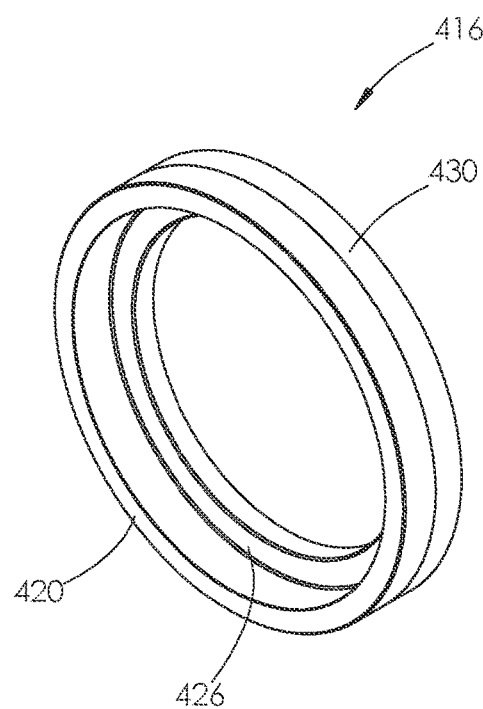
FIG. 58 is a rear perspective view of the sleeve shown in FIG. 57.
Figure 59:
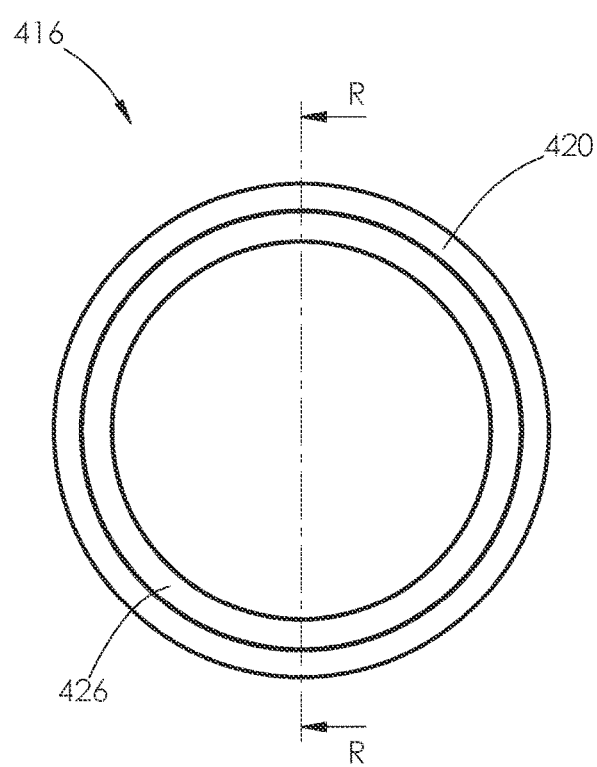
FIG. 59 is a rear elevational view of the sleeve shown in FIG. 57.
Figure 60:
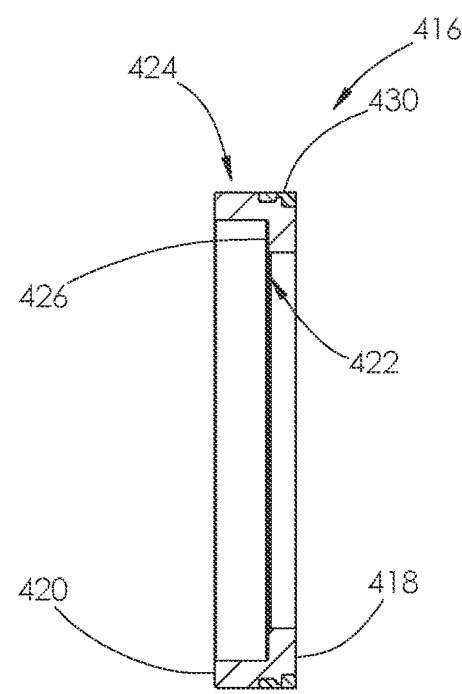
FIG. 60 is a cross-sectional view of the sleeve shown in FIG. 59, taken along line R-R.
Figure 61:
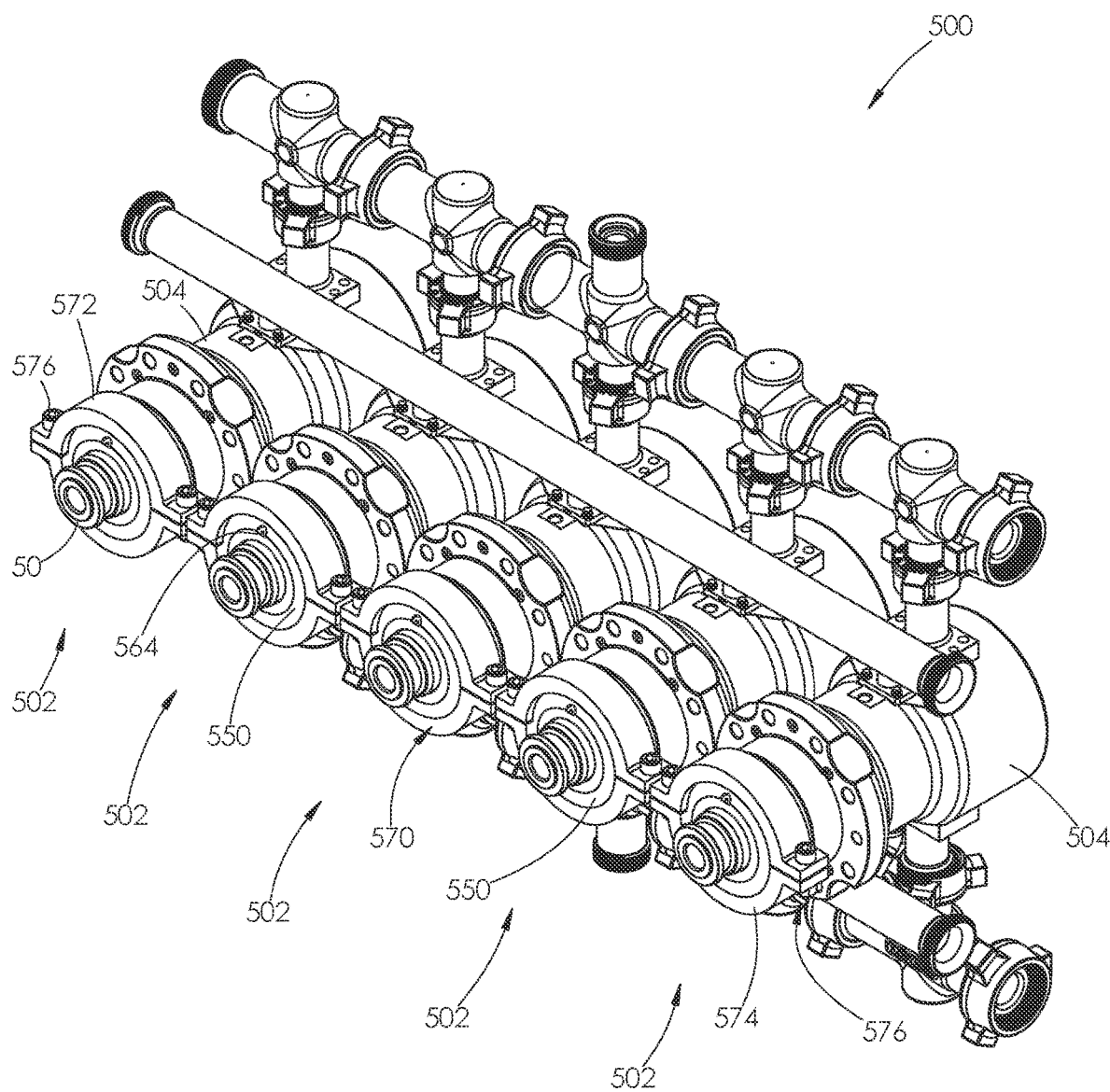
FIG. 61 is a rear perspective view of another embodiment of a fluid end assembly.
Figure 62:
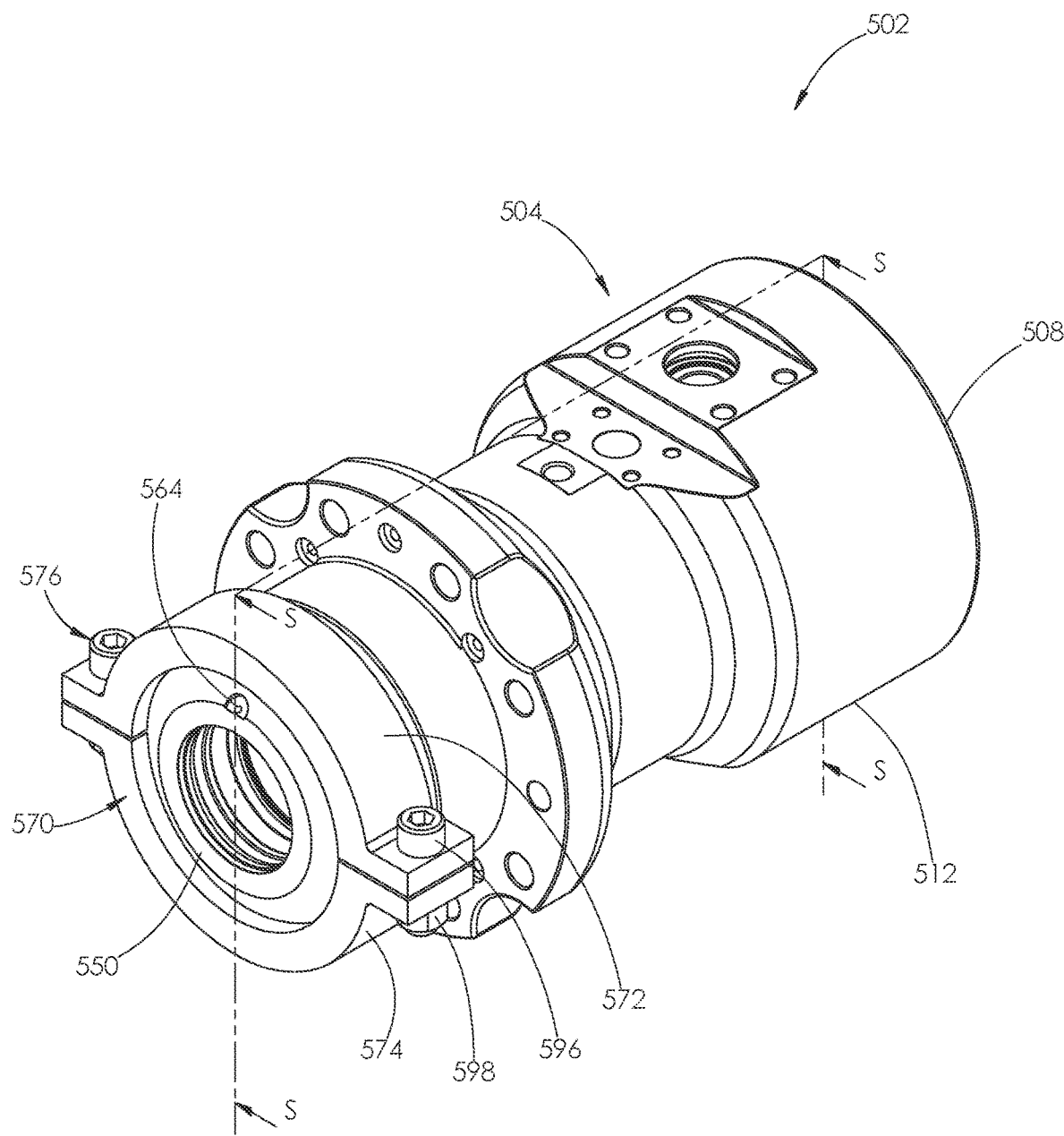
FIG. 62 is a rear perspective view of a fluid end section used with the fluid end assembly shown in FIG. 61, but the plunger has been removed.

Continuing with FIGS. 50 and 51, the counterbore 414 is sized to receive a sleeve 416. The sleeve 416 is configured to house the one and only one packing seal 52, shown in FIGS. 14-18. During operation, the packing seal 52 wears against the sleeve 416. If the sleeve 416 begins to erode and fail over time, the sleeve 416 may be removed and replaced with a new sleeve.

Continuing with FIGS. 53-56, the sleeve 416 has an annular shape and comprises opposed front and rear surfaces 418 and 420 joined by inner and outer intermediate surfaces 422 and 424. The inner intermediate surface 422 defines an internal shoulder 426. The front surface 54 of the packing seal 52 engages the internal shoulder 426 of the sleeve 416 when installed therein. A groove 428 is formed in the outer intermediate surface 424 of the sleeve 416. The groove 428 is configured to receive a seal 430, as shown in FIGS. 57-60. When the seal 430 is installed within the groove 428 the seal 430 forms an extension of the outer intermediate surface 422 and front surface 418 of the sleeve 416.

Turning back to FIGS. 50 and 51, the sleeve 416 is installed within the counterbore 414 such that the front surface 418 of the sleeve 416 abuts a base 432 of the counterbore 414. The seal 430 engages the base 432 of the counterbore 414 and a sidewall 434 of the counterbore 414 and prevents fluid from leaking around the sleeve 416. In alternative embodiments, the sleeve may not comprise the groove or seal. When the sleeve 416 is installed within the housing 402, the rear surface 420 of the sleeve 416 is flush with the rear surface 406 of the housing 402. The rear surface 56 of the packing seal 52 may be generally flush or extend slightly past the rear surfaces 420 and 406 of the sleeve 416 and the housing 402.

The sleeve 416 and packing seal 52 are held within the housing 402 by a retainer 440. The retainer 440 is generally identical to the retainer 86 shown in FIGS. 6-9, but it is not configured to receive a portion of the packing seal 52. Instead, a rear surface 442 of the retainer 440 has no grooves and abuts the rear surfaces 406, 420, and 54 of the housing 402, the sleeve 416, and the packing seal 52. Like the retainer 86, the retainer 440 compresses the packing seal 52 within the housing 402. The retainer 440 and the housing 402 are secured together by the clamp 108.

Figure 63:
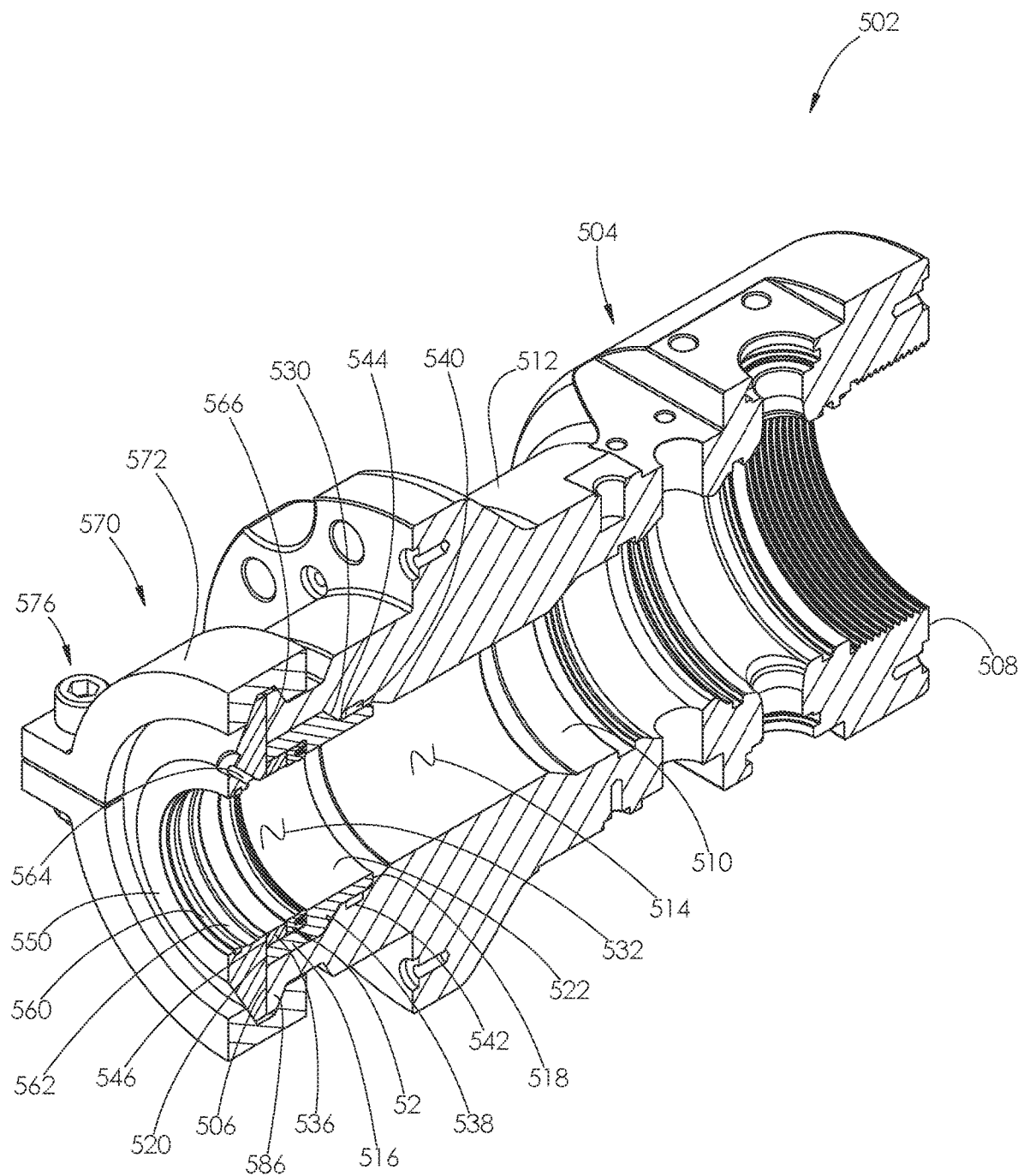
FIG. 63 is a rear perspective and cross-sectional view of the fluid end section shown in FIG. 62, taken along line S-S.
Figure 64:
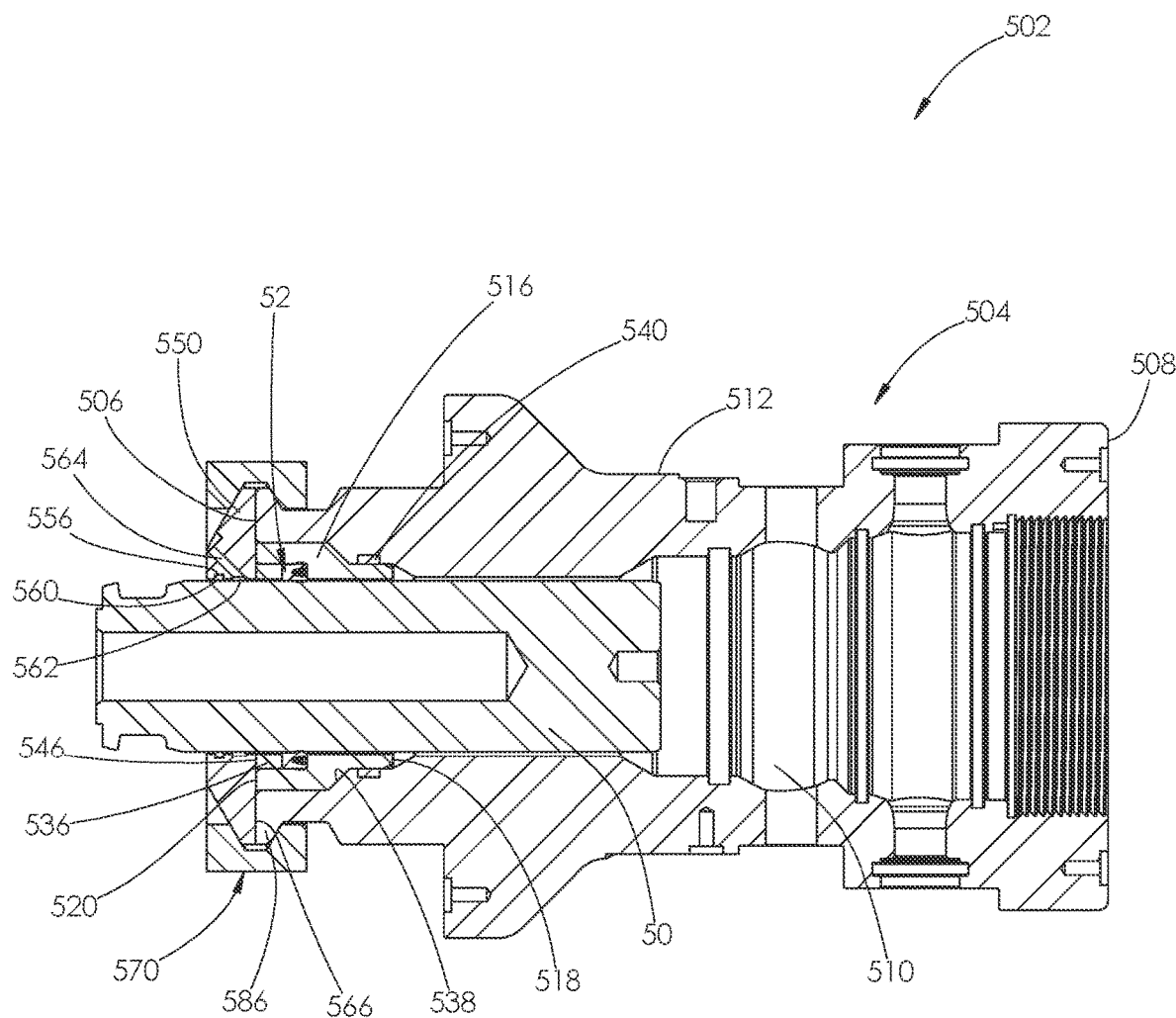
FIG. 64 is a cross-sectional view of the fluid end section shown in FIG. 62, taken along line S-S, with a plunger installed therein.

With reference to FIGS. 61-73, another embodiment of a fluid end assembly 500 is shown. The fluid end assembly 500 is like the fluid end assembly 10, but it comprises another embodiment of a fluid end section 502. The fluid end section 502 comprises a housing 504 having opposed front and rear surfaces 506 and 508 joined by inner and outer intermediate surfaces 510 and 512, as shown in FIGS. 63 and 64. The inner intermediate surface 510 defines a horizontal bore 514 that interconnects the opposed front and rear surfaces 506 and 508. The outer intermediate surface 512 of the housing 504 is identical to the housing 26, shown in FIGS. 3 and 4. The inner intermediate surface 510 is generally identical to the housing 26, but it is configured to receive a larger sleeve 516.

Figure 65:
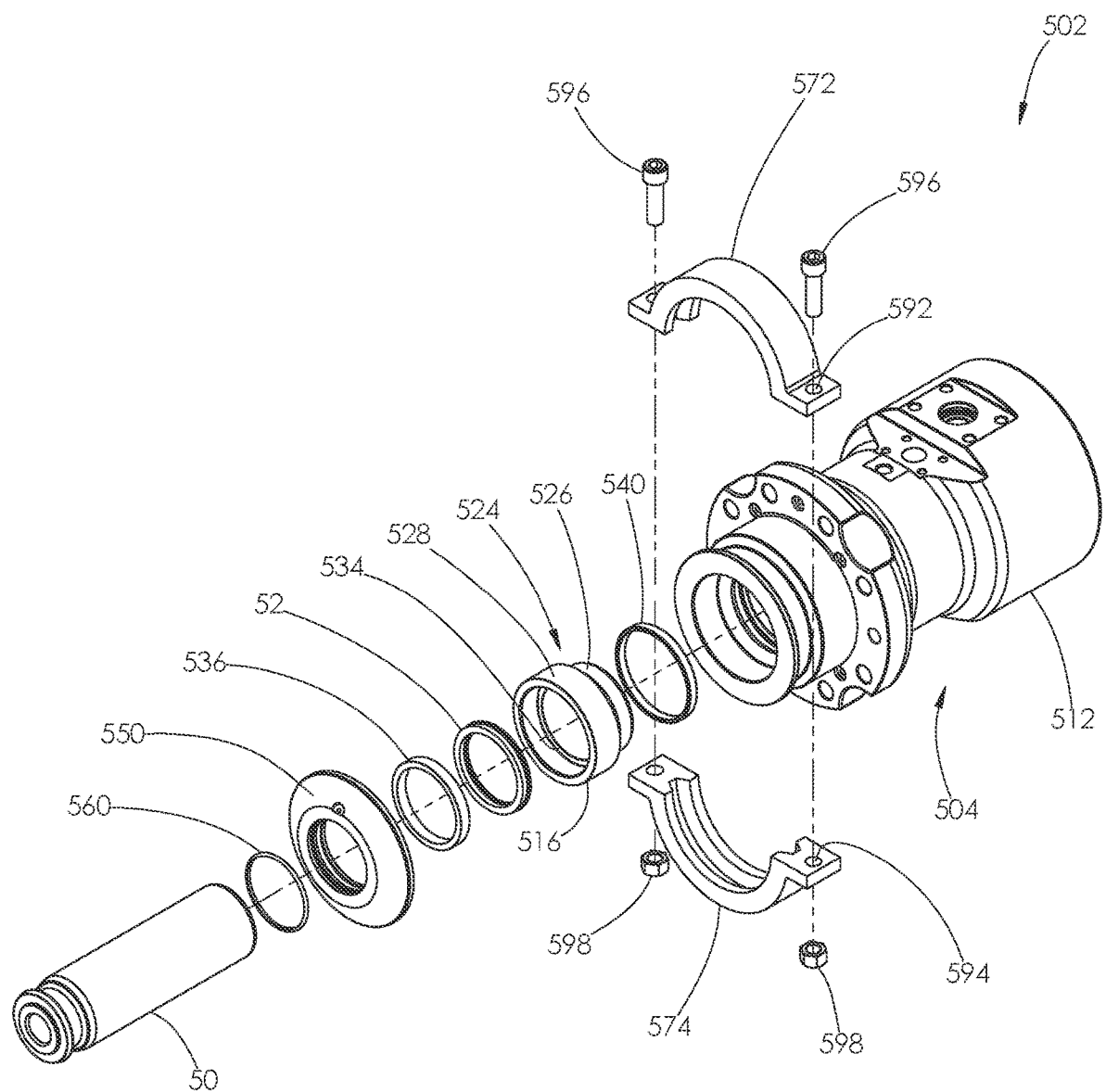
FIG. 65 is a rear perspective and exploded view of the fluid end section shown in FIG. 62, with addition of the plunger.
Figures 70, 71:
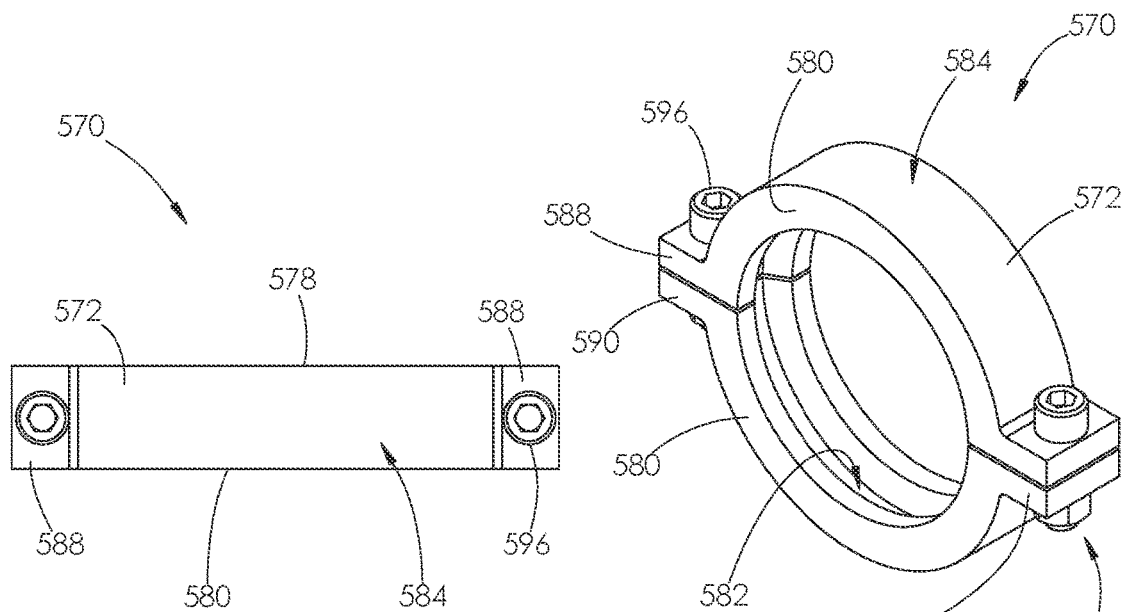
FIG. 70 is a top plan view of the clamp used with the fluid end section shown in FIG. 62.
FIG. 71 is a rear perspective view of the clamp shown in FIG. 70.
Figures 72, 73:
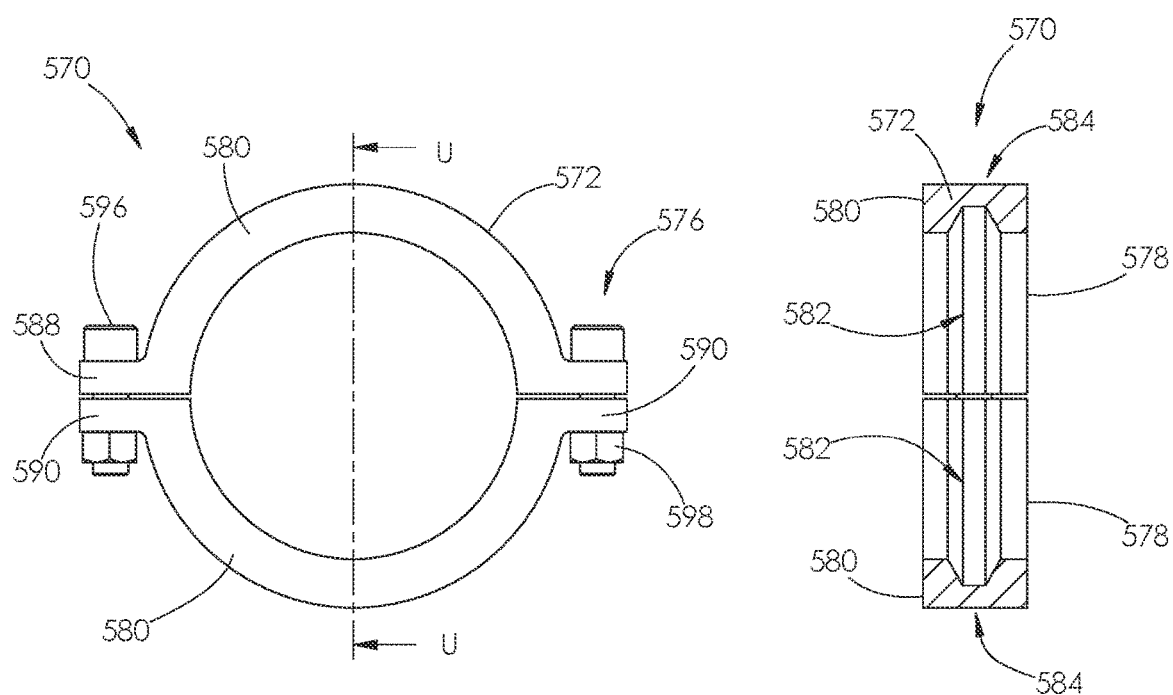
FIG. 72 is a rear elevational view of the clamp shown in FIG. 70.
FIG. 73 is a cross-sectional view of the clamp shown in FIG. 72, taken along line U-U.

Continuing with FIGS. 63-65, the sleeve 516 comprises opposed front and rear surfaces 518 and 520 joined by inner and outer intermediate surfaces 522 and 524. The outer intermediate surface 524 comprises a front section 526 joined to a rear section 528 by a tapered section 530. The inner intermediate surface 522 defines a central passage 532 sized to receive the plunger 50 and the one and only one packing seal 52. The front surface 54 of the packing seal 52 engages an internal shoulder 534 formed within the sleeve 516. The sleeve 516 is also configured to receive a metal ring 536 stacked on top of the packing seal 52. The metal ring 536 may be characterized as an anti-extrusion ring.

When the sleeve 516 is installed within the horizontal bore 514, the tapered section 530 of the sleeve 516 engages a tapered section 538 of inner intermediate surface 522 of the housing 504, preventing further axial movement of the sleeve 516 within the bore 514. Fluid is prevented from leaking between the sleeve 516 and the walls of the housing 504 by a seal 540. The seal 540 is installed within a groove 542 formed in the inner surface 510 of the housing 504 surrounding the horizontal bore 514. The seal 540 engages an outer sealing surface 544 of the front section 526 of the sleeve 516. During operation, the seal 540 wears against the outer sealing surface 544 of the sleeve 516. If the outer sealing surface 544 begins to erode and fail over time, the sleeve 516 may be removed and replaced with a new sleeve.

The rear surface 520 of the sleeve 516 is flush with the rear surface 508 of the housing 504 when installed within the horizontal bore 514. Likewise, a rear surface 546 of the metal ring 536 is flush with the rear surface 508 of the housing 504. The sleeve 516 and ring 536 are held within the bore 514 by a retainer 550. The front surface 566 of the retainer 550 abuts the rear surface 546 of the metal ring 536, which compresses the packing seal 52.

Continuing with FIGS. 66-69, the retainer 550 is like the retainer 86 shown in FIGS. 6-9, but it has a differently shaped outer intermediate surface 552. Instead of having a flanged portion, the outer intermediate surface 552 of the retainer 550 comprises a tapered portion 554. The retainer 550 comprises a groove 556 formed in its inner intermediate surface 558 for housing a seal 560. The retainer 550 further comprises an annular channel 562 formed in its inner intermediate surface 558 and interconnected with the outer intermediate surface 552 by a lube port 564. The retainer 550 is secured to the housing 504 using another embodiment of a clamp 570.

Continuing with FIGS. 70-73, the clamp 570 comprises upper and lower sections 572 and 574 secured together by a plurality of fasteners 576. The sections 572 and 574 each comprise opposed front and rear surfaces 578 and 580 joined by inner and outer intermediate surfaces 582 and 584. When the sections 572 and 574 are brought together, the clamp 570 has a generally annular shape. The inner intermediate surface 582 of each section 572 and 574 is sized and shaped to correspond with the tapered portion 554 of the retainer 550 and a flanged portion 586 of the housing 504, as shown in FIG. 63.

Continuing with FIGS. 70-73, the upper section 572 comprises a pair of upper projecting tabs 588 positioned on opposite sides of the section 572. Likewise, the lower section 574 comprises a pair of lower projecting tabs 590 positioned on opposite sides of the section 574. A first opening 592 is formed in each upper tab 588, and a second opening 594 is formed in each lower tab 590. When the upper and lower sections 572 and 574 are brought together, the first and second openings 592 and 594 align with one another on opposed sides of the clamp 570.

The upper and lower sections 572 and 574 are clamped around the retainer 550 and the housing 504 and secured together by the plurality of fasteners 576. The fasteners 576 shown in FIGS. 70-72 comprise a plurality of socket-head screws 596 and corresponding nuts 598. A screw 596 is installed within the aligned openings 592 and 594 such that an end of the screw 596 projects from the lower projecting tab 590. A nut 598 is threaded onto the end of each screw 596 and torqued against the lower tab 590. The tighter the nuts 598 are torqued, the tighter the clamp 570 holds to the retainer 550 and the housing 504 together.

In alternative embodiments, the projecting tabs may be configured for use with different types of fasteners known in the art, such as threaded studs or bolts. In further alternative embodiments, the projecting tabs may be configured to receive more than one fastener on each side of the clamp.

Figure 74:
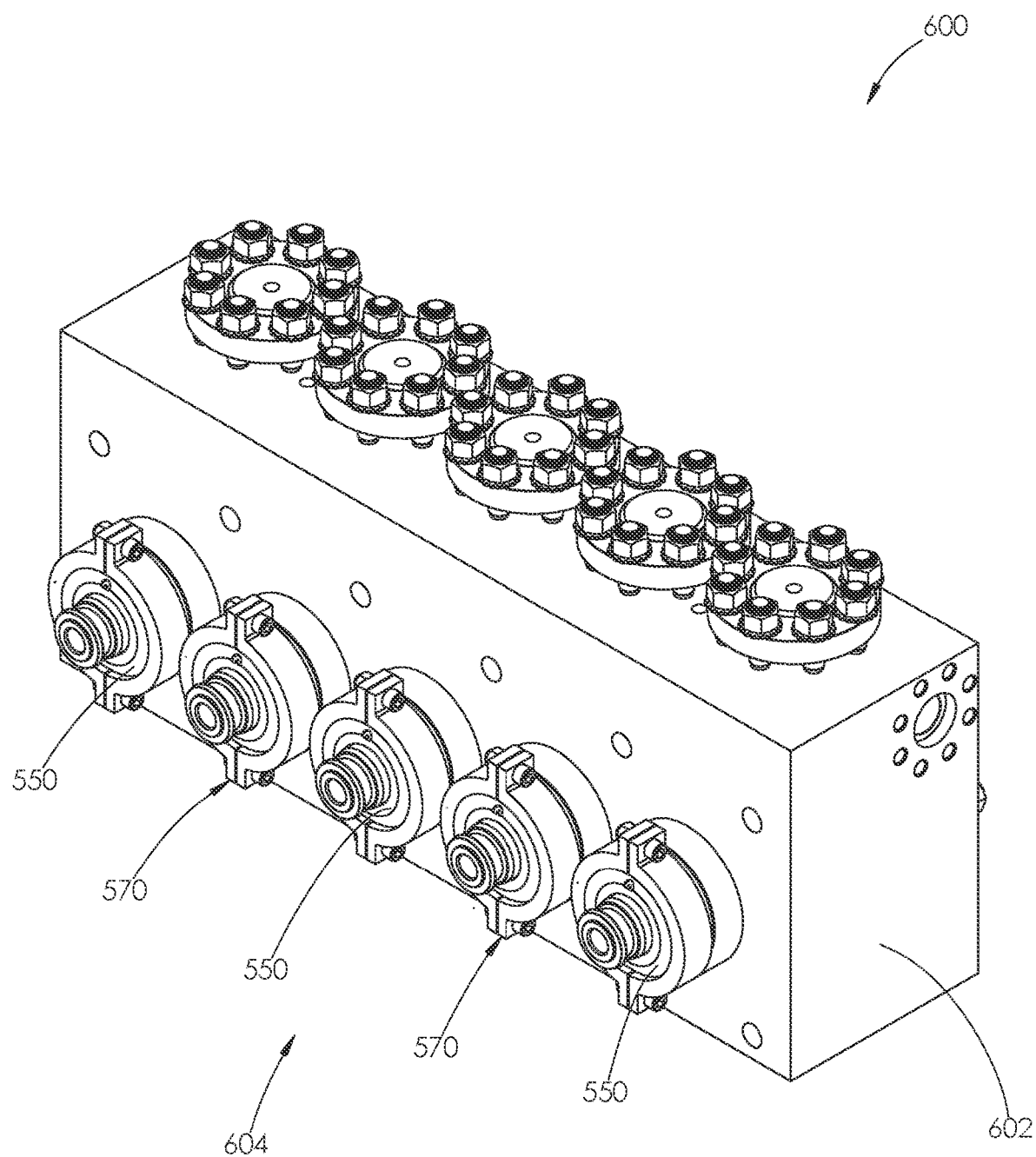
FIG. 74 is a rear perspective view of another embodiment of a fluid end assembly.
Figure 75:
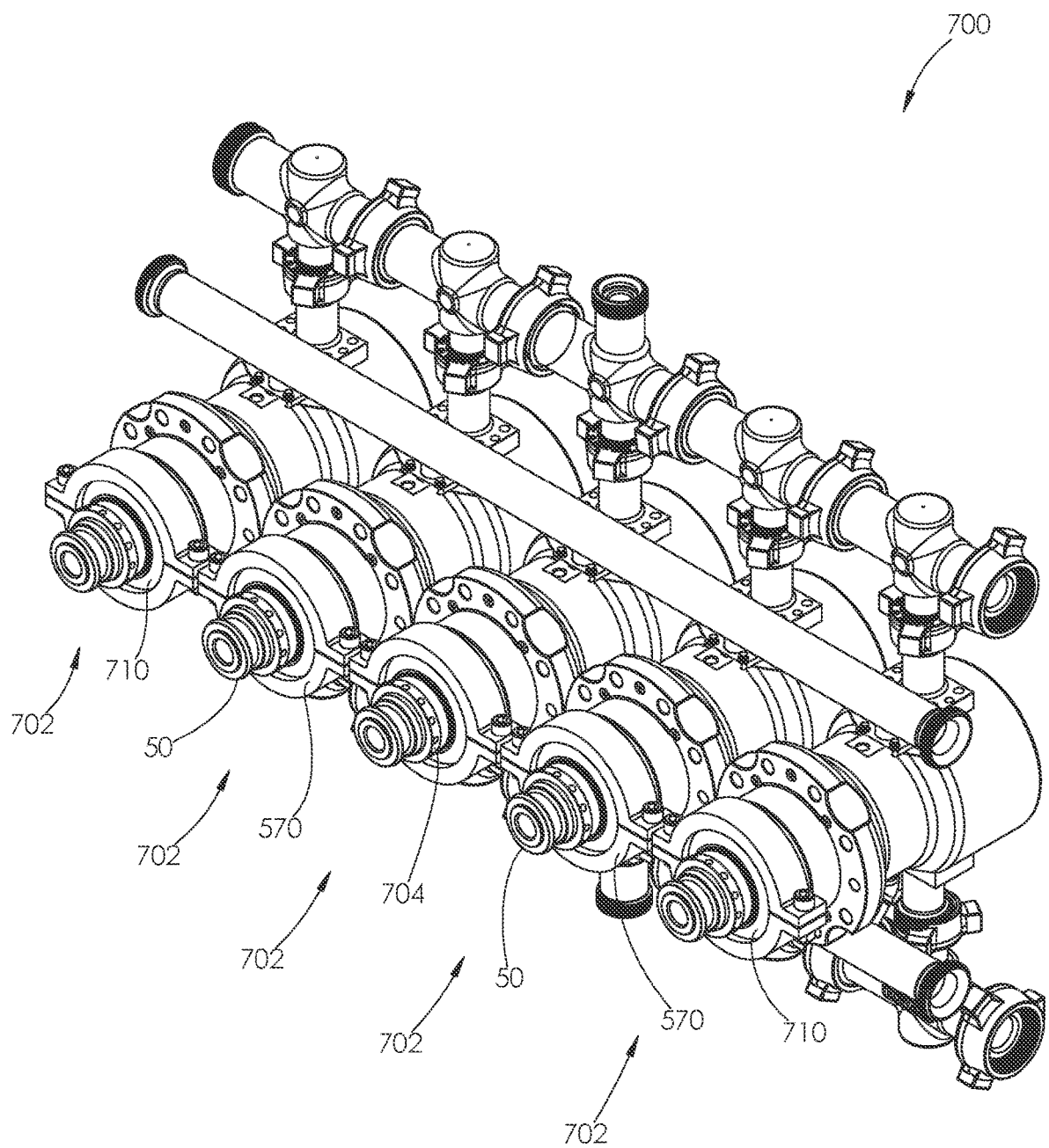
FIG. 75 is a rear perspective view of another embodiment of a fluid end assembly.
Figure 76:
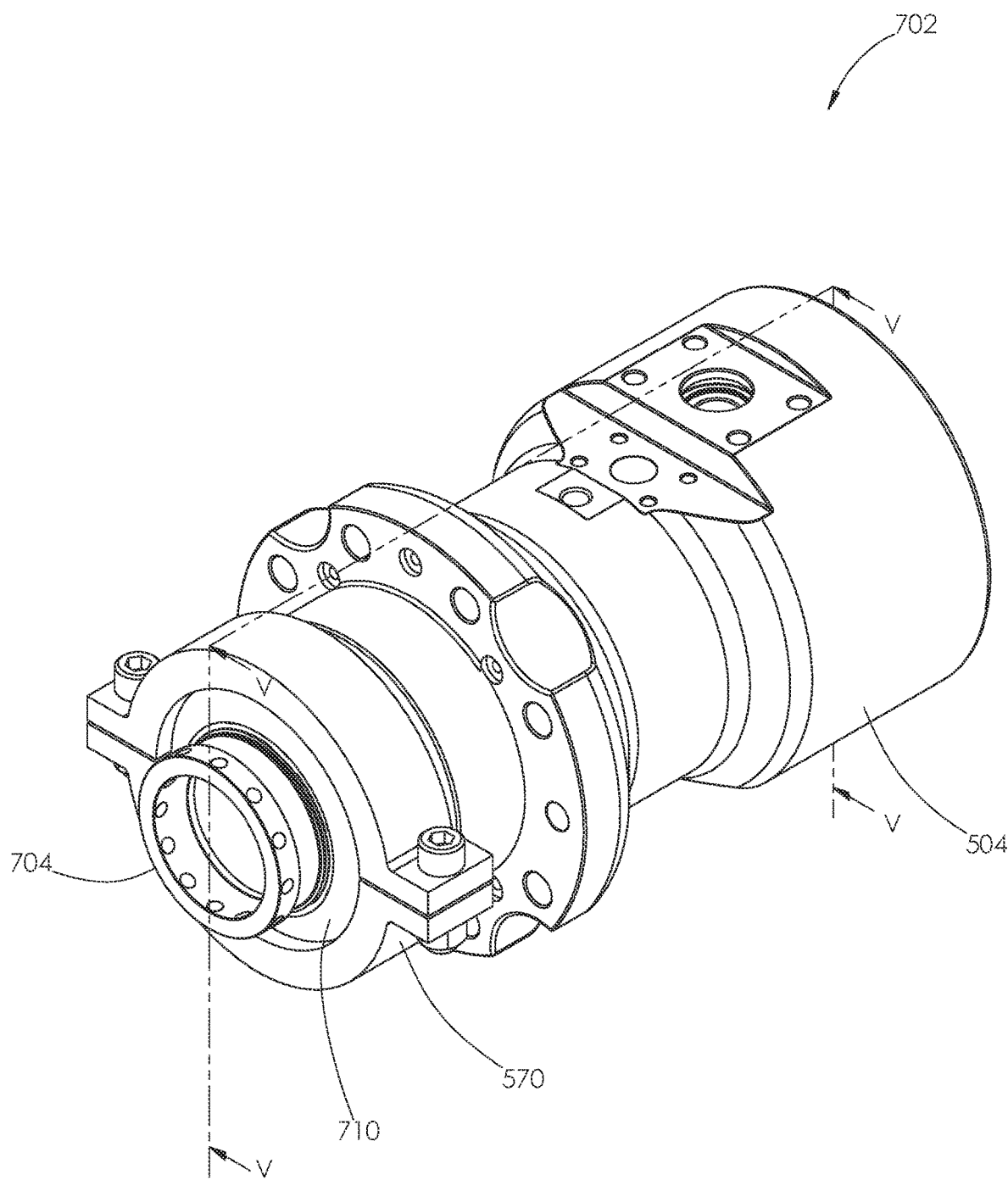
FIG. 76 is a rear perspective view of a fluid end section used with the fluid end assembly shown in FIG. 75, but the plunger has been removed.

With reference to FIG. 74, another embodiment of a fluid end assembly 600 is shown. In contrast to the fluid end assembly 500, the fluid end assembly 600 does not comprise a plurality of individual fluid end sections 502. Rather, the fluid end assembly 600 comprises a single fluid end housing block 602 having a plurality of intersecting conduits formed therein. The fluid end housing block 602 is configured like valve-over-valve housings known in the art. One example is U.S. Pat. No. 10,941,765, issued to Nowell et al., the entire contents of which are incorporated herein by reference.

Continuing with FIG. 74, a plunger side 604 of the fluid end assembly 600 is configured to use the sleeve 516, packing seal 52, metal ring 536, retainer 550, and clamp 570. While not shown, the sleeve 516, packing seal 52, and metal ring 536 are installed within each horizontal bore formed in the housing block 602 in the same manner they are installed within the housing 504. While the clamps 570 are shown oriented horizontally on the fluid end assembly 500 shown in FIG. 61, the clamps 570 are oriented vertically on the fluid end assembly 600 shown in FIG. 74. The vertical orientation is to provide clearance between adjacent clamps. In alternative embodiments, the clamps may be oriented in any rotational orientation necessary to accommodate the size and shape of the fluid end assembly.

With reference to FIGS. 75-83, another embodiment of a fluid end assembly 700 is shown. The fluid end assembly 700 comprises another embodiment of a fluid end section 702. The fluid end section 702 is generally identical to the fluid end section 502, but it is configured for use with a traditional packing nut 704 and a plunger packing 706. In some cases, using a traditional packing nut 704 and plunger packing 706 may be preferred over the other embodiments described herein.

Continuing with FIGS. 77 and 78, the fluid end section 702 comprises the housing 504 and the sleeve 516 shown in FIGS. 63 and 64. The plunger packing 706 is installed within the sleeve 516 and comprises a plurality of packing seals 708 stacked on top of one another. The packing seals 708 comprise only an elastomeric body and no energizing component. The sleeve 516 is held within the housing 504 by another embodiment of a retainer 710, as shown in FIGS. 80-83. The retainer 710 is like the retainer 550, but it comprises a threaded inner surface 712 configured to receive the packing nut 704.

The packing nut 704 comprises a threaded outer surface 714. When the packing nut 704 is installed within the retainer 710, a front surface 716 of the packing nut 704 compresses the plunger packing 706, as shown in FIG. 78. During operation, the packing nut 704 may be torqued as needed to further compress the plunger packing 706 to better seal against the plunger 50. A groove 718 is formed in the inner surface of the packing nut 704 for receiving a seal 720. The seal 720 engages the outer surface of the plunger 50 during operation, preventing fluid from leaking from the packing nut 704. The packing nut 704 is tightened using a wrench configured to engage a plurality of holes 722 formed in the packing nut 704. The retainer 710 is secured to the housing 504 using the clamp 570.

Figure 84:
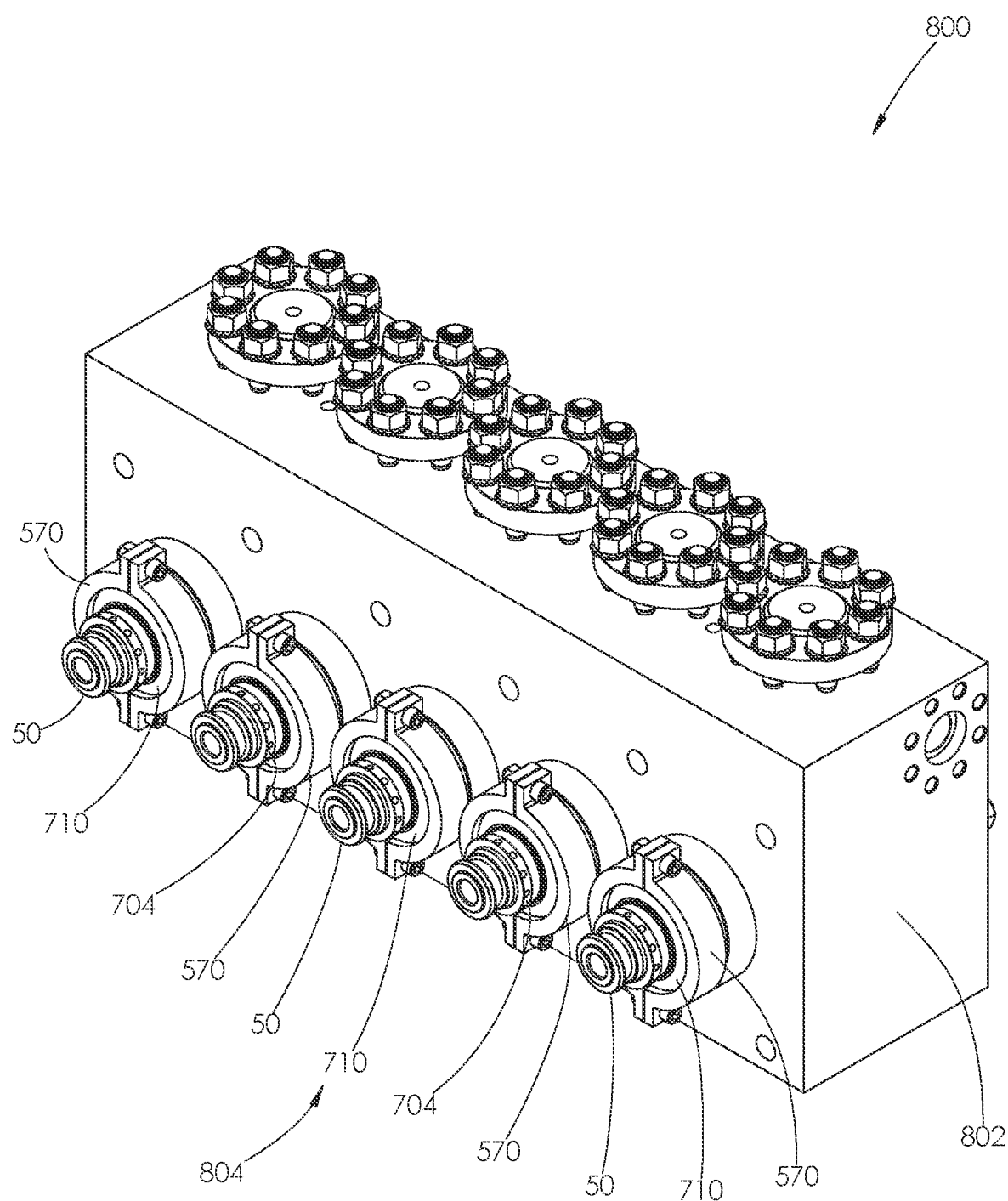
FIG. 84 is a rear perspective view of another embodiment of a fluid end assembly.

With reference to FIG. 84, another embodiment of a fluid end assembly 800 is shown. The fluid end assembly 800 is like the fluid end assembly 700, but it does not comprise a plurality of individual fluid end sections 702. Rather, the fluid end assembly 800 comprises a single fluid end housing block 802 having a plurality of intersecting conduits formed therein. The fluid end housing block 802 is configured like valve-over-valve housings known in the art and described in the '765 application, referenced above.

Continuing with FIG. 84, a plunger side 804 of the fluid end assembly 800 is configured to use the sleeve 516, plunger packing 706, retainer 710, packing nut 704, and clamp 570. While the sleeve 516 and plunger packing 706 are not shown, such components are installed within each bore formed within the housing 802 in the same manner they are installed within the fluid end housing section 702. While the clamps 570 are shown oriented horizontally on the fluid end assembly 700, shown in FIG. 75, the clamps 570 are oriented vertically on the fluid end assembly 800 shown in FIG. 84. The vertical orientation is to provide clearance between adjacent clamps. In alternative embodiments, the clamps may be oriented in any rotational orientation necessary to accommodate the size and shape of the fluid end assembly.

Figure 85:
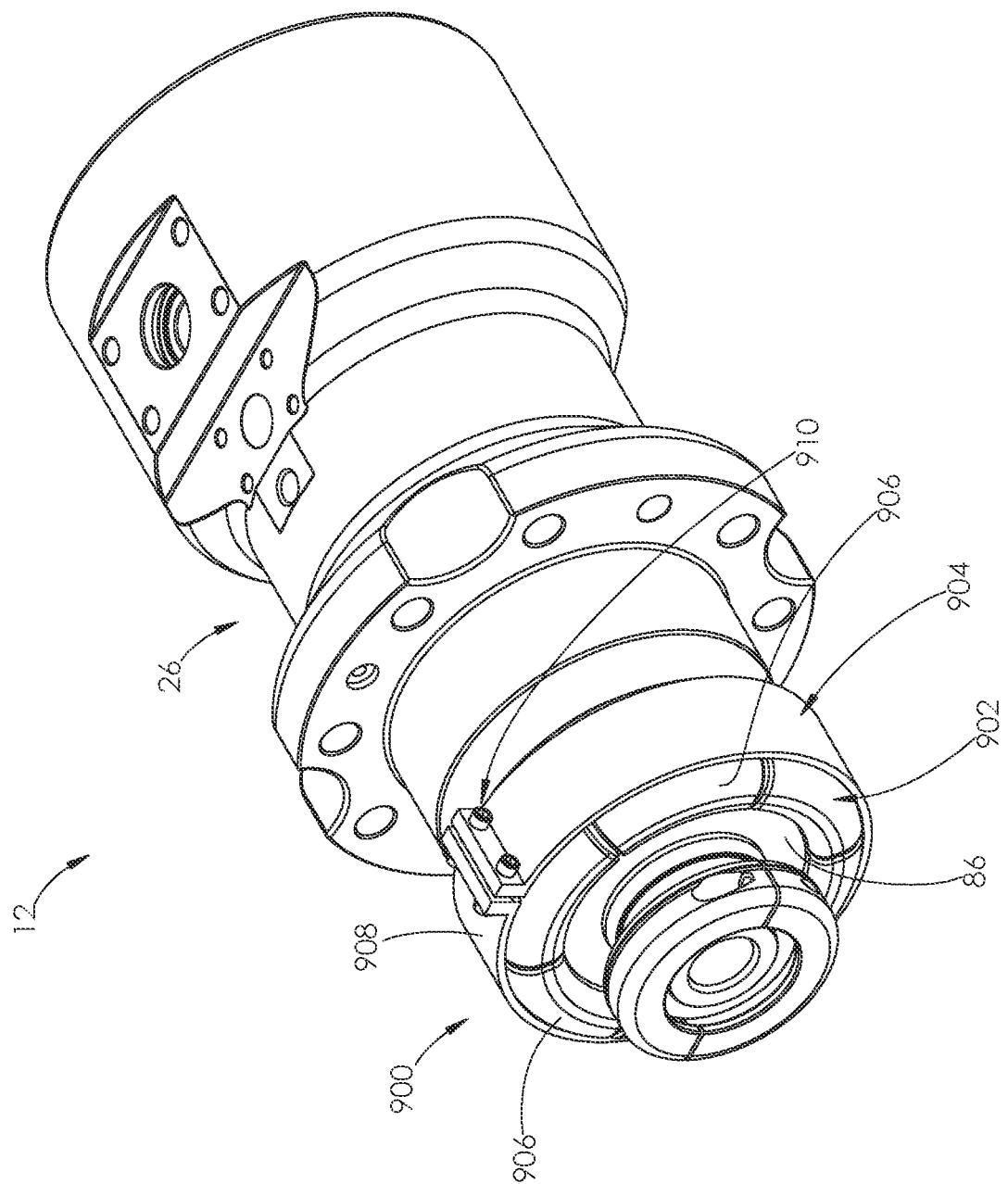
FIG. 85 is a rear perspective view of the fluid end section shown in FIG. 2 but using another embodiment of a clamp.
Figure 86:
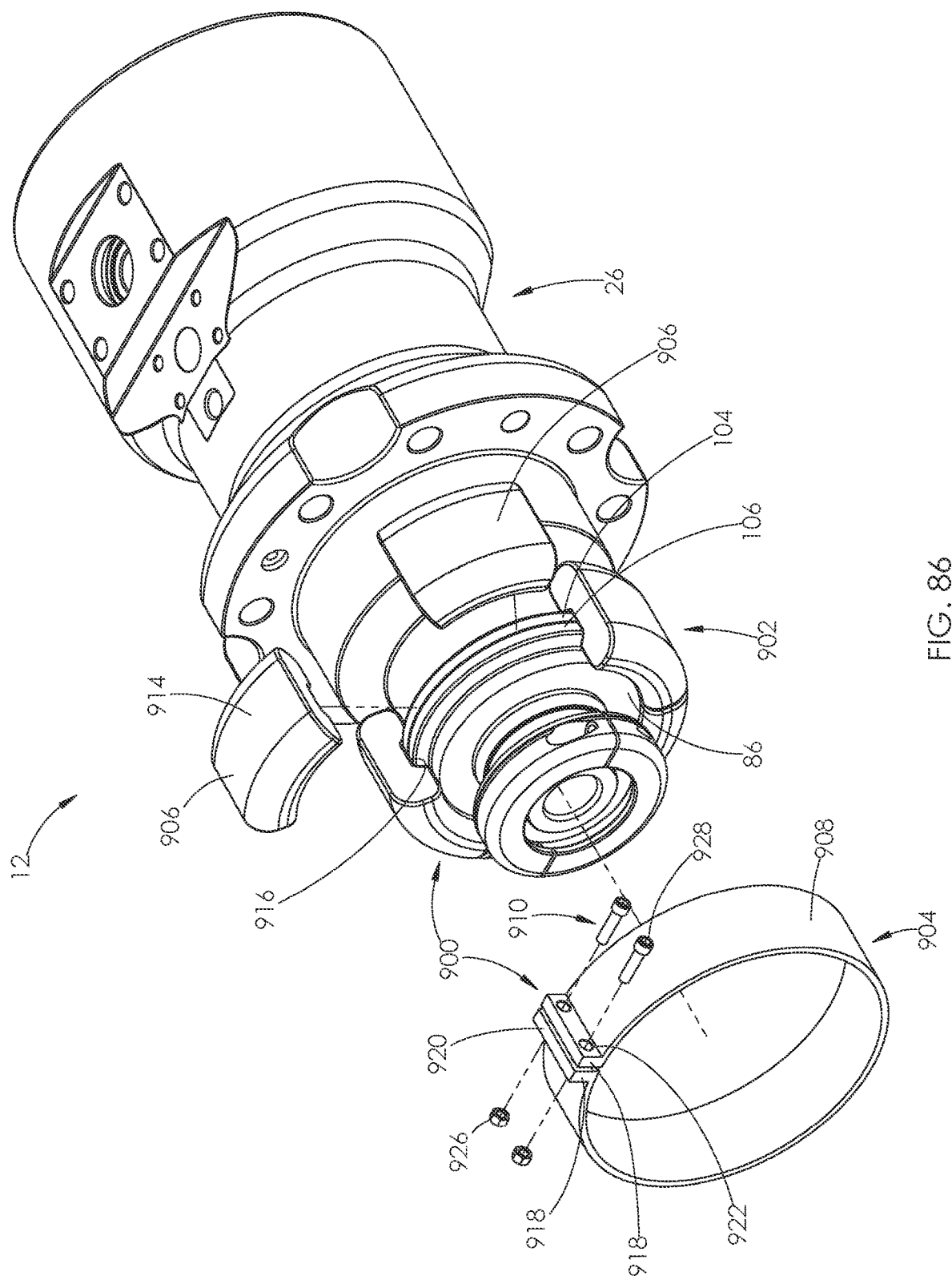
FIG. 86 is a rear perspective view of the fluid end section shown in FIG. 85, but the clamp is shown partially exploded.
Figure 87:
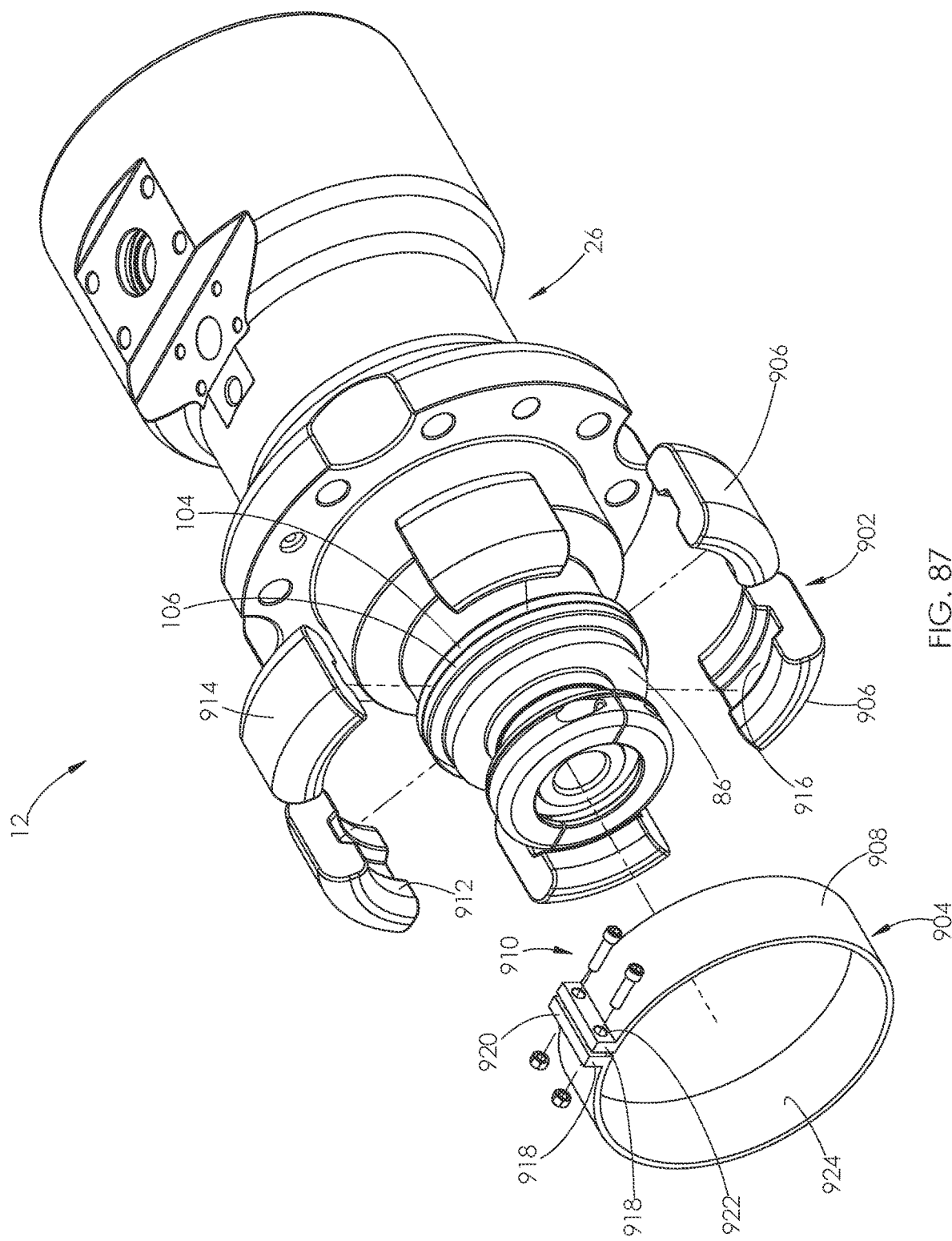
FIG. 87 is a rear perspective view of the fluid end section shown in FIG. 86, but the clamp is shown fully exploded.
Figure 88:
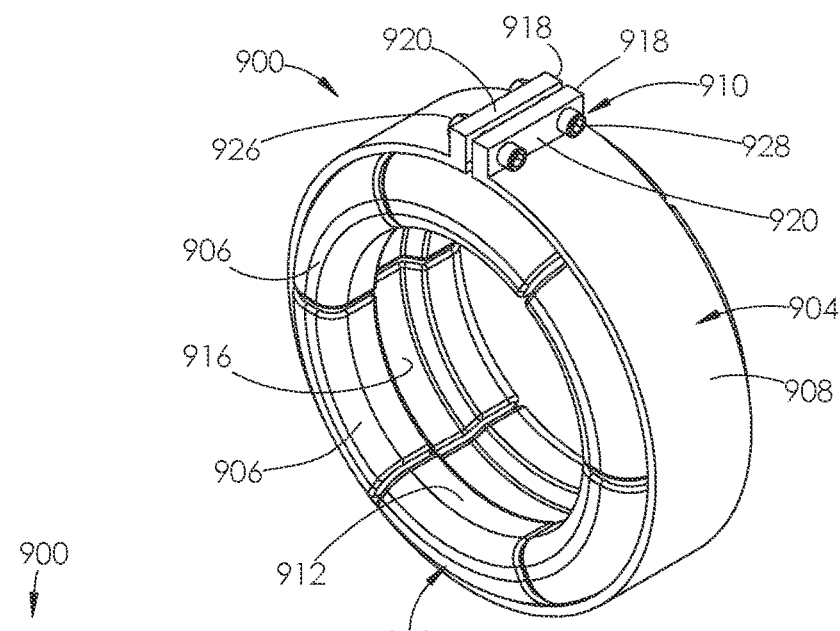
FIG. 88 is a rear perspective view of the clamp shown in FIG. 85.
Figure 89:
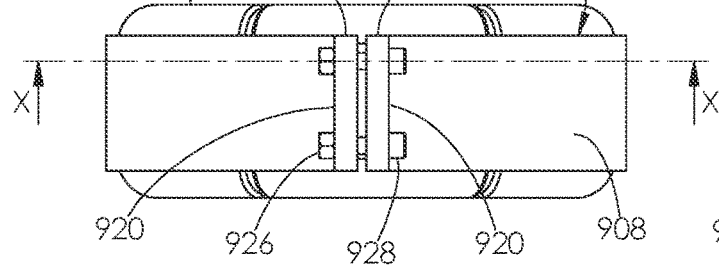
FIG. 89 is a top plan view of the clamp shown in FIG. 88.

Turning to FIGS. 85-87, the fluid end section 12 is shown utilizing another embodiment of a clamp 900. The clamp 900 comprises an inner clamp 902 surrounded by an outer clamp 904. Like the clamp 108, shown in FIG. 2, the clamp 900 is configured to secure the housing 26 and the retainer 86, as shown in FIG. 86. The inner clamp 902 has a cylindrical shape and comprises a plurality of clamp sections 906 configured to engage the flanged portions 104 and 106 of the retainer 86 and the housing 26. The clamp sections 906 are held against the retainer 86 and the housing 26 by the outer clamp 904, as shown in FIG. 85. The outer clamp 904 comprises a split compression ring 908. The split ends of the compression ring 908 are secured together using a plurality of fasteners 910.

Turning to FIGS. 88-91, the inner clamp 902 shown in the figures comprises six clamp sections 906. In alternative embodiments, the inner clamp 902 may be sectioned into more or less than six sections. Each clamp section 906 comprises opposed inner and outer surfaces 912 and 914, as also shown in FIG. 87. A groove 916 is formed in the inner surface 912 that is sized and shaped to correspond with the flanged portions 104 and 106 of the retainer 86 and the housing 26, as shown in FIG. 86. The clamp sections 906 are positioned around the joined flanged sections 104 and 106 such that the flanged sections 104 and 106 are situated within the groove 916 formed in each clamp section 906. When positioned around the retainer 86 and the housing 26, the clamp sections 906 are spaced circumferentially such that the end surfaces of each clamp section 906 abut, or nearly abut, one another to completely encircle the flanged sections 104 and 106, as shown in FIG. 85. The outer surface 914 of each clamp section 906 is smooth to directly engage the outer clamp 904.

Figure 90:
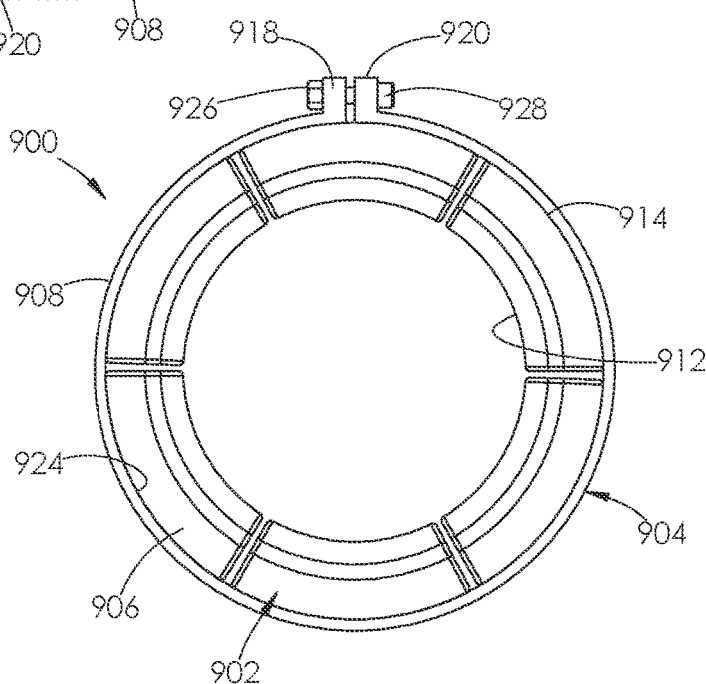
FIG. 90 is a rear elevational view of the clamp shown in FIG. 88.
Figure 91:
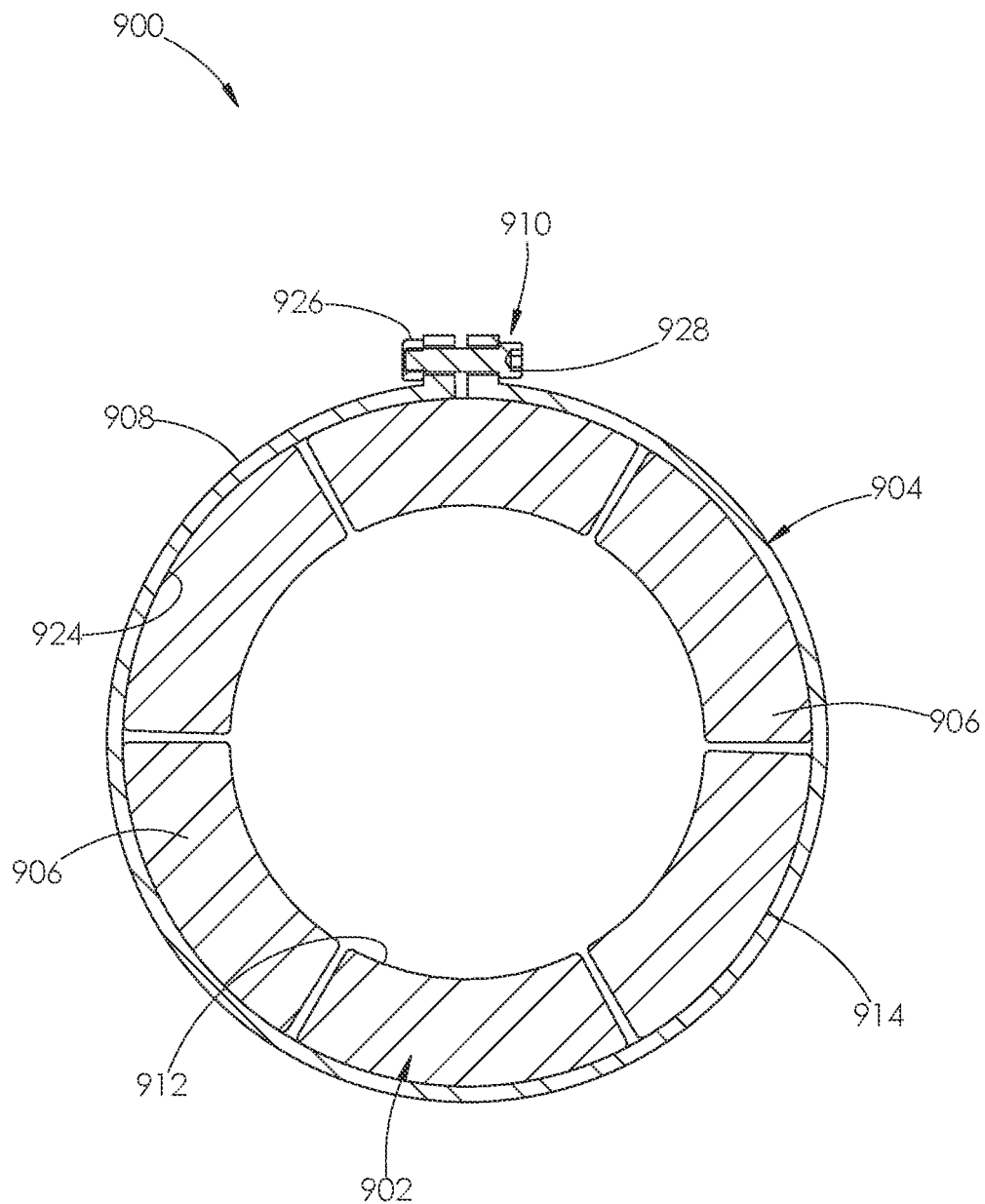
FIG. 91 is a cross-sectional view of the clamp shown in FIG. 89, taken along line X-X.

Continuing with FIGS. 88-91, the compression ring 908 making up the outer clamp 904 is shaped like circular sector of a thin-walled cylinder. The compression ring 908 is split such that it comprises split ends 918. Each split end 918 comprises a tab 920 sized to mate with the adjoining tab 920. A plurality of fastener holes 922 are formed in each tab 920 for receiving the plurality of fasteners 910, as shown in FIGS. 86 and 87. The compression ring 908 is sized to surround the clamp sections 906 such that an inner surface 924 of the ring 908 engages the outer surface 914 of each clamp section 906, as shown in FIGS. 90 and 91. The compression ring 908 is tightened around the clamp sections 906 by tightening the plurality of fasteners 910. Each fastener 910 comprises a nut 926 and a bolt or a socket head cap screw 928. In alternative embodiments, other types of fasteners known in the art may be used and the tabs 920 may be configured to receive more or less than two fasteners. As shown in FIG. 85, the fasteners 910 do not engage any portion of the housing 26 or retainer 86.

When the fasteners 910 are tightened, the compression ring 908 compresses the clamp sections 906 against the retainer 86 and the housing 26, thereby holding the retainer 86 and the housing 26 together. By utilizing a plurality of clamp sections 906, each clamp section 906 can adjust as needed so as to tightly engage the corresponding portions of the flanged sections 104 and 106.

Figure 92:
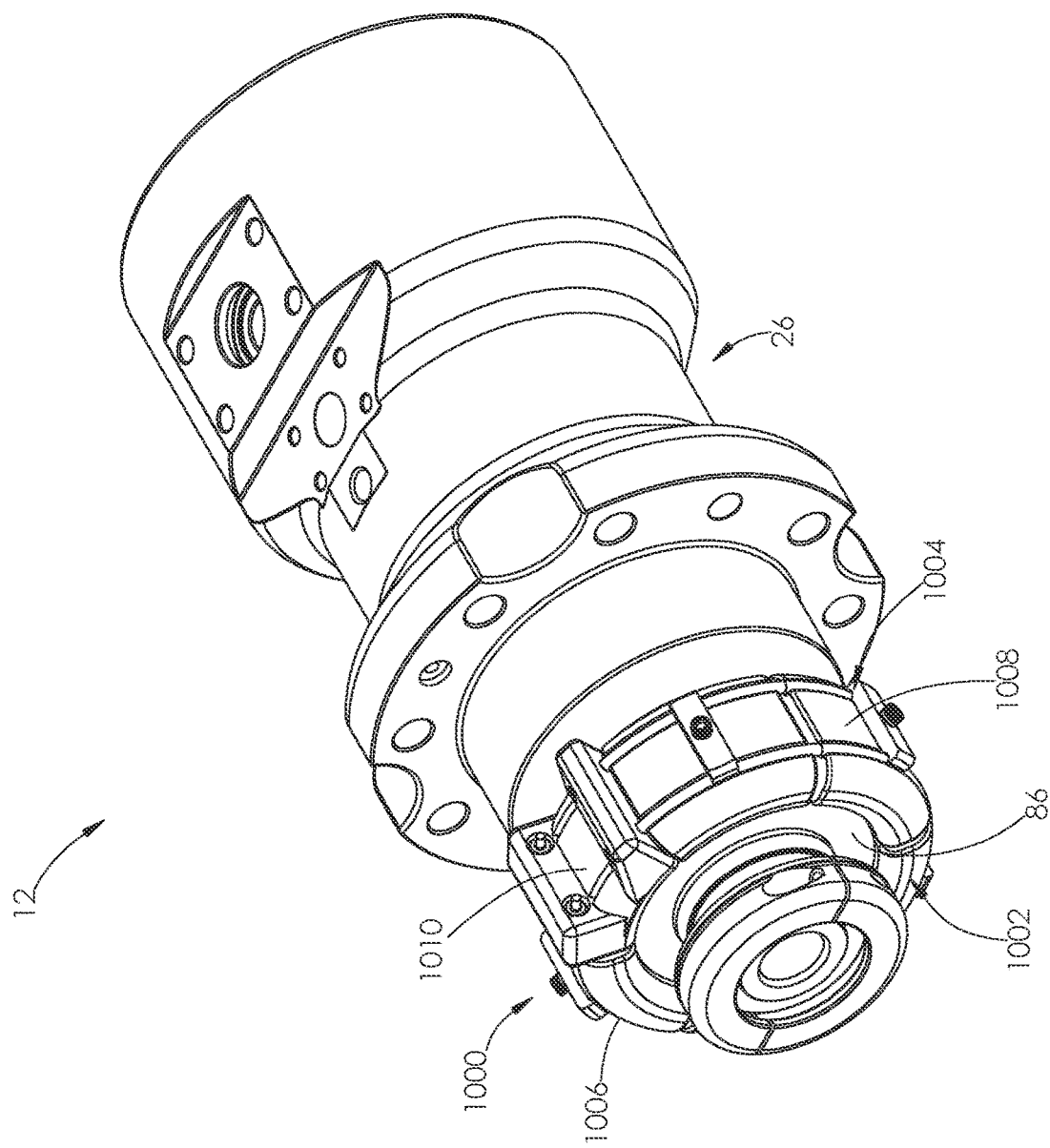
FIG. 92 is a rear perspective view of the fluid end section shown in FIG. 85 but using another embodiment of a clamp.
Figure 93:
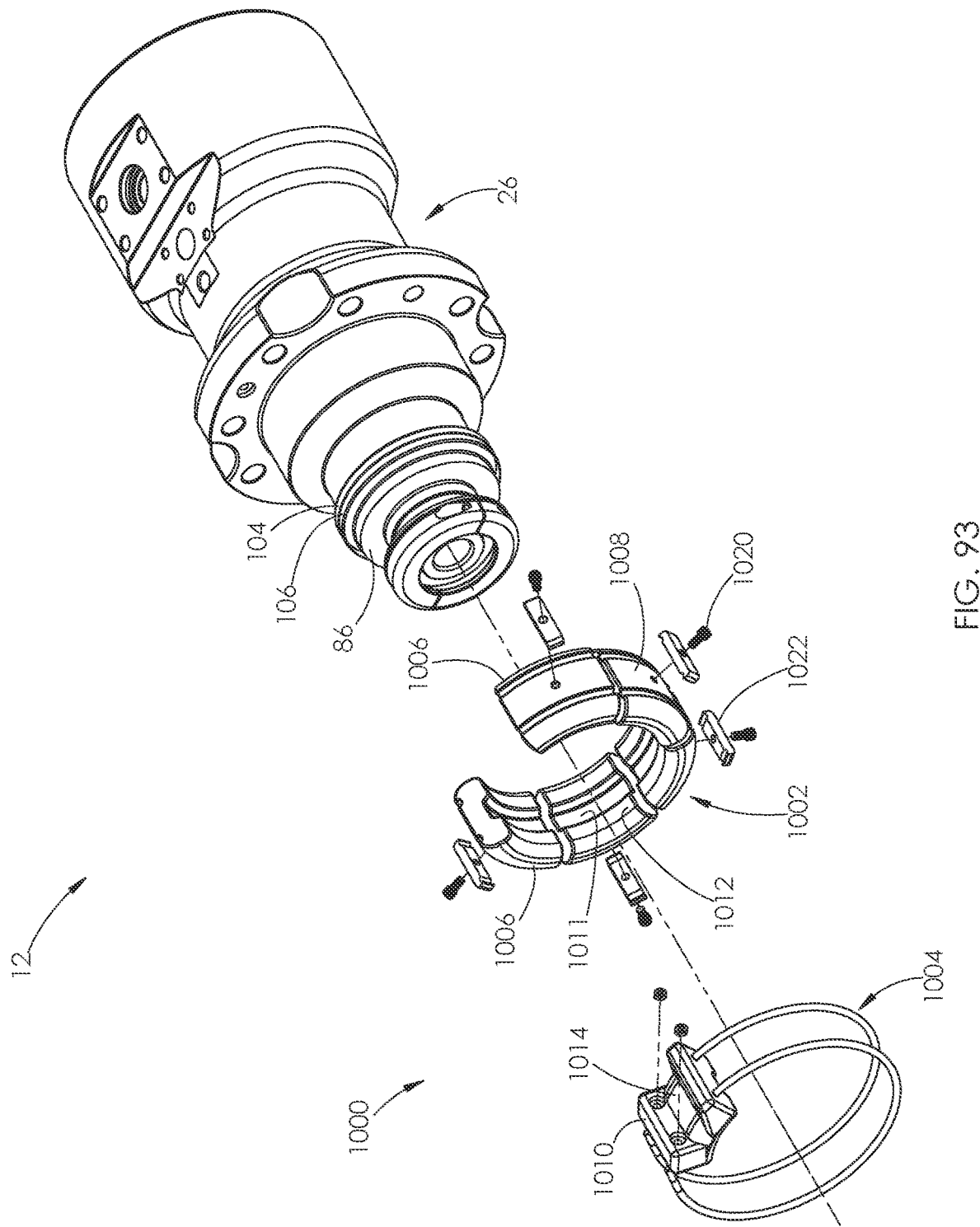
FIG. 93 is a rear perspective view of the fluid end section shown in FIG. 92, but the clamp is shown exploded.

Turning to FIGS. 92 and 93, the fluid end section 12 is shown utilizing another embodiment of a clamp 1000. Like the clamp 900, the clamp 1000 comprises an inner clamp 1002 and an outer clamp 1004. The inner clamp 1002 comprises a plurality of clamp sections 1006. The clamp sections 1006 are identical to the clamp sections 906 shown in FIGS. 86 and 87 but comprise a different outer surface 1008. Also, in contrast to the clamp 900, the inner clamp 1002 comprises a connector clamp section 1010.

As will be described herein, the connector clamp section 1010 has the same inner surface 1012 as the clamp sections 1006, but an outer surface 1014 of the connector clamp section 1010 is configured to receive portions of the outer clamp 1004. Like the clamp sections 906, the clamp sections 1006 and the connector clamp section 1010 have a groove 1011 formed in the inner surface 1012 for receiving the flanged sections 104 and 106. Five clamp sections 1006 are shown in FIGS. 92 and 93. In alternative embodiments, the inner clamp 1002 may be sectioned into more or less than five clamp sections 1006 for use with the connector clamp section 1010.

Turning to FIGS. 100-103, a pair of parallel and spaced apart grooves 1016 are formed in the outer surface 1008 of each clamp section 1006. As will be described herein, the grooves 1016 are sized to receive a portion of the outer clamp 1004. A threaded opening 1018 is also formed in the center of the outer surface 1008 of each clamp section 1006 for receiving a fastener 1020. As will also be described herein, a ring clamp 1022 is secured to the outer surface 1008 of each clamp section 1006 using the fastener 1020.

Figure 94:
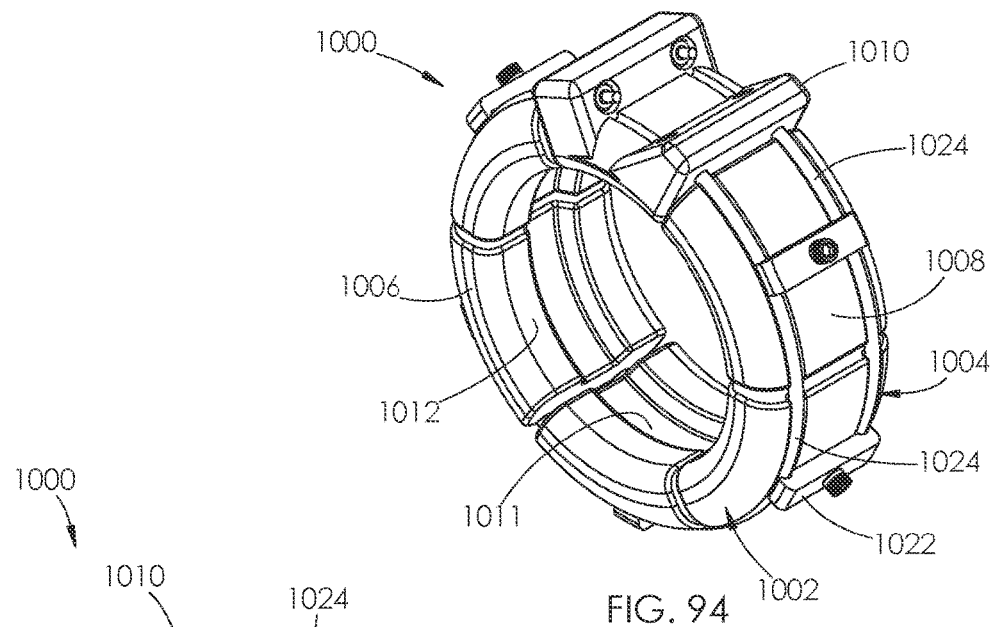
FIG. 94 is a rear perspective view of the clamp shown in FIG. 92.
Figure 95:
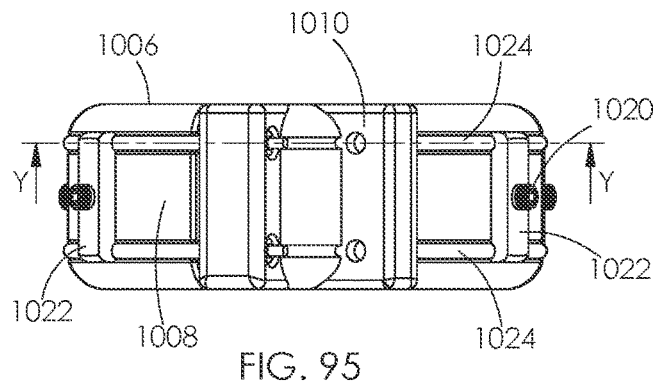
FIG. 95 is a top plan view of the clamp shown in FIG. 94.
Figure 96:
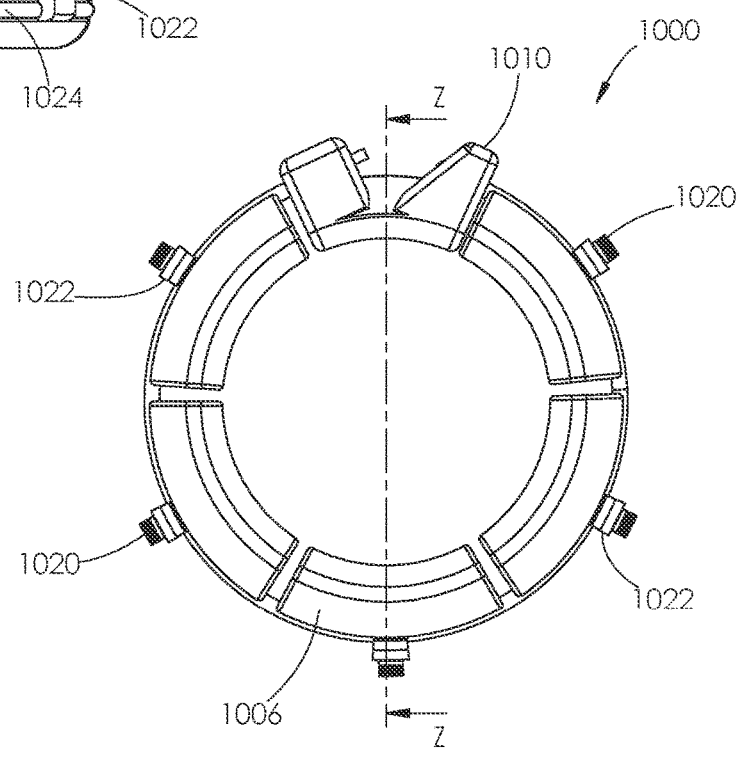
FIG. 96 is a rear elevational view of the clamp shown in FIG. 94.
Figure 97:
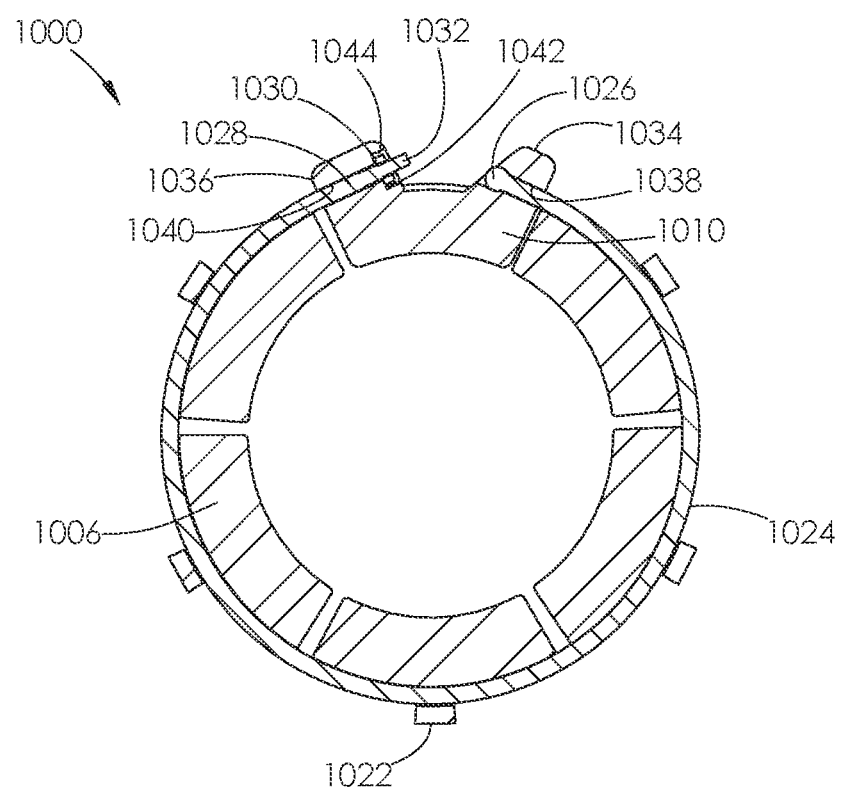
FIG. 97 is a cross-sectional view of the clamp shown in FIG. 95, taken along line Y-Y.
Figure 98:
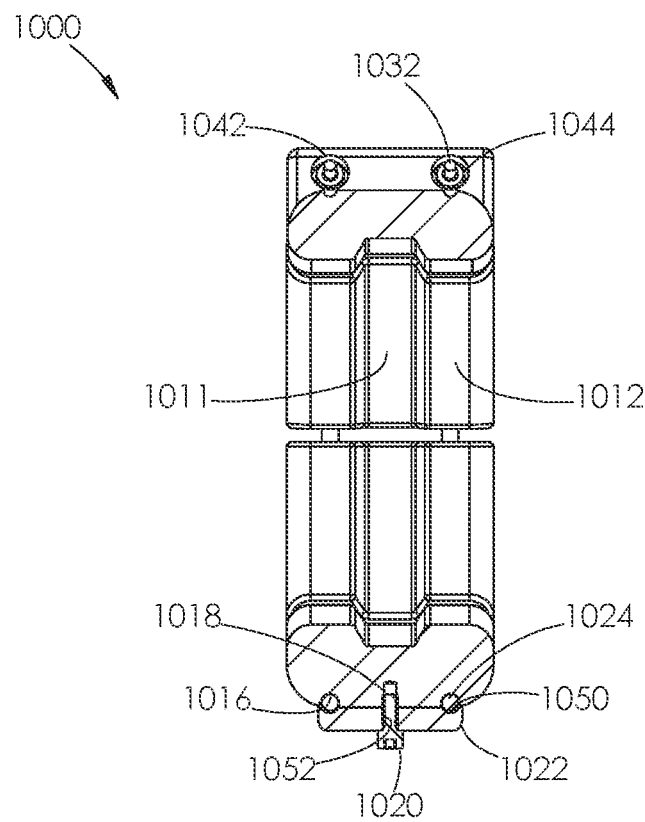
FIG. 98 is a cross-sectional view of the clamp shown in FIG. 96, taken along line Z-Z.

Turning back to FIGS. 94-99, the outer clamp 1004 comprises a plurality of compression rings 1024 and a plurality of the ring clamp 1022. Each ring 1024 is sized to sit within a corresponding one of the grooves 1016 formed in the outer surface 1008 of each clamp section 1006, as shown in FIGS. 94 and 98. Each ring 1024 is split so that it has opposed first and second ends 1026 and 1028, as shown in FIG. 97. The first end 1026 has a greater diameter than the remainder of the ring 1024 and the second end 1028 has a threaded outer surface 1030 and a smaller diameter section 1032. The first end 1026 may have a rounded shape while the second end 1028 has the shape of a cylinder. As will be described herein, the first and second ends 1026 and 1028 are configured to be installed within openings formed in the connector clamp section 1010.

Turning to FIGS. 104-107, a first and second tab 1034 and 1036 are formed in connector clamp section 1010 such that each tab 1034 and 1036 projects from the section's outer surface 1014. The first tab 1034 has a wedge shape and has a pair of passages 1038 formed therein. The passages 1038 are each sized so that the second end 1028 of each ring 1024 may be threaded through the corresponding passage 1038, but the first end 1026 of each ring 1024 is blocked from passing through at least a portion of the corresponding passage 1038, as shown in FIG. 97.

Figure 99:
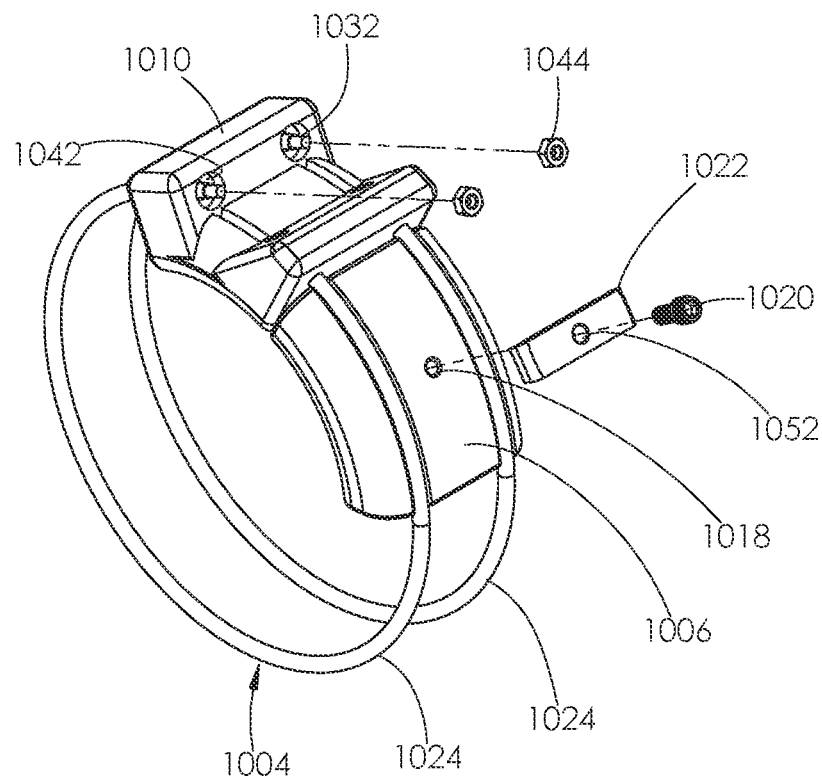
FIG. 99 is a rear perspective view of the clamp shown in FIG. 94. Portions of the clamp have been removed for visual clarity and portions of the clamp are shown exploded.
Figure 100:
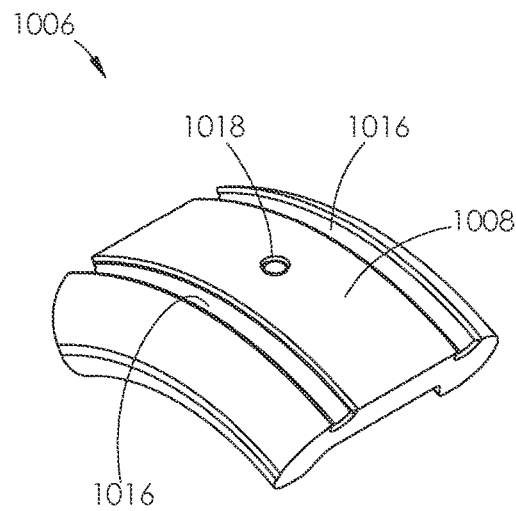
FIG. 100 is a top perspective view of one of the clamp sections used with the clamp shown in FIG. 94.
Figure 101:
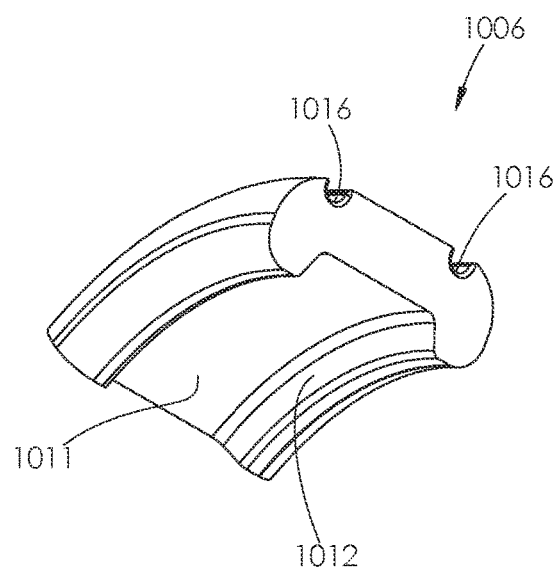
FIG. 101 is a bottom perspective view of the clamp section shown in FIG. 100.
Figure 102:
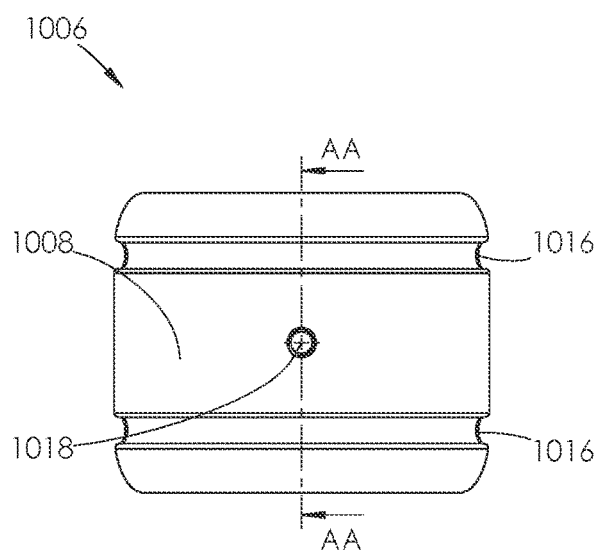
FIG. 102 is a top plan view of the clamp section shown in FIG. 100.
Figure 103:
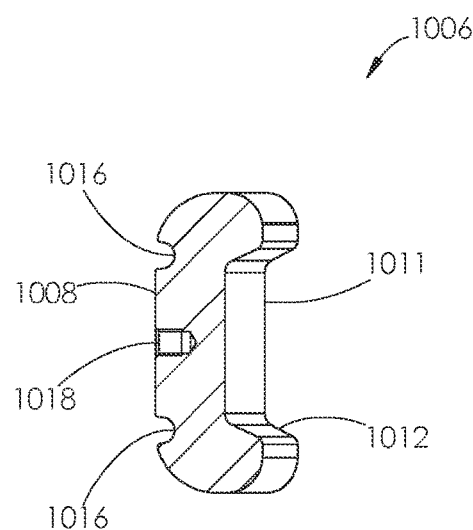
FIG. 103 is a cross-sectional view of the clamp section shown in FIG. 102, taken along line AA-AA.
Figure 104:
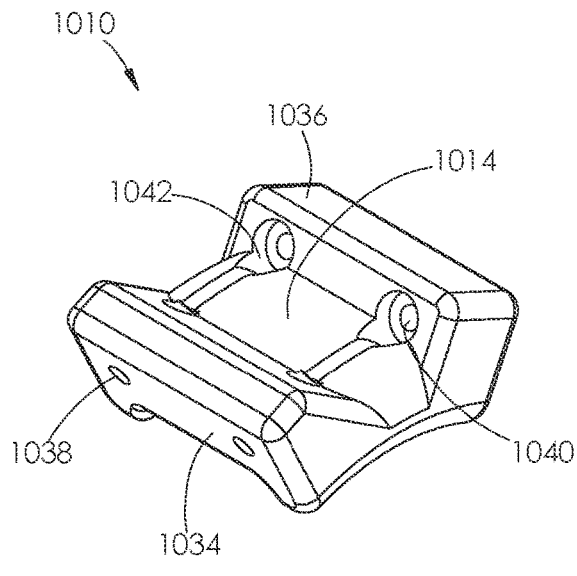
FIG. 104 is a top perspective view of the connector clamp section used with the clamp shown in FIG. 94.
Figure 105:
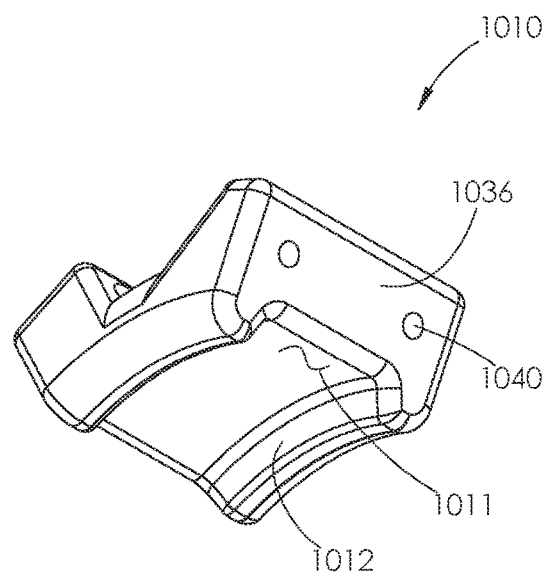
FIG. 105 is a bottom perspective view of the connector clamp section shown in FIG. 104.
Figure 106:
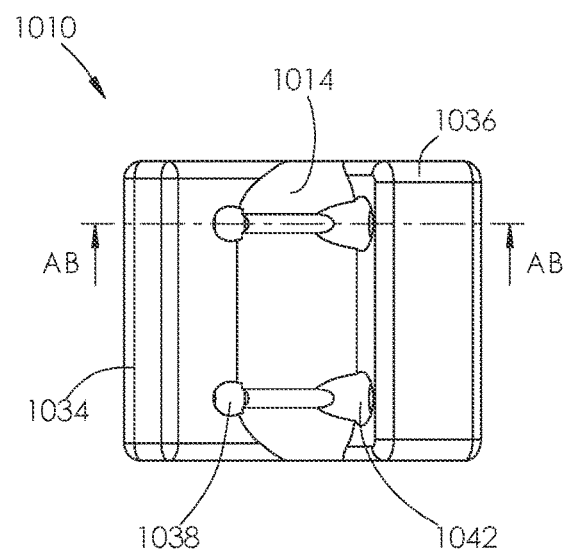
FIG. 106 is a top plan view of the connector clamp section shown in FIG. 104.
Figure 107:
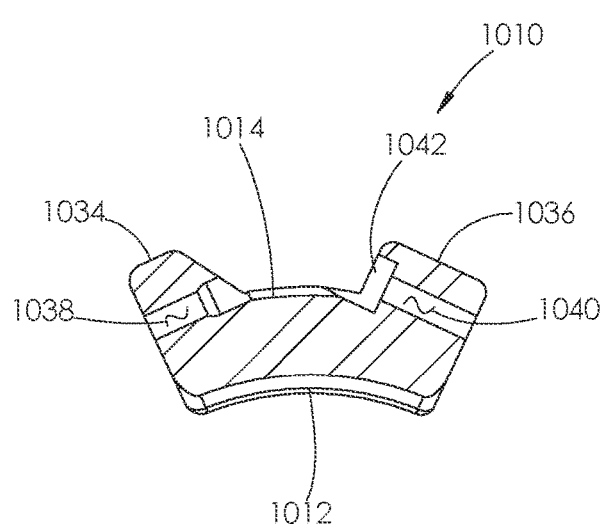
FIG. 107 is a cross-sectional view of the connector clamp section shown in FIG. 106, taken along line AB-AB.
Figure 108:
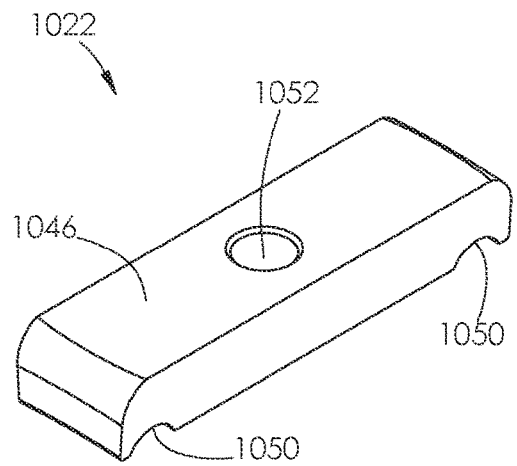
FIG. 108 is a top perspective view of one of the ring clamps used with the clamp shown in FIG. 94.
Figure 109:
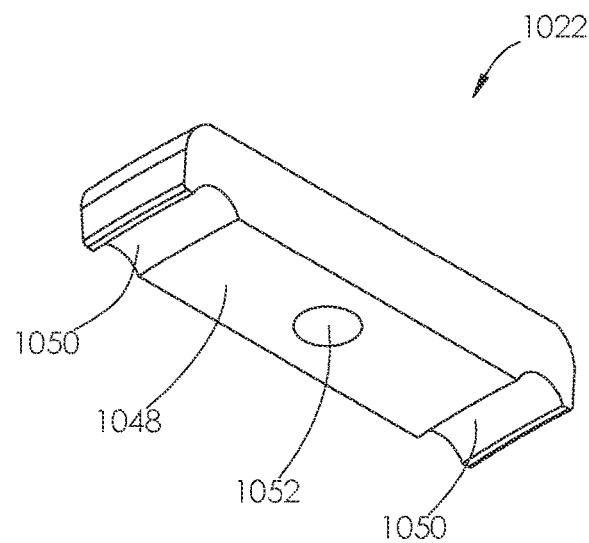
FIG. 109 is a bottom perspective view of the ring clamp shown in FIG. 108.
Figure 110:
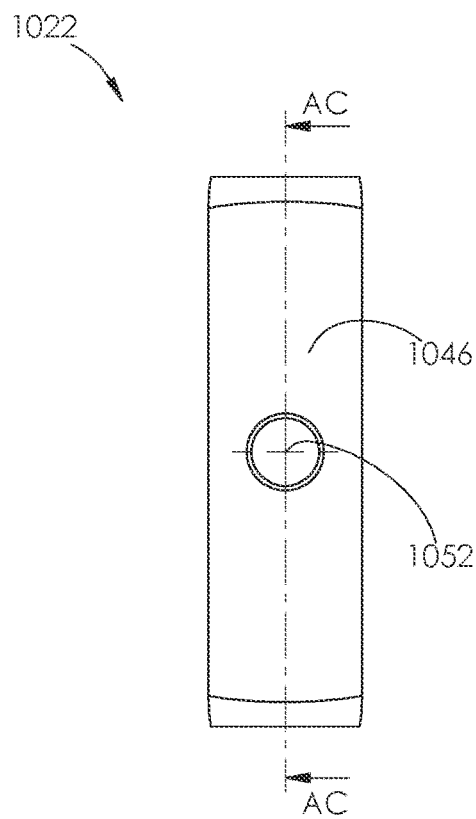
FIG. 110 is a top plan view of the ring clamp shown in FIG. 108.
Figure 111:
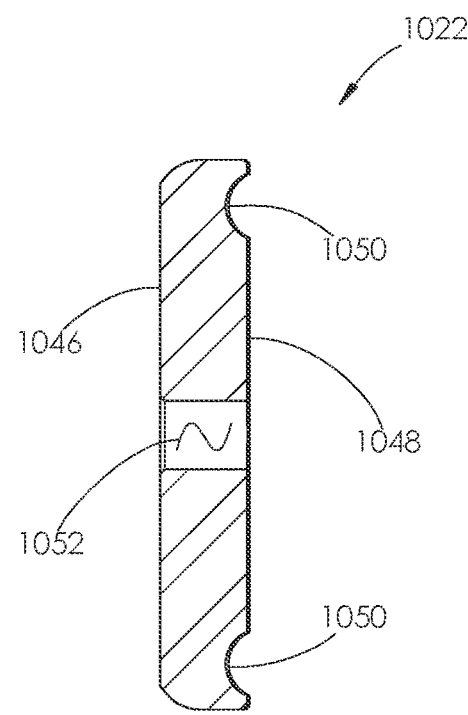
FIG. 111 is a cross-sectional view of the ring clamp shown in FIG. 110, taken along line AC-AC.

Continuing with FIGS. 104-107, the second tab 1036 has a rectangular shape and a pair of passages 1040 formed therein. Each passage 1040 opens into a counterbore 1042 that faces the first tab 1034. After the second end 1028 of a ring 1024 is inserted through the corresponding passage 1038 formed in the first tab 1034, the second end 1028 loops around and is inserted into a corresponding passage 1040 formed in the second tab 1036, as shown in FIG. 97. The smaller diameter section 1032 of the second end 1028 is sized to easily pass through the passage 1040 and project from the counterbore 1042, as shown in FIG. 99. The ring 1024 is secured to the connector clamp section 1010 by threading a nut 1044 onto the threaded outer surface 1030 of the first end 1026. The nut 1044 is tightened against a base of the counterbore 1042, as shown in FIG. 97.

Turning back to FIGS. 92 and 93, to install the clamp 1000 on the retainer 86 and the housing 26, the clamp sections 1006 and the connector clamp section 1010 are positioned around the flanged sections 104 and 106, as is done with the clamp 900. The compression rings 1024 are then installed within the second tab 1036 and positioned within the corresponding grooves 1016. Finally, the first ends 1026 of each ring 1024 are threaded through the second tab 1036 and secured with the nuts 1044. Tightening of the nuts 1044 on the first ends 1026 tightens the corresponding ring 1024, thereby compressing the clamps sections 1006 and the connector clamp section 1010 around the flanged sections 104 and 106. The rings 1024 are held within the grooves 1016 by attaching one of plurality of ring clamps 1022 included in the outer clamp 1004 to a corresponding one of the clamp sections 1006.

Turning to FIGS. 108-111, each ring clamp 1022 has a generally rectangular shape with opposed inner and outer surfaces 1046 and 1048. A pair of grooves 1050 are formed in the inner surface 1046. Each groove 1050 is sized to tightly cover and engage a corresponding one of the rings 1024, as shown in FIG. 98. Each ring clamp 1022 further comprises a central passage 1052 configured to receive the fastener 1020, as shown in FIG. 99.

The ring clamp 1022 is positioned on one of the clamp sections 1006 such that the passage 1052 aligns with the threaded opening 1018 and the rings 1024 are positioned within the grooves 1050. The fastener 120 is then installed within the aligned passage 1052 and threaded opening 1018 to secure the clamp ring 1022 in place, as shown in FIG. 98. During assembly, the ring clamps 1022 are not tightened against the corresponding clamp sections 1006 until the rings 1024 are sufficiently compressed around the clamp sections 1006. Utilizing two compression rings 1006 instead of a single larger compression ring helps apply a greater compressive force to the corresponding clamp sections 1006.

An alternative method of installing the clamp 1000 on the retainer 86 and the housing 26 is to partially assemble the clamp 1000 prior to positioning it around the retainer 86 and the housing 26. Referring to FIG. 99, the second end 1028 of each ring 1024 is inserted into the corresponding passages 1038 in the first tab 1034 but is not yet inserted into the corresponding passages 1040 in the second tab 1036. Each clamp section 1006 is then loosely secured to the rings 1024 using a ring clamp 1022 and a fastener 1020. After assembly to this stage, the connector clamp section 1010 and the adjacent clamp section 1006 near the second tab 1036 can be separated to create a gap sufficient for sliding the clamp 1000 around the flanged portions 104 and 106 of the housing 26 and the retainer 86.

Once the clamp 1000 is around the flanged portions 104 and 106, the second ends 1028 of the rings 1024 are inserted into the corresponding passages 1040 of the second tab 1036 so that the threaded outer surface 1030 of each second end 1028 protrudes from the corresponding counterbore 1042. The nuts 1044 are then threaded onto a corresponding threaded outer surface 1030 of each second end 1028. When the clamp 1000 is first installed on the retainer 86 and the housing 26, the nuts 1044 are only partially tightened so that the clamp sections 1006 may be positioned to provide even circumferential contact with the flanged portions 104 and 106. Once the clamp sections 1006 are properly positioned, the nuts 1044 are torqued to specification, followed by the fasteners 1020. On subsequent disassembly and assembly of the clamp 1000 on the retainer 86 and the housing 26, the fasteners 1020 may remain tightened and only the nuts 1044 removed. This method of assembly reduces time and prevents the loss of the small pieces at the jobsite.

The clamps 900 and 1000 described herein are shown installed on the fluid end section 12, but the clamps 900 and 1000 may be used within any embodiment of a fluid end section disclosed herein. The clamps 900 and 1000 may have different sizes and/or shapes as needed to fit around the corresponding retainers and housings.

One of skill in the art will further appreciate that various features of the housings, packing seals, wear ring, sleeves, retainers, clamps, and other components described herein may be modified or changed, as desired. While not specifically shown in a figure herein, various features from one or more of the fluid end sections described herein may be included in another one of the fluid end sections. Likewise, various features from one or more of the fluid end sections may be installed on a fluid end assembly comprising a single fluid end housing block.

One or more kits may be useful in assembling the fluid end assemblies described herein. A kit may comprise a plurality of housings, packing seals, sleeves, wear rings, plunger packings, retainers, clamps, packing nuts and/or other components described herein.

The concept of a "kit" is described herein because the fluid ends are often shipped or provided unassembled by a manufacturer, with the expectation that a customer will use components of the kit to assemble a functional fluid end assembly. Alternatively, some components are replaced during operation. Accordingly, certain embodiments within the present disclosure are described as "kits," which are unassembled collections of components. The present disclosure also describes and claims assembled apparatuses and systems by way of reference to specified kits, along with a description of how the various kit components are actually coupled to one another to form the apparatus or system.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A fluid end, comprising:
   a housing having a longitudinal axis and opposed front and rear surfaces joined by an outer intermediate surface;
   a bore formed within the housing and interconnecting the front and rear surfaces, the bore extending along the longitudinal axis of the housing;
   a retainer abutting the rear surface of the housing;
   a clamp surrounding and engaging at least a portion of the retainer and at least a portion of the housing and securing the retainer and the housing together, the clamp comprising: an inner clamp surrounded by an outer clamp;
   a reciprocating plunger disposed within the bore and the retainer;
   a packing seal installed within the housing and engaging an outer surface of the plunger;
   in which the fluid end is configured to be attached to a power end by a plurality of threaded stay rods; and
   the fluid end further comprising a valve pair situated within the horizontal bore, the valve pair comprising a suction valve and a discharge valve.

2. The fluid end of claim 1, in which the inner clamp comprises a plurality of clamp sections.

3. The fluid end of claim 1, in which the outer clamp comprises a split compression ring secured together by at least one fastener.

4. The fluid end of claim 1, in which the inner clamp comprises a plurality of clamp sections; in which the outer clamp comprises a split compression ring secured together by at least one fastener; and in which the outer clamp secures the inner clamp to the portion of the retainer and the portion of the housing.

5. The fluid end of claim 1, in which the outer clamp comprises a plurality of compression rings.

6. The fluid end of claim 1, in which the inner clamp comprises a plurality of clamp sections and a connector clamp section; and in which the outer clamp comprises a plurality of compression rings, the compression rings configured to secure to the connector clamp section.

7. The fluid end of claim 1, in which the inner clamp comprises a plurality of clamp sections having a pair of parallel and spaced apart grooves formed therein; and in which the outer clamp comprises a plurality of compression rings, each compression ring of the plurality of compression rings sized to seat within a corresponding one of the pair of grooves formed within the plurality of clamp sections.

8. The fluid end of claim 1, in which the retainer has opposed front and rear surfaces joined by inner and outer intermediate surfaces; in which no threads are formed in the outer intermediate surface of the retainer.

9. The fluid end of claim 8, in which no threads are formed in the inner intermediate surface of the retainer.

10. The fluid end of claim 1, in which the packing seal is a one and only one packing seal installed within the housing.

11. The fluid end of claim 10, further comprising:
    a wear ring installed within the housing and surrounding the one and only one packing seal.

12. The fluid end of claim 1, in which the retainer abuts the packing seal and holds the packing seal within the housing.

13. The fluid end of claim 1, in which a packing nut is not installed within the retainer for engaging the packing seal.

14. The fluid end of claim 1, in which no threads are formed in the housing that surround and face the plunger.

15. The fluid end of claim 1, in which the outer clamp is secured together around the inner clamp using a plurality of fasteners; and in which the fasteners do not engage any portion of the retainer or the housing.

16. The fluid end of claim 1, in which the housing is of single piece construction.

17. A fluid end assembly, comprising:
    a plurality of the fluid ends of claim 1; in which each of the fluid ends is formed as an individual fluid end section; and in which the plurality of fluid end sections are positioned in a side-by-side relationship; and
    an intake manifold in fluid communication with each of the plurality of fluid end sections.

18. A fluid end, comprising:
    a housing having a longitudinal axis and opposed front and rear surfaces joined by an outer intermediate surface;
    a horizontal bore formed within the housing and interconnecting the front and rear surfaces, the bore extending along the longitudinal axis of the housing;
    a retainer abutting the rear surface of the housing;
    a clamp surrounding and engaging at least a portion of the retainer and at least a portion of the housing and securing the retainer and the housing together;
    a reciprocating plunger disposed within the horizontal bore and the retainer;
    a valve pair situated within the horizontal bore, the valve pair comprising a discharge valve and a suction valve;
    a fluid routing plug situated within the horizontal bore; and one and only one packing seal installed within the housing and engaging an outer surface of the plunger.

19. The fluid end of claim 18, in which the clamp comprises an inner clamp surrounded by an outer clamp.

20. The fluid end of claim 19, in which the inner clamp comprises a plurality of clamp sections.

21. The fluid end of claim 18, in which the clamp is secured to the portion of the retainer and the portion of the housing using a plurality of fasteners.

* * * * *